US012556937B2

(12) United States Patent
Ostrometzky et al.

(10) Patent No.: US 12,556,937 B2
(45) Date of Patent: Feb. 17, 2026

(54) PREDICTIVE WEATHER-AWARE COMMUNICATION NETWORK MANAGEMENT

(71) Applicants: The Trustees of Columbia University in the City of New York, New York, NY (US); RAMOT at Tel Aviv University Ltd., Tel Aviv (IL)

(72) Inventors: Jonathan Ostrometzky, Tel-aviv (IL); Gil Zussman, New York, NY (US); Hagit Messer-Yaron, Kfar Saba (IL); Dror Jacoby, Ramat Gan (IL); Igor Kadota, New York, NY (US)

(73) Assignees: The Trustees of Columbia University in the City of New York, New York, NY (US); Ramot at Tel Aviv University Ltd., Tel Aviv (IL)

( * ) Notice: Subject to any disclaimer, the term of this patent is extended or adjusted under 35 U.S.C. 154(b) by 1099 days.

(21) Appl. No.: 17/551,643

(22) Filed: Dec. 15, 2021

(65) Prior Publication Data
US 2022/0110012 A1    Apr. 7, 2022

Related U.S. Application Data

(63) Continuation-in-part of application No. PCT/US2020/042524, filed on Jul. 17, 2020.
(Continued)

(51) Int. Cl.
*H04W 24/02* (2009.01)
*G01W 1/10* (2006.01)
(Continued)

(52) U.S. Cl.
CPC ............. *H04W 24/02* (2013.01); *G01W 1/10* (2013.01); *G06N 3/0442* (2023.01);
(Continued)

(58) Field of Classification Search
CPC ..... H04L 41/147; H04L 41/16; H04L 41/149; H04L 45/22; H04W 24/02; H04W 24/08; H04W 24/04
See application file for complete search history.

(56) References Cited

U.S. PATENT DOCUMENTS 3,896,382 A    7/1975   Magenheim
6,308,043 B1   10/2001  Solheim et al.
(Continued)

OTHER PUBLICATIONS

Abdulrahman et al., "Empirically Derived Path Reduction Factor for Terrestrial Microwave Links Operating at 15 Ghz in Peninsula Malaysia," Journal of Electromagnetic Waves and Applications, vol. 25, Issue 1, pp. 23-37, Apr. 2012, abstract.
(Continued)

*Primary Examiner* — Kevin T Bates
*Assistant Examiner* — Hector Reyes
(74) *Attorney, Agent, or Firm* — Potomac Law Group, PLLC

(57) ABSTRACT

Disclosed are methods, systems, devices, and other implementations, including a method that includes obtaining measurement data from at least part of a wireless communication network during a first interval of time, with the measurement data including measurements indicating whether there are potential disturbances to operation of the wireless communication network. The method further includes determining, based on the obtained measurement data, predictive data representative of future performance of the wireless communication network at one or more future time instances subsequent to an end of the first interval of time, and managing resources of the wireless communication network based, at least in part, on the determined predictive data representative of the future performance of the wireless communication network at the one or more
(Continued)

future time instances subsequent to the end of the first interval.

39 Claims, 17 Drawing Sheets

Related U.S. Application Data

(60) Provisional application No. 62/876,337, filed on Jul. 19, 2019.

(51) Int. Cl.
    *G06N 3/0442*     (2023.01)
    *G06N 3/0455*     (2023.01)
    *G06N 3/09*     (2023.01)
    *H04L 41/147*     (2022.01)
    *H04L 41/16*     (2022.01)
    *H04L 45/00*     (2022.01)
    *H04W 24/08*     (2009.01)
    *H04W 28/18*     (2009.01)
    *G01W 1/00*     (2006.01)
    *H04L 41/149*     (2022.01)
    *H04W 24/04*     (2009.01)

(52) U.S. Cl.
    CPC .............. *G06N 3/0455* (2023.01); *G06N 3/09* (2023.01); *H04L 41/147* (2013.01); *H04L 41/16* (2013.01); *H04L 45/22* (2013.01); *H04W 24/08* (2013.01); *H04W 28/18* (2013.01); *G01W 2001/006* (2013.01); *H04L 41/149* (2022.05); *H04W 24/04* (2013.01)

(56) References Cited

U.S. PATENT DOCUMENTS

| | | | |
|---|---|---|---|
| 6,925,113 | B2 | 8/2005 | Kim et al. |
| 7,174,179 | B2 | 2/2007 | Krebs et al. |
| 7,912,506 | B2 | 3/2011 | Lovberg et al. |
| 8,385,943 | B1 * | 2/2013 | Han ...................... G01S 5/0278 455/456.2 |
| 10,078,155 | B2 | 9/2018 | Elkabetz et al. |
| 12,141,675 | B1 * | 11/2024 | Duong .................... H04B 7/024 |
| 2014/0313914 | A1 | 10/2014 | Ling |
| 2016/0352611 | A1 | 12/2016 | Olgaard et al. |
| 2017/0013587 | A1 | 1/2017 | Laufer et al. |
| 2017/0026862 | A1 * | 1/2017 | Li ......................... H04W 24/08 |
| 2017/0111233 | A1 * | 4/2017 | Kokkula ............. H04L 41/0813 |
| 2017/0374625 | A1 | 12/2017 | Abdelmonem et al. |
| 2018/0167312 | A1 | 6/2018 | Liu et al. |
| 2018/0212836 | A1 | 7/2018 | Zhao et al. |
| 2018/0276691 | A1 | 9/2018 | Li et al. |
| 2020/0136975 | A1 * | 4/2020 | Arora ..................... H04L 41/147 |
| 2022/0173794 | A1 * | 6/2022 | Konishi ............... H04B 7/2041 |

OTHER PUBLICATIONS

Abdulrahman et al., "Rain attenuation predictions on terrestrial radio links: differential equations approach," Transaction on Emerging Telecommunications Technologies, vol. 23, Issue 3, pp. 293-301, Apr. 2012.

Al-Ogaili et al., "Millimeter-wave mobile communications for 5G: Challenges and opportunities," IEEE International Symposium on Antennas and Propagation (APSURSI), pp. 1003-1004, 2016.

Da Silva Mello et al., "Unified Method for the Prediction of Rain Attenuation in Satellite and Terrestrial Links," Journal of Microwaves, Optoelectronics and Electromagnetic Applications, vol. 11, No. 1, pp. 1-14, Jun. 2012.

Hendrantoro et al., "Use of cell-site diversity in millimeter-wave fixed cellular systems to combat the effects of rain attenuation," IEEE Journal on Selected Areas in Communications, vol. 20, Issue 3, pp. 602-614, Apr. 2002.

International Search Report and Written Opinion issued in application No. PCT/US2020/042524 dated Oct. 15, 2020.

Jabbar et al., "Survivable millimeter-wave mesh networks," Computer Communications, vol. 34, Issue 16, pp. 1942-1955, Oct. 2011.

Kim, "MC-GiV2V: Multichannel Allocation in mmWave-Based Vehicular Ad Hoc Networks," Wireless Communications and Mobile Computing, vol. 2018, Article 2753025, Jul. 2018.

Lam et al., "Impact of rain attenuation on 5G millimeter wave communication systems in equatorial Malaysia investigated through disdrometer data," 2017 11th European Conference on Antennas and Propagation (EUCAP), Paris, France, pp. 1793-1797, 2017.

Lin, "11-GHz Radio: Nationwide Long-Term Rain Rate Statistics and Empirical Calculation of 11-GHz Microwave Rain Attenuation," The Bell System Technical Journal, vol. 56, No. 9, pp. 1581-1604, Nov. 1977.

Moupfouma, "Electromagnetic Waves Attenuation due to Rain: A Prediction Model for Terrestrial or L.O.S SHF and EHF Radio Communication Links," Journal of Infrared Millimeter, and Terahertz Waves, vol. 30, Issue 6, pp. 622-632, Jun. 2009.

Ostrometzky et al., Grant submitted for review for Individual Fellowship at European Union Marie-Curie Actions, Sep. 12, 2018.

Rappaport et al., "Overview of Millimeter Wave Communications for Fifth-Generation (5G) Wireless Networks—With a Focus on Propagation Models," IEEE Transactions on Antennas and Propagation, vol. 65, No. 12, pp. 6213-6230, Dec. 2017.

Shrestha et al., "Rain attenuation statistics over millimeter wave bands in South Korea," Journal of Atmospheric and Solar-Terrestrial Physics, vol. 152-153, pp. 1-10, Jan. 2017.

Singh et al., "A Review on Millimeter Wave Communication and Effects on 5G Systems," International Advanced Research Journal in Science, Engineering and Technology, vol. 4, Issue 7, pp. 28-33, Jul. 2017.

Supplementary European Search Report issued in application No. EP20843258 dated Jul. 10, 2023.

Yussuff et al., "Rain Attenuation Prediction Model for Lagos at Millimeter Wave Bands," Journal of Atmospheric and Oceanic Technology, vol. 31, pp. 639-646, Mar. 2014.

Zussman et al., "EARS: Cross Layering in Full Duplex—from Integrated Circuits to Networking," NSF Award Abstract #1547406, Sep. 2015.

Zussman et al., "NSF-BSF: CNS Core: Small: Improving Wireless Networks Robustness via Weather-Sensitive Predictive Management," Electrical Engineering Columbia University, Electrical Engineering Tel Aviv University, 2018.

Ostrometzky et al., "Comparison of Different Methodologies of Parameter-Estimation From Extreme Values," IEEE Signal Processing Letters, vol. 24, No. 9, pp. 1293-1297, Sep. 2017.

Ostrometzky et al., "Dynamic Determination of the Baseline Level in Microwave Links for Rain Monitoring From Minimum Attenuation Values," IEEE Journal of Selected Topics in Applied Earth Observations and Remote Sensing, vol. 11, No. 1, pp. 24-33, Jan. 2018.

Ostrometzky et al., "The Wet-Antenna Effect—A Factor to be Considered in Future Communication Networks," IEEE Transactions on Antennas, vol. 66, Issue 1, pp. 315-322, 2018.

Ostrometzky, "Statistical Signal Processing of Extreme Attenuation Measurements Taken by Commercial Microwave Links for Rain Monitoring," Ph.D Dissertation, Tel Aviv University, 2017.

Overeem et al., "Country-wide rainfall maps from cellular communication networks," Proceedings of the National Academy of Sciences, vol. 110.8, pp. 2741-2745, 2013.

Overeem et al., "Measuring urban rainfall using microwave links from commercial cellular communication networks," Water Resources Research, vol. 47, p. W12505, 2011.

Overeem et al., "Three Years of Country-Wide Rainfall Maps from Cellular Communication Networks," Geophysical Research Abstracts, EGU General Assembly, vol. 17, p. 15153, 2015.

Overeem et al., "Two and a half years of country-wide rainfall maps using radio links from commercial cellular telecommunication networks," Water Resources Research, vol. 52, Issue 10, pp. 7545-8398, Oct. 2016.

(56) References Cited

OTHER PUBLICATIONS

Palacios et al., "Adaptive Codebook Optimization for Beam Training on Off-the-Shelf IEEE 802.11ad Devices," Proc. ACM MobiCom'18, 2018.
Papagiannaki et al., "Long-Term Forecasting of Internet Backbone Traffic: Observations and Initial Models," Proc. IEEE INFOCOM, 2003.
Patel et al., "Implementation of ARIMA model to predict Rain Attenuation for KU band 12 Ghz Frequency," IOSR Journal of Electronics and Communication Engineering, vol. 9, Issue 1, pp. 83-87, Jan. 2014.
Rak, "A new approach to design of weather disruption-tolerant wireless mesh networks," Telecommunication Systems, vol. 61, pp. 311-323, Apr. 2015.
Rappaport et al., "Millimeter Wave Mobile Communications for 5G Cellular: It Will Work!," IEEE Access, vol. 1, pp. 335-349, May 2013.
Rasekh et al., "Noncoherent mmWave Path Tracking," Proc. ACM HotMobile'17, 2017.
Rayitsfeld et al.., "Comparison of two methodologies for long term rainfall monitoring using a commercial microwave communication system," Atmospheric Research, vol. 104-105, pp. 119-127, Feb. 2012.
Roy et al., "Dynamic rainfall monitoring using microwave links," EURASIP Journal of Advances in Signal Processing, vol. 2016, No. 1, pp. 1-17, 2016.
Roy et al., "Spatio-Temporal Field Estimation Using Kriged Kalman Filter (KKF) with Sparsity-Enforcing Sensor Placement," Sensors, vol. 18, No. 6, p. 1778, 2018.
Sadhu et al., "A 28-GHz 32-Element TRX Phased-Array IC With Concurrent Dual-Polarized Operation and Orthogonal Phase and Gain Control for 5G Communications," IEEE Journal of Solid-State Circuits, vol. 52, No. 10, pp. 3373-3391, Dec. 2017.
Saha et al., "X60: A Programmable Testbed for Wideband 60 GHz WLANs with Phased Arrays," Computer Communications, vol. 133, pp. 77-88, Jan. 2019.
Samadi et al., "Optical multicast system for data center networks," Optics Express, vol. 23, No. 17, p. 22162-22180, Sep. 2015.
Samadi et al., "Software-addressable optical accelerators for data-intensive applications in cluster-computing platforms," The European Conference on Optical Communication (ECOC), Sep. 21-25, 2014.
Schleiss et al., "Identification of dry and rainy periods using telecommunication microwave links," IEEE Geoscience and Remote Sensing Letters, vol. 7, pp. 611-615, 2010.
Schleiss et al., "Quantification and Modeling of Wet-Antenna Attenuation for Commercial Microwave Links," IEEE Geoscience and Remote Sensing Leters, vol. 10, Issue 5, pp. 1195-1109, 2013.
Shafiq et al., "A First Look at Cellular Network Performance during Crowded Events," Sigmetrics Perform. Eval. Rev., vol. 41, pp. 17-28, 2013.
Shahrokhi et al., "The maximum concurrent flow problem," Journal of the Associate for Computing Machinery, vol. 37, No. 2, pp. 318-334, Apr. 1990.
Sheshadri et al., "Comparison of Routing Metrics in 802.11n Wireless Mesh Networks," Proc. IEEE INFOCOM'13, pp. 1869-1877, 2013.
Shihab et al., "A Distributed Asynchronous Directional-to-Directional MAC Protocol for Wireless Ad Hoc Networks," IEEE Transactions on Vehicular Technology, vol. 58, No. 9, pp. 5124-5134, Nov. 2009.
Silva et al., "Towards sustainable smart cities: A review of trends, architectures, components, and open challenges in smart cities," Sustainable Cities and Society, vol. 38, pp. 697-713, 2018.
Singh et al., "Distributed Coordination with Deaf Neighbors: Efficient Medium Access for 60 GHz Mesh Networks," Proc. IEEE INFOCOM'10, 2010.
Singh et al., "Interference analysis for highly directional 60 GHz mesh networks: the case for rethinking medium access control," IEEE/ACM Transactions on Networking (TON), vol. 19, No. 5, pp. 1513-1527, 2011.
Son et al., "On Frame-based Scheduling for Directional mmWave WPANs," Proc. IEEE INFOCOM'12, 2012.
Sosa et al., "ARIMA models in the rain attenuation prediction in a Mexican tropical area," IEEE Antennas and Propagation Society International Symposium, 2000.
Sun et al., "CS2P: Improving Video Bitrate Selection and Adaptation with Data-Driven Throughput Prediction," Proc. ACM SIGCOMM, 2016.
Sur et al., "60 GHz Indoor Networking through Flexible Beams: A Link-Level Profiling," Proc. ACM Sigmetrics'15, 2015.
Sur et al., "BeamSpy: Enabling Robust 60 GHz Links Under Blockage," Proc. Usenix NSDI'16, 2016.
Sur et al., "WIFI-Assisted 60 GHz Wireless Networks," Proc. ACM MobiCom'17, 2017.
Tarsa et al., "Taming Wireless Fluctuations by Predictive Queuing Using a Sparse-Coding Link-State Model," Proc. ACM MobiHoc, 2015.
Tie et al., "Anticipatory Wireless Bitrate Control for Blocks," Proc. ADM CoNEXT, 2011.
Uijlenhoet et al., "Opportunistic remote sensing of rainfall using microwave linksfrom cellular communication networks," WIREs Water, vol. 5, Issue 4, p. e1289, 2018.
Unknown, "BridgeWave Communications," https://bridgewave.com/, 2018.
Unknown, "Ericsson Microwave Outlook Trends and needs in the microwave industry," https://www.ericsson.com/en/reports-and-papers/microwave-outlook/reports, Oct. 2016.
Unknown, "Explore Ericsson's offerings," https://www.ericsson.com/en/portfolio, 1994.
Unknown, "InterDigital EdgeHaul™," https://www.interdigital.com/data_sheets/edgehaul., 2024.
Unknown, "ITU-R P.530 Propagation data and prediction methods required for the design of terrestrial line-of-sight systems," https://www.itu.int/dms_pubrec/itu-r/rec/p/R-REC-P.530-17-201712-SHIPDF-E.pdf, Dec. 2017.
Unknown, "ITU-R P.676.11 Attenuation by atmospheric gases," https://www.itu.int/dms_pubrec/itu-r/rec/p/R-REC-P.676-11-201609-I!!PDF-E.pdf. 2016.
Unknown, "ITU-R P.837-7 Characteristics of precipitation for propagation modelling," https://www.itu.int/dms_pubrec/itu-r/rec/p/R-REC-P.837-7-201706-I!!PDF-E.pdf, Jun. 2017.
Unknown, "ITU-R P.838 Specific attenuation model for rain for use in prediction methods," ITU, vol. 838-3, 1992.
Unknown, "ITU-R P.840-7 Attenuation due to clouds and fog," https://www.itu.int/dms_pubrec/itu-r/rec/p/R-REC-P.840-7-201712-S!!PDF-E.pdf, Dec. 2017.
Unknown, "National Science and Technology Council: Connecting and Securing Communities," https://www.nitrd.gov/pubs/NITRD-Connecting-Securing-Communities-Federal-Guide-2018.pdf, 2018.
Unknown, "NEC Ipasolink Series. 2016. Intelligent and high capacity wireless transport solution," https://pdf.aeroexpo.online/pdf/nec-corporation/intelligent-high-capacity-wireless-transport-solution/171108-4848.html, 2016.
Goldshtein et al., "Rain Rate Estimation Using Measurements From Commercial Telecommunications Links," IEEE Transactions on Signal Processing, vol. 57, No. 4, pp. 1616-1625, Apr. 2009.
Graves et al., "Towards End-to-End Speech Recognition with Recurrent Neural Networks," Proceedings of the 31st International Conference on Machine Learning, 2014.
Greff et al., "LSTM: A Search Space Odyssey," Transactions on Neural Networks and Learning Systems, vol. 28, No. 10, pp. 222-2232, Jul. 2016.
Gunn et al., "The microwave properties of precipitation particles," Quarterly Journal of the Royal Meteorological Society, vol. 80, No. 346, pp. 522-545, 1954.
Gupta et al., ",WIFI Multicast to Very Large Groups—Experimentation on the ORBIT Testbed" Demo at IEEELCN'15, Oct. 2015.

(56) References Cited

OTHER PUBLICATIONS

Gupta et al., "AMuSe: Large-scale WIFi Video Distribution—Experimentation on the ORBIT Testbed," Demo in Proc. IEEE INFOCOM'16, Apr. 2016.
Gupta et al., "Experimental Evaluation of Large Scale WiFi Multicast Rate Control," Proc. IEEE INFORCOM'16, Apr. 2016.
Gutterman et al., "Neural Network Based Wavelength Assignment in Optical Switching," Proceedings of the Workshop on Big Data Analytics and Machine Learning for Data Communication Networks, ACM, pp. 37-42, 2017.
Habi et al., "RNN Models for Rain Detection," IEEE International Conference on Acoustics Speech and Signal Processing (ICASSP), 2019.
Habi et al., "Wet-Dry Classification Using LSTM and Commercial Microwave Links," Proc. of IEEE 10th Sensor Array and Multichannel Signal Processing Workshop (SAM), pp. 149-153, 2018.
Haider et al., "LiSteer: mmWave Beam Acquisition and Steering by Tracking Indicator LEDs on Wireless APs," Proc. ACM MobiCom'18, 2018.
Hansryd et al., "Long term path attenuation measurement of the 71-76 GHz band in a 70/80 GHz microwave link," Proc. of the Fourth European Conference on Antennas and Propagation (EuCAP), IEEE, pp. 1-4, 2010.
Hochreiter et al., "Long Short-Term Memory," Nerual Computation, vol. 9, Issue 8, pp. 1735-1780, Nov. 1997.
Hong et al., "Achieving High Utilization with Software-Driven WAN," Proc. ACM SIGCOMM, 2013.
Huang et al., "A Machine Learning Approach for Dynamic Optical Channel Add/Drop Strategies that Minimize EDFA Power Excursions," Proc. ECOC'16, Sep. 2016.
Huang et al., "Dynamic mitigation of EDFA power excursions with machine learning," Optics Express, vol. 25, No. 3, p. 2245, Feb. 2017.
Huang et al., "When Backpressure Meets Predictive Scheduling," Proc. ACM MobiHoc, 2014.
Hyndman et al., "Another look at measures of forecast accuracy," International Journal of Forecasting, vol. 22, No. 4, pp. 679-688, 2006.
Jabbar et al., "Performance Comparison of Weather Disruption-Tolerant Cross-Layer Routing Algorithms," Proc. IEEE INFOCOM, 2009.
Jacoby et al., "Short-Term Prediction of the Attenuation in a Commercial Microwave Link Using LSTM-based RNN," Proc. EUSIPCO, 2020.
Jain et al., "B4: Experience with a Globally-Deployed Software Defined WAN," Proc. ACM SIGCOMM, 2013.
Javed et al., "Adaptive wireless mesh networks: Surviving weather without sensing it," Computer Communications, vol. 54, pp. 120-130, 2014.
Jinno et al., "Real-time rainfall prediction at small space-time scales using a two-dimensional stochastic advection-diffusion model," Water Resources Research, vol. 29, Issue 5, pp. 1489-1504, May 1993.
Kingma et al., "ADAM: A Method for Stochastic Optimization," Proc. ICLR, 2015.
Lavery et al., "Networks for Future Services in a Smart City: Lessons Learned from the Connected OFCity Challenge 2017," IEEE Communications Magazine, vol. 56, No. 8, pp. 138-144, 2018.
Leijnse et al., "Errors and Uncertainties in Microwave Link Rainfall Estimation Explored Using Drop Size Measurements and High-Resolution Radar Data," Journal of Hydrometeorology, vol. 11, No. 6, pp. 1330-1344, 2010.
Leijnse et al., "Microwave link rainfall estimation: Effects of link length and frequency, temporal sampling, power resolution, and wet antenna attenuation," Advances in Water Resources, vol. 31, Issue 11, pp. 1481-1493, Nov. 2008.
Leijnse et al., "Rainfall measurement using radio links from cellular communication networks," Water Resources Research, vol. 43, 2007.
Liberman et al., "Accurate reconstruction of rain field maps from Commercial Microwave Networks using sparse field modeling," Proc. IEEE ICASSP'14, May 2014.
Liberman et al., "New algorithm for integration between wireless microwave sensor network and radar for improved rainfall measurement and mapping." Atmospheric Measurement Techniques, vol. 7, pp. 4481-4528, Oct. 2014.
Liberman, "Optimal Recovery of Rain Field Maps Using Measurements From Wireless Sensors Network," M.Sc. Thesis, Tel-Aviv University, 2013.
Liu et al., "zUpdate: Updating Data Center Networks with Zero Loss," Proc. ACM SIGCOMM, 2013.
Lu et al., "Optimizing Stored Video Delivery For Mobile Networks: The Value of Knowing the Future," Proc. IEEE INFOCOM, 2013.
Maciejowski, "Predictive Control with Constraints," 2002 (Part 1).
Maciejowski, "Predictive Control with Constraints," 2002 (Part 2).
Maciejowski, "Predictive Control with Constraints," 2002 (Part 3).
Mangla et al., "Video Through a Crystal Ball: Effect of Bandwidth Prediction Quality on Adaptive Streaming in Mobile Environments," Proc. ACM MoVid, 2016.
Margolies et al., "Exploiting Mobility in Proportional Fair Cellular Scheduling: Measurements and Algorithms," IEEE/ACM Transactions on Networking, vol. 24, No. 1, pp. 355-367, Jan. 2016.
Marra et al., "Autocorrelation structure of convective rainfall in semiarid-arid climate derived from high-resolution X-Band radar estimates," Atmospheric Research, vol. 200, pp. 126-138, Feb. 2018.
Mckeown et al., "OpenFlow: Enabling Innovation in Campus Networks," SIGCOMM Computer Communication Review, vol. 28, No. 2, pp. 69-74, 2008.
Messer et al., "A New Approach to Precipitation Monitoring: A critical survey of existing technologies and challenges," IEEE Signal Processing Magazine, vol. 32, No. 3, pp. 110-122, May 2015.
Messer et al., "Environmental Monitoring by Wireless Communication Networks," Science, vol. 312, p. 713, May 2006.
Messer et al., "Environmental Sensor Networks Using Existing Wireless Communication Systems for Rainfall and Wind Velocity Measurements," IEEE Instrumentation & Measurement, pp. 33-38, Apr. 2012.
Messer, "Capitalizing on Cellular Technology—Opportunities and Challenges for Near Ground Weather Monitoring," Environments, vol. 7, No. 7, p. 73, Jun. 2018.
Mo et al., "Deep Neural Network Based Dynamic Resource Reallocation of BBU Pools in 5G C-RAN ROADM Networks," Optical Fiber Communication Conference, Optical Society of America, pp. Th1B-4, 2018.
Mo et al., "Deep Neural Network Based Wavelength Selection and Switching in ROADM Systems," Journal of Optical Communications and Networking, vol. 10, No. 10, pp. D1-D11, 2018.
Naimi et al., "Anticipation of ETX Metric to manage Mobility in Ad Hoc Wireless Networks," Proc. Ad-hoc, Mobile, and Wireless Networks, 2014.
Neumayer et al., "Assessing the Vulnerability of the Fiber Infrastructure to Disasters," IEEE/ACM Transactions on Networking, vol. 19, No. 6, pp. 1610-1623, Dec. 2011.
Olsen et al., "The aRb Relation in the Calculation of Rain Attenuation," IEEE Transactions on Antennas and Propagation, vol. 26, No. 2, pp. 318-329, Apr. 1978.
Ostrometzky et al., "Accumulated Mixed Precipitation Estimation Using Measurements from Multiple Microwave Links," Advances in Meteorology, vol. 2015, Article ID 707646, 2015.
Abedini et al., "Content Caching and Scheduling in Wireless Networks With Elastic and Inelastic Traffic," IEEE/ACM Transactions on Networking, vol. 22, No. 3, pp. 864-874, 2014.
Agarwal et al., "Network Vulnerability to Single, Multiple, and Probabilistic Physical Attacks," Proc. IEEE MILCOM'10, Nov. 2010.
Agrawal et al., "The Resilience of WDM Networks to Probabilistic Geographical Failures," IEEE/ACM Trans. Network, vol. 21, No. 5, pp. 1525-1538, 2013.

(56) References Cited

OTHER PUBLICATIONS

Allalouf et al., "Centralized and Distributed Algorithms for Routing and Weighted Max-Min Fair Bandwidth Allocation," IEEE/ACM Transactions on Networking, vol. 16, No. 5, pp. 1015-1024, Oct. 2008.
Balachandran et al., "Developing a Predictive Model of Quality of Experience for Internet Video," Proc. ACM SIGCOMM, 2013.
Bao et al., "A brief description on measurement data from an operational microwave network in Gothenburg, Sweden," 15th International Conference on Environmental Science and Technology, Sep. 2017.
Bao et al., "Field trial on adaptive modulation of microwave communication link at 6.8GHz," Proc. IEEE EuCAP, 2015.
Bega et al., "DeepCog: Optimizing Resource Provisioning in Network Slicing with AI-based Capacity Forecasting," IEEE J. Sel. Areas Commun., vol. 38, pp. 361-376, 2019.
Bejerano et al., "Experimental Evaluation of a Scalable WiFi Multicast Scheme in the ORBIT Testbed," Proc. 3rd GENI Research and Educational Experiment Workshop (GREE2014), Mar. 2014.
Berne et al., "Path-averaged rainfall estimation using microwave links: Uncertainty due to spatial rainfall variability," Geophysical Research Letters, vol. 34, No. 7, 2007.L07403.
Bianchi et al., "A Variational Approach to Retrieve Rain Rate by Combining Information from Rain Gauges, Radars, and Microwave Links," Journal of Hydrometeorology, vol. 14, No. 6, pp. 1897-1909, Dec. 2013.
Birand et al., "Analyzing the Performance of Greedy Maximal Scheduling via Local Pooling and Graph Theory," IEEE/ACM Transactions on Networking, vol. 20, No. 1, pp. 163-176, Feb. 2012.
Birand et al., "Real-Time Power Control for Dynamic Optical Networks—Algorithms and Experimentation," IEEE j. Sel. Areas Commun., vol. 32, No. 8, pp. 1615-1628, Aug. 2014.
Birand et al., "Real-Time Power Control for Dynamic Optical Networks—Algorithms and Experimentation," Proc. IEEE ICNP'13, 2013.
Brown et al., "Introduction to Random Signals and Applied Kalman Filtering," John Wiley & Sons, 1992.
Brzezinski et al., "Distributed Throughput Maximization in Wireless Mesh Networks via Pre-Partitioning," IEEE/ACM Transactions on Networking, vol. 16, No. 6, pp. 1406-1419, 2008.
Bui et al., "A Survey of Anticipatory Mobile Networking: Context-Based Classification, Prediction Methodologies, and Optimization Techniques," IEEE Communications Surveys & Tutorials, vol. 19, No. 3, pp. 1790-1821, 2017.
Bui et al., "Mobile Network Resource Optimization under Imperfect Prediction," Proc. IEEE WoWMom, 2015.
Caesar et al., "Design and Implementation of a Routing Control Platform," Proc. NSDI, 2005.
Cannistra et al., "Enabling Autonomic Provisioning in SDN Cloud Networks with NFV Service Chaining," Proc. OSA OFC'14, Tu21. 4,.Mar. 2014.
Chattopadhyay et al., "Location Aware Opportunistic Bandwidth Sharing between Static and Mobile Users with Stochastic Learning in Cellular Networks," IEEE Transactions on Mobile Computing, pp. 1802-1815, 2018.
Chen et al., "Demo Abstract: Full-Duplex with a Compact Frequency Domain Equalization-based RF Canceller," Proc. IEEE INFOCOM'17, May 2017.
Chen et al., "Demo Abstract: Open-Access Full-Duplex Wireless in the ORBIT Testbed," Proc. IEEE INFOCOM'18, 2018.
Chen et al., "Demo: Full-Duplex Wireless based on a Small-Form-Factor Analog Self-Interference Canceller," Proc. ACM MobiHoc'16, Jul. 2016.
Chen et al., "Wideband Full-Duplex Wireless via Frequency-Domain Equalization: Design and Experimentation," Proc. ACM MobiCom'19, Article 3, Aug. 2019.
Cherkassky et al., "Precipitation Classification Using Measurements From Commercial Microwave Links," IEEE Transactions on Geoscience and Remote Sensing, vol. 52/5, 2014.
Cho et al., "On the general BER expression of one- and two-dimensional amplitude modulations," IEEE Transactions on Communications, vol. 50, No. 7, pp. 1074-1080, 2002.
Chung et al., "Degrees of Freedom in Adaptive Modulation: A Unified View," IEEE Transactions on Communications, vol. 49, No. 9, pp. 1561-1571, Sep. 2001.
Chung et al., "Empirical evaluation of gated recurrent neural networks on sequence modeling," arXiv preprint arXiv:1412.3555, 2014.
Chwala et al., "Precipitation observation using microwave backhaul links in the alpine and pre-alpine region of Southern Germany," Hydrol. Earth Syst. Sci., vol. 16, pp. 2647-2661, Aug. 2012.
Chwala et al., "Wet/dry-estimation algorithm for commercial backhaul link attenuation data to derive precipitation intensity in alpine terrain," European Geoscience Union General Assembly (EGU), Vienna, Austria, 2011.
Dan'Azumi et al., "Modeling the Distribution of Rainfall Intensity using Hourly Data," American Journal of Environmental Sciences, vol. 6, No. 3, pp. 238-243, 2010.
De La Oliva et al., "Xhaul: Towards an Integrated Fronthaul/Backhaul Architecture in 5G Networks," IEEE Wireless Communications, vol. 22, No. 5, pp. 32-40, Oct. 2015.
Doff et al., "Sensor Assisted Movement Identification and Prediction for Beamformed 60 GHz Links," Proc. IEEE CCNS'15, 2015.
Du et al., "Suburban Fixed Wireless Access Channel Measurements and Models at 28 GHz for 90% Outdoor Coverage," arXiv:1807.03763, 2018.
Edstam et al., "Microwave backhaul evolution—reaching beyond 100GHz," Ericsson Technology Review, pp. 2-14, Feb. 2017.
Ehsan et al., "Rationalization: A Neural Machine Translation Approach to Generating Natural Language Explanations," Proc. AAI/ACM Conference on AI, Ethics and Society, 2018.
Fencl et al., "Assessing the potential of using telecommunication microwave links in urban drainage modelling," Water & Science Technology, vol. 68, No. 8, pp. 1810-1818, Nov. 2013.
Fencl et al., "Commercial microwave links instead of rain gauges: Fiction or reality?," Water Science & Technology, vol. 71, No. 1, pp. 31-37, Jan. 2015.
Fenicia et al., "Microwave links for rainfall estimation in an urban environment: Insights from an experimental setup in Luxembourg-City," Journal of Hydrology, vol. 464-465, pp. 69-78, Jul. 2012.
Field et al., "Managing the Risks of Extreme Events and Disasters to Advance Climate Change Adaptation," Special Report of the Intergovernmental Panel on Climate Change, Cambridge University Press, 2012 (Part 1 of 6).
Field et al., "Managing the Risks of Extreme Events and Disasters to Advance Climate Change Adaptation," Special Report of the Intergovernmental Panel on Climate Change, Cambridge University Press, 2012 (Part 2 of 6).
Field et al., "Managing the Risks of Extreme Events and Disasters to Advance Climate Change Adaptation," Special Report of the Intergovernmental Panel on Climate Change, Cambridge University Press, 2012 (Part 3 of 6).
Field et al., "Managing the Risks of Extreme Events and Disasters to Advance Climate Change Adaptation," Special Report of the Intergovernmental Panel on Climate Change, Cambridge University Press, 2012 (Part 4 of 6).
Field et al., "Managing the Risks of Extreme Events and Disasters to Advance Climate Change Adaptation," Special Report of the Intergovernmental Panel on Climate Change, Cambridge University Press, 2012 (Part 5 of 6).
Field et al., "Managing the Risks of Extreme Events and Disasters to Advance Climate Change Adaptation," Special Report of the Intergovernmental Panel on Climate Change, Cambridge University Press, 2012 (Part 6 of 6).
Gao et al., "MmWave massive-MIMO-based wireless backhaul for the 5G ultra-dense network," IEEE Wireless Communications, vol. 22, Issue 5, pp. 13-21, Oct. 2015.
Gazit, "Rain-Mapping through Compressed Sensing: Reconstruction Criteria Relating Image Sparsity, Resolution, and Random Observations," M.Sc. Thesis, Tel-Aviv University, 2016.
Ge et al., "5G Ultra-Dense Cellular Networks," IEEE Wireless Communications, vol. 23, Issue 1, pp. 72-79, Feb. 2016.

(56) References Cited

OTHER PUBLICATIONS

Ghasempour et al., "Decoupling Beam Steering and User Selection for Scaling Multi-User 60 GHz WLANs," Proc. ACM MobiHoc'17, 2017.
Unknown, "NSF Follow-on Workshop on Ultra-Low Latency Wireless Networks," https://dl.acm.org/doi/book/10.1145/3087876, Nov. 2016.
Unknown, "OTT Parsivel2—Laser Weather Sensor," https://www.ott.com/products/meteorological-sensors-26/ott-parsivel2-laser-weather-sensor-2392/, 2019.
Unknown, "Siklu by Ceragon," https://www.siklu.com/, 2024.
Unknown, "The PAWR COSMOS Project," https://www.cosmos-lab.org/, 2018.
Unknown, "Tutorial: Full-duplex wireless in the ORBIT testbed," https://www.orbit-lab.org/wiki/Tutorials/k0SDR/Tutorial25, 2017.
Unknown, "Code: Full-duplex wireless in ORBIT testbed," https://github.com/Wimnet/flexicon_orbit, 2018.
Van Vleck, "The Absorption of Microwaves by Oxygen," Physical Review Journal, vol. 71, Issue 7, p. 413, Apr. 1947.
Wang et al., "Spatio-Temporal Analysis and Prediction of Cellular Traffic in Metropolis," IEEE Transactions on Mobile Computing, vol. 18, No. 9, pp. 2190-2202, 2018.
Wei et al., "Facilitating Robust 60 GHz Network Deployment by Sensing Ambient Reflectors," Proc. Usenix NSDI'17, Mar. 2017.
Werbos, "Backpropagation through time: what it does and how to do it," Proceedings of the IEEE, vol. 78, Issue 10, pp. 1550-1560, 1990.
Xie et al., "Convolutional Attention Networks for Scene Text Recognition," ACM Transactions on Multimedia Computing, Communications, and Applications, vol. 15, Issue 1s, Article 3, Jan. 2019.
Xu et al., "Magus: Minimizing Cellular Service Disruption during Network Upgrades," Proc. ACM CoNEXT, 2015.
Yaghoubi et al., "Consistency-Aware Weather Disruption-Tolerant Routing in SDN-Based Wireless Mesh Networks," IEEE Transactions on Network and Service Management, vol. 15, No. 2, pp. 582-595, 2018.
Yaghoubi et al., "Mitigation of Rain Impact on Microwave Backhaul Networks," Proc. IEEE ICC'16, May 2016.
Yang et al., "Sensor-Assisted Codebook-Based Beamforming for Mobility Management in 60 GHz WLANs," Proc. IEEE MASS'15, 2015.
Yin et al., "Prediction-Based Throughput Optimization for Dynamic Spectrum Access," IEEE Transactions on Vehicular Technology, vol. 60, No. 3, pp. 1284-1289, 2011.
Yu et al., "COSMOS: Optical Architecture and Prototyping," Proc. OSA OFC'19, 2019.
Yue et al., "LinkForecast: Cellular Link Bandwidth Prediction in LTE Networks," IEEE Transactions on Mobile Computing, vol. 17, No. 7, pp. 1582-1594, Jul. 2018.
Zhang et al., "OpenMili: A 60 GHz Software Radio Platform With a Reconfigurable Phased-Array Antenna," Proc. ACM MobiCom'16, 2016.
Zhou et al., "Mirror Mirror on the Ceiling: Flexible Wireless Links for Data Centers," ACM SIGNCOMM Computer Communication Review, vol. 42, No. 4, pp. 443-454, Aug. 2012.
Zhu et al., "Cutting the Cord: a Robust Wireless Facilities Network for Data Centers," Proc. ACM MobiCom'14, 2014.
Zhu et al., "Demystifying 60GHz Outdoor Picocells," Proc. ACM MobiCom'14, 2014.
Zhu et al., "Machine Learning Based Prediction of Erbium-Doped Fiber WDM Line Amplifier Gain Spectra," Proc. ECOC'18, 2018.
Zinevich et al., "Prediction of rainfall intensity measurement errors using commercial microwave communication links," Atmospheric Measurement Techniques, vol. 3, pp. 1385-1402, Oct. 2010.

\* cited by examiner

PREDICTIVE WEATHER-AWARE COMMUNICATION NETWORK MANAGEMENT

CROSS-REFERENCE TO RELATED APPLICATIONS

This application is a continuation-in-part (CIP) application of, and claims priority to, International Application No. PCT/US2020/042524, entitled "PREDICTIVE WEATHER-AWARE COMMUNICATION NETWORK MANAGEMENT," and filed Jul. 17, 2020, which in turn claims the benefit of, and priority to, U.S. Provisional Application No. 62/876,337, entitled "PREDICTIVE COMMUNICATION NETWORK MANAGEMENT BASED ON WEATHER" and filed Jul. 19, 2019 the contents of all of which are incorporated herein by reference in their entireties.

STATEMENT REGARDING FEDERALLY SPONSORED RESEARCH

This invention was made with government support under Grant No. CNS-1910757 by the National Science Foundation (NSF). The government has certain rights in the invention.

BACKGROUND

Currently, 5G, the next generation of broadband communication networks, is being developed in order to accommodate faster speeds, lower latencies, and larger capacity capabilities. To accomplish this, higher radio frequencies, such as the millimeter-wave (mmWave) band (28-300 GHz) are being developed for use. However, the current challenges with mmWave include higher path loss, reduced scattering, increased noise, and increased blockage potential. mmWave technology is extremely susceptible to moisture in the atmosphere, resulting in rain-induced attenuation and network blockage.

Cellular providers have traditionally relied on a vast number of Commercial Microwave Links (CMLs) in significant parts of their backhaul networks. These networks of CMLs usually operate at frequencies of 6-40 GHz which are around the K-band frequency range, connect base stations, and cover entire countries. Recently, the use of CMLs in millimeter-wave (mmWave) frequencies of 60-90 GHz, which are part of the E-band range, has gained popularity in smart cities. In smart-cities various applications require ultra high bandwidth and low latency (e.g., HD/4K video camera connectivity, public WiFi backhaul, public safety network, and smart grid) and many locations are beyond the reach of the fiber plant. Newer CMLs currently operate at frequencies of 6 GHz to 90 GHz, and frequencies above 100 GHz will become available in the future.

One problem associated with such communication networks is their susceptibility to atmospheric phenomena, which attenuate the transmitted radio signals, with precipitation (i.e., rain) being the dominant factor. Although higher frequencies can support higher throughput, as the frequency increases, so does the weather-induced attenuation. On the other hand, supported smart-city mission-critical applications (e.g., traffic cameras) require robust solutions and cannot withstand significant outages.

SUMMARY OF THE INVENTION

The present disclosure describes solutions for controlling the wireless network in a predictive manner. By using measurements performed by wireless nodes to obtain, for example, standard CMLs' Tx and Rx measurements, the intensity and location of the attenuation-induced phenomena can be estimated. This information may be implemented via data-driven machine learning tools to extrapolate the near-future properties of the attenuation-caused factors in order to reconstruct the attenuation affecting the CMLs in the vicinity of the detected interference. Based on the attenuation prediction techniques, using both classical models such as the ARIMA (autoregressive integrated moving average) process, as well as machine learning processes, a set of prediction-based network control and management procedures can be implemented. These cross-layered processes span the physical, link, and the network layers, and are configured to react in a predictive manner, in real-time (or near real-time), prior to imminent onset of, for example, rain-related network disturbances. The presented approaches are used to activate link-level solutions (such as the ATPC and the AMC techniques/algorithms), as well as to dynamically reshape the network topology dynamically, in environmentally-aware management schemes. This, in turn, can increase the future networks Quality of Service (QoS) dramatically. An example of a process that dynamically re-shapes (re-connects or re-routes) the network includes the Multi-Step Network Reconfiguration (MSNR) approach, discussed in greater detail below, that computes the sequence of current and future routing and admission control decisions that maximize network utilization, while, in some embodiments, achieving max-min fairness among the base-stations sharing the network and preventing transient congestion that may be caused by re-routing.

Current and future mission-critical applications cannot sustain even instantaneous performance degradation, and therefore, predictive and dynamic networkwide processes are required. The approaches described herein achieve mechanisms to predict future network-wide link states from CML-obtained measurements, which can be used in relation to smart cities connectivity and 5G networks. The approaches described herein focus on backhaul and fronthaul networks which are currently transitioning to E-band (60-90 GHz) links, as well as new technology that are very sensitive to rain events. Unlike legacy (4G) cellular networks where local physical layer adaptation has been sufficient, in emerging smart city and 5G networks (that will require low latency and high bandwidth), link and network layer adaptations will be important. Thus, the approaches described herein provide for: 1) the establishment of a paradigm that uses the WCNs self-extracted attenuation measurements as sufficient data (although that data may be supplemented to achieve higher accuracy model) for the prediction of the link-channels states throughout the network, backed by the known relationships between, for example, the weather and the signal attenuation, and 2) presentation of a weather-sensitive cross-layered control processes/algorithms that can optimize network performance by controlling resources such as power, modulation, coding, channel allocation, and channel near real-time switching (that is, the propose approach can satisfy QoS requirements in response to predicted changes in network conditions, taking advantage of WCNs capabilities such as PAAM hardware use and IAB concepts). The approaches described herein are demonstrated in a typical scenario based on actual city-scale real-world WCNs measurements.

The approaches described herein can be used to realize stand-alone techniques that use past physical measurements available in the network management system, in order to optimize future performance of a multi-links (or multi nodes) network. Such optimization can support applications that require a fixed-level QoS (that is, one that does not change even if the environment conditions change). The approaches described herein realize the stand-alone solutions in the sense that no external information is needed (although such external information could be used to supplement the physical measurement data). The approaches and solutions described herein can use measurements from several links to infer about the future state of other links in the same area (and thus, it is not necessary to have access to measurements from all links). The approaches and solutions described herein can be implemented through a combination of one or more of the various techniques/processes described in greater detail below.

Accordingly, in some variations, a method is provided that includes obtaining measurement data from at least part of a wireless communication network during a first interval of time, with the measurement data including measurements indicating whether there are potential disturbances to operation of the wireless communication network. The method further includes determining, based on the obtained measurement data, predictive data representative of future performance of the wireless communication network at one or more future time instances subsequent to an end of the first interval of time, and managing resources of the wireless communication network based, at least in part, on the determined predictive data representative of the future performance of the wireless communication network at the one or more future time instances subsequent to the end of the first interval.

Embodiments of the method may include at least some of the features described in the present disclosure, including one or more of the following features.

Obtaining the measurement data may include measuring signal attenuation levels, over the first interval of time, at one or more of wireless links of the wireless communication network.

Measuring the signal attenuation levels may include measuring the signal attenuation level at regulars or irregular time periods within the first interval of time, with the signal attenuation level for a wireless node, $n_i$, at a time t within the first interval being computed as a difference between a transmitted signal power level (TSL) for a signal transmitted from a remote wireless node, $n_j$, and a received signal power level (RSL) for the signal received at the wireless node $n_i$.

Determining the predictive data may include determining the predictive data based on measured signal attenuation levels at the one or more wireless links, and further based on characteristics associated with two or more wireless nodes of the wireless communication network. The characteristics may include, for each of the two or more wireless nodes, available meta data, including one or more of, for example, geographic location, a frequency at which signals are transmitted, polarization attributes of the signal, coding technique applied to the signal, modulation technique applied to the signal, and/or adaptability of the two or more wireless nodes to adjust transmission power and/or adjust signal modulation.

Determining the predictive data may include determining the predictive data using a learning engine, trained using attenuation time-series data collected from multiple wireless links defined between one or more pairs of wireless nodes of the wireless communication network during dry and wet periods, applied to the measurement data obtained for the wireless communication network.

Determining the predictive data may include determining the predictive data representative of future attenuation behavior for wireless links defined between wireless nodes of the wireless communication network for H subsequent time instances following the end of the first interval.

Determining the predictive data using the learning engine may include deriving, using a Long Short-Term Memory (LSTM) encoder network, a fixed-length hidden state vector for a time instance in the first interval based on the measurement data obtained for the wireless communication network, and on a previous state vector computed for a previous set of measurement data, the LSTM encoder implementing a non-linear activation function to compute the hidden state vector. Determining the predictive data using the learning engine may further include applying an LSTM decoder to the hidden state vector to determine the predictive data representative of future attenuation behavior for the wireless links of the wireless communication network for the H subsequent time instances.

Managing resources of the communication network may include determining status of operation data for at least some wireless links defined for one or more pairs of the wireless nodes of the communication network, the status of operation data representative of likely degree of attenuation for the at least some wireless links at the one or more future time instances subsequent to the end of the first interval.

The method may further include controlling operational characteristics of a first wireless node, transmitting signals through a first wireless link, based on the status of operation data predicting at least some attenuation for the first wireless link but indicating the first wireless link remains available. Controlling the operational characteristics may include one or more of, for example, increasing transmission strength of the first wireless node, and/or reducing throughput for the first wireless node according through adjustments of signal coding and/or modulation techniques used by the first wireless node.

The method may further include identifying a first wireless link, from the at least some wireless links, predicted, based on the determined status of operation data, to be unavailable or to be operating at a lower capacity at a subsequent time instance, and identifying an alternative link for data transmission to re-route data from the first wireless link identified to be unavailable or to be operating at the lower capacity at the subsequent time instance. The alternative link may be selected from one or more other wireless links predicted, based on the determined status of operation data, to be available at a later time instance to the subsequent time instance at which the identified first wireless link is predicted to be unavailable or operating at the lower capacity.

Managing resources of the wireless communication network may include deriving throughput values between pairs of wireless nodes of the wireless communication network, to optimize an overall throughput at the future time instance of data traffic to and from one or more sink nodes of the wireless communication network, subject to predicted capacities of the wireless links of the communication network computed according to the predictive data of the future performance of the wireless communication network at the one or more future time instances following the end of the first interval, and configuring one or more of the wireless nodes based on the derived throughput values.

Deriving the throughput values between the pairs of wireless nodes of the wireless communication network may include deriving the throughput values between the pairs of wireless nodes of the wireless communication network subject to further constraints relating to pre-determined characteristics of the wireless communication network.

The pre-determined characteristics of the communication network may include one or more of, for example, known capacities of the wireless links, and/or known data traffic demand.

Managing the resources of the communication network based, at least in part, on the determined predictive data may include one or more of, for example: a) configuring one or more wireless nodes of the wireless communication network based on the predictive data, subject to the requirement that at least one identified wireless node maintains a specified quality-of-service (QoS) level, and/or b) switching between different channels configured for one or more wireless links based on the determined predictive data and on priority of services provided at one or more wireless nodes for which the one or more wireless links are established.

Managing the resources of the communication network based, at least in part, on the determined predictive data may include dynamically deriving, based on the determined predictive data, a sequence of network routing steps, during a future time window, to connect wireless nodes of the wireless communication network to achieve an optimized level of network traffic volume allowed through the communication network during the future time window.

Dynamically deriving the sequence of network routing steps may include deriving, based on the determined predictive data, network configuration data specifying a temporal sequence of links and respective flows on the links between the wireless nodes of the wireless communication network.

Dynamically deriving the sequence of network routing steps may include evaluating traffic volume performance for candidate sequences of link configurations between the wireless nodes during the future time window that maximizes a cumulative sum of network traffic volume flowing through the communication network subject to a constraint of a minimum traffic volume requirement allocated for data sources generating the traffic volume in the communication network.

Evaluating the traffic volume performance may be performed subject to a further constraint of minimizing transient congestion in the wireless communication network during the future time window.

Dynamically deriving the sequence of network routing steps may include determining the sequence of network routing steps based on a backward induction optimization approach, including dividing the future time window into two or more temporal sequential sections, determining a network routing optimization solution for a later section, from the divided two or more sequential sections, prior to determining a network routing optimization solution for an earlier section from the divided two or more sequential sections, and determining the network routing optimization solution for the earlier section based on the network routing optimization solution determined for the later section from the divided two or more sequential sections for the future time window.

Determining the network routing optimization solution for the earlier section may include identifying, for the time window of H sections, where H is an integer greater than 1, an optimal connectivity configuration for a first scenario in which a first re-routing step occurs at a discrete time n within the time window, and evaluating network performance for a set of candidate routing configurations for the wireless network in which an earlier re-routing step occurs at time n−1. Evaluating the network performance for the set of candidate routing configurations excludes candidate configurations inconsistent with the optimal connectivity configuration identified for the first scenario in which the first re-routing step occurs at the time n.

Determining the predictive data may include determining ambient conditions affecting the future performance of the communication network.

Determining ambient condition may include determining predicted weather patterns affecting the performance of the wireless communication network, including estimating spatial-temporal rain attenuation patterns predicted to impact the communication network.

The measurements indicative of potential disturbances to operation of the wireless communication network may be indicative of weather-related disturbances.

In some variations, a system is provided that includes a communication module to obtain measurement data from wireless nodes, forming at least part of a wireless communication network, during a first interval of time, the measurement data including measurements indicating whether there are potential disturbances to operation of the wireless communication network, and a processor-based resource management controller coupled to the communication module. The controller is configured to determine, based on the obtained measurement data, predictive data representative of future performance of the wireless communication network at one or more future time instances subsequent to an end of the first interval of time, and manage resources of the wireless communication network based, at least in part, on the determined predictive data representative of the future performance of the wireless communication network at the one or more future time instances subsequent to the end of the first interval.

Embodiments of the system may include at least some of the features described in the present disclosure, including at least some of the features described above in relation to the method, as well as one or more of the following features.

The system may further include the wireless nodes forming the at least part of the wireless communication network.

The controller configured to determine the predictive data may be configured to determine the predictive data based on measured signal attenuation levels at the one or more wireless links, and further based on characteristics associated with two or more of the wireless nodes of the wireless communication network, the characteristics including, for each of the two or more wireless nodes, available meta data, including one or more of, for example, geographic location, a frequency at which signals are transmitted, polarization attributes of the signal, coding technique applied to the signal, modulation technique applied to the signal, and/or adaptability of the two or more wireless nodes to adjust transmission power and/or adjust signal modulation.

The controller configured to determine the predictive data may be configured to determine the predictive data using a learning engine, trained using attenuation time-series data collected from multiple wireless links defined between one or more pairs of wireless nodes of the wireless communication network during dry and wet periods, applied to the measurement data. The predictive data may be representative of future attenuation behavior for wireless links defined between wireless nodes of the wireless communication network for H subsequent time instances following the end of the first interval.

The controller configured to manage resources of the communication network may be configured to determine status of operation data for at least some wireless links defined for one or more pairs of the wireless nodes of the wireless communication network, the status of operation data representative of likely degree of attenuation for the at least some wireless links at the one or more future time instances subsequent to the end of the first interval. The controller may additionally be configured to perform one or more of, for example: i) control operational characteristics of a first wireless node, transmitting signals through a first wireless link, based on the status of operation data predicting at least some attenuation for the first wireless link but indicating the first wireless link remains available, with the controller configured to control the operational characteristics being configured to cause one or more of, for example, increasing transmission strength of the first wireless node, and/or reducing throughput for the first wireless node according through adjustments of signal coding and/or modulation techniques used by the first wireless node, and/or ii) identify a first wireless link, from the at least some wireless links, predicted, based on the determined status of operation data, to be unavailable or to be operating at a lower capacity at a subsequent time instance, and identify an alternative link for data transmission to re-route data from the first wireless link identified to be unavailable or to be operating at the lower capacity at the subsequent time instance, the alternative link selected from one or more other wireless links predicted, based on the determined status of operation data, to be available at a later time instance to the subsequent time instance at which the identified first wireless link is predicted to be unavailable or operating at the lower capacity.

The controller configured to manage resources of the wireless communication network may be configured to derive throughput values between pairs of wireless nodes of the wireless communication network, to optimize an overall throughput at a future time instance of data traffic to and from one or more sink nodes of the wireless communication network, subject to predicted capacities of the wireless links of the wireless communication network computed according to the predictive data of the future performance of the wireless communication network at the one or more future time instances following the end of the first interval. The controller may further be configured to configure one or more of the wireless nodes based on the derived throughput values.

The controller configured to manage the resources of the communication network based, at least in part, on the determined predictive data may be configured to dynamically derive, based on the determined predictive data, a sequence of network routing steps, during a future time window, to connect wireless nodes of the wireless communication network to achieve an optimized level of network traffic volume allowed through the wireless communication network during the future time window.

The controller configured to dynamically derive the sequence of network routing steps may be configured to evaluate traffic volume performance for candidate sequences of link configurations between the wireless nodes during the future time window that maximizes a cumulative sum of network traffic volume flowing through the wireless communication network subject to a constraint of a minimum traffic volume requirement allocated for data sources generating the traffic volume in the wireless communication network.

The controller configured to dynamically derive the sequence of network routing steps may be configured to determine the sequence of network routing steps based on a backward induction optimization approach, including to divide the future time window into two or more temporal sequential sections, determine a network routing optimization solution for a later section, from the divided two or more sequential sections, prior to determining a network routing optimization solution for an earlier section from the divided two or more sequential sections, and determine the network routing optimization solution for the earlier section based on the network routing optimization solution determined for the later section from the divided two or more sequential sections for the future time window.

In some variations, non-transitory computer readable media is provided, that includes computer instructions executable on a processor-based device to obtain measurement data from at least part of a wireless communication network during a first interval of time, with the measurement data including measurements indicating whether there are potential disturbances to operation of the wireless communication network, determine, based on the obtained measurement data, predictive data representative of future performance of the wireless communication network at one or more future time instances subsequent to an end of the first interval of time, and manage resources of the wireless communication network based, at least in part, on the determined predictive data representative of the future performance of the wireless communication network at the one or more future time instances subsequent to the end of the first interval.

Embodiments of the computer readable media may include at least some of the features described in the present disclosure, including at least some of the features described above in relation to the method and to the system.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
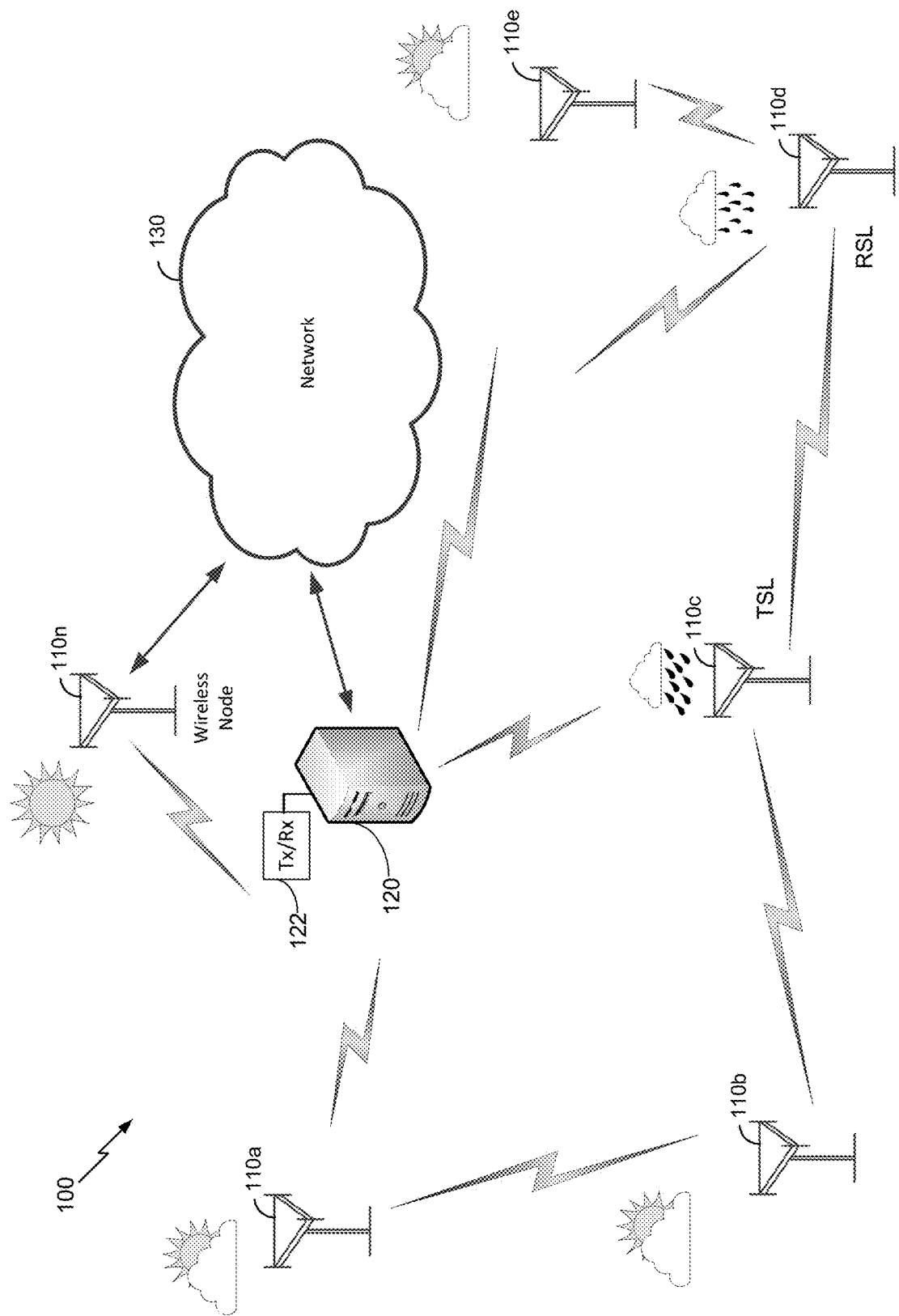
FIG. 1 is a diagram of an example network that can be controllably and dynamically configured to mitigate predicted network performance degradation.

Disclosed are systems, methods, and other implementations for predictive management of backhaul wireless communication network infrastructure (e.g., via mm Wave networks for 5G networks, 4G networks, and all other types of wireless networks). The systems and other implementations described herein use prediction models to determine future potential attenuations (caused by weather conditions, or by other factors) at various nodes, and respond accordingly using adaptive nodes (whose communications characteristics, including transmission power, coding schemes, etc., can be adjustably controlled), adaptive arrays, link rerouting, and network management controls to compensate for predicted attenuation/path loss. The implementations described herein are configured to incorporate weather-information obtained from the networks' own measurements of link characteristics (e.g., signal strength). This information is used to estimate performance degradation of microwave links between at individual nodes of the network, and to manage network use (traffic) accordingly. The measured information can also be used to estimate, extrapolate, and predict the rain-field in a high-tempo-spatial resolution, in near real-time, while using the cellular providers in-house management-tools measurements. These predictions, information regarding the current link states, information regarding the current and predicted traffic statistics, and traffic classes can serve as inputs for a weather-aware (e.g., rain-aware) dynamic network adjustment procedures. The network management procedures described herein can be based on a combination of: (i) using the in-house available networks' measurements, (ii) predictions regarding future channel states, and/or (iii) real-time link-level and network-level predictive adaptations.

In some examples, by monitoring the Tx and Rx signal-level at instant n of the available links, the signal attenuation at the links, as well as near-by links, at future time instances (greater than the instance n) due to weather-related phenomena (or other environmental or human factors) can be predicted. Such prediction data is, in turn, used to predict the future state of the wireless network, and to prepare the network for imminent disturbances, ahead of time. The implementations described herein are configured to controllably adjust the network's behavior/performance based on predicted/expected environmentally-related (e.g., weather-induced) attenuation, using a combination of local link solutions, such as automatic transmit power control and adaptive modulation coding, as well as dynamic channel switching, if required, to maintain optimal throughput possible. The approaches described herein provide a higher Quality of Service for the network, which is crucial for mission-critical future applications (e.g., smart cities critical infrastructure and autonomous car support). As will be discussed in greater detail below, experimentations and testing conducted for the approaches described herein, using a set of simulated scenarios which are based on real-world data collected by a city-scale 4G cellular network, show that the present approach can be implemented as a predictive network management system in real time.

Thus, with reference to FIG. 1, an example network 100 that can be controllably configured to mitigate predicted performance degradation (e.g., increased expected signal attenuation in wireless links) as a result of environmental factors (e.g., weather related factors, human factors, etc.) is shown. As illustrated, the network 100, includes multiple wireless nodes 110a-n deployed across a geographic area that can be of any size (city-sized area, county-sized area, a large rural region, etc.) and as such the various wireless nodes may be affected by different ambient conditions (e.g., different weather conditions). For illustration purposes only, the wireless nodes 110c and 110d are shown as being located in areas currently experiencing rain condition (with the device/node 110c located in an area experiencing more intense rain than the area where the wireless node 110d is located), the wireless nodes 110a, 110b, and 110e are located in areas that are currently partly overcast, while the wireless node 110n (n represents the total number of devices within the network 100 that can be controllably configured, and can be any integer number) is depicted as being located in area currently experiencing sunny conditions. Among other factors, precipitation (rain or snow) at a particular geographic area can impact the quality of transmission (causing signal degradation), but other ambient factors (temperature, barometric pressure, and so on) can also impact the quality of wireless transmission. As will be discussed in greater detail below, weather conditions can be used to model predicted wireless transmission behavior, and thus predict the network behavior at future points of time. While actual weather data may be used to control/manage the network (make preemptive adjustments to transmission power or throughput at individual nodes, or preemptively re-route various links), current attenuation behavior measured for currently operating links (and their variations from the baseline points) can be used instead of, or in addition to, actual weather data, to derive predictive data representative of the future behavior of wireless links. The prediction of wireless links' behavior can be short range, e.g., for time instances in the near future, or longer range, e.g., over several time instances spanning a relatively long period of time such as 1 hour, or 1 day.

The wireless nodes 110a-n may be any type of wireless device. In the example embodiments described herein. The wireless nodes establish commercial microwave links (CMLs) as part of the cellular backhaul underpinning the network. Such CMLs typically operate at frequencies of 6-40 GHz which are around the K-band frequency range, connect base stations, and cover entire countries. The wireless nodes may, in some embodiments, implement back-haul links at frequencies of 60-90 GHz, which are part of the E-band range (such links have gained popularity in smart cities). Other types of backhaul communication solutions can also be used. The wireless nodes 110a-n may include radio access network interfacing circuitry (to implement localized transmissions from the nodes to user equipment (UE) devices in the cellular area covered by the particular node according to any type of communication protocol or technology, including 2G, 3G, 4G, 5G, and various other communication technologies in licensed and unlicensed bands. For example, any of the wireless nodes 110a-n may be configured to establish WLAN-type communication channels with a UE, a WWAN-type connection, or a PWAN-type connection (e.g., a short-range personal wireless access network). A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), or any other 3GPP or IEEE standards (implemented over licensed and unlicensed frequency bands).

As further illustrated in FIG. 1, one or more of the various wireless nodes (and in some embodiments, all the wireless nodes) may establish a communication channel with a server 120 configured to control/manage the communication resources of the network 100. As will be discussed in greater detail below, the server 120 (e.g., a processor-based computing device) may be configured to obtain measurement data (via a communication module, schematically shown as the module 122, which may be a wireless transceiver and/or a network transceiver, e.g., to interface with wired network connections, electrically coupled to processor-based computing device) during a first interval of time. For example, the server 120 may obtain samples, from one or more of the wireless nodes 110a-n, at a plurality of time interval, spaced at regular or irregular sub-intervals in the first interval. The server 120 may obtain samples representative of measurement data of signal levels at the nodes defining the endpoints of a communication link. For example, the measured attenuation level for a wireless node, $n_i$, at a time t within the first interval is computed as a difference between a transmitted signal power level (TSL) for a signal transmitted from a remote wireless node, $n_j$, and a received signal power level (RSL) for the transmitted signal at the wireless node $n_i$. As noted, weather conditions, for example the occurrence of rain at some of the wireless nodes, will affect the channel quality, resulting in greater attenuation of a signal transmitted over a channel between the node 110c (shown transmitting signals at a power level of TSL) and the node 110d (shown receiving the signal with a power level of RSL) than would be the case under normal circumstance (e.g., at some pre-determined baseline of ambient conditions). In contrast, attenuation levels (or performance degradation) may be closer to normal/expected level for signals transmitted over a channel established between nodes 110a and 110b (or even for a signal transmitted between node 110b and the node 110c, where only part of the path will be subject to inclement weather conditions). In some embodiments, the communication module 122 may be configured to measure signal strength (e.g., RSL) of signals received from other nodes (e.g., any of the nodes 110a-n), and/or transmit signals whose strength can be measured or set. The server 120 can then use locally measured signals (the server 120 and/or its associated communication module 122 may be implemented at one or more of the wireless nodes 110a-n) to determine predictive data. In some embodiments, the predictive data may be generated based entirely on measurements data measured by the server 120 (for signals transmitted from one or more remote wireless nodes). Thus, in some situations, the onboard hardware for the server 120 (including the module 122) may be able to measure data with sufficient temporal resolution to determine predictive data for future performance of at least part of the network 100 in order to manage the network's resources.

Having obtained the measurement data, the server 120 is configured to determine, based on the obtained network measurement data, predictive data representative of future performance of the communication network comprising the wireless nodes at one or more future time instances subsequent to an end of the first interval of time. The predictive data may be determined using, for example, a learning engine, trained using attenuation time-series data collected from multiple wireless links defined between one or more pairs of the wireless nodes of the communication network during dry and wet periods, applied to the measurement data obtained for the communication network. In some embodiments, the predicted data may be derived using other types of optimization processes (e.g., ARIMA schemes), or filtering techniques. Such predictive data may thus represent future attenuation behavior for wireless links defined between the one or more pairs of the wireless nodes of the communication network for H subsequent time instances following the end of the first interval. An example of a learning engine (as will further be discussed below) is a Long Short-Term Memory (LSTM) encoder network that computes a fixed-length hidden state vector for a time instance in the first interval based on the measurement data obtained for the communication network, and on a previous state vector computed for a previous set of performance data, with the LSTM encoder implementing a non-linear activation function to compute the hidden state vector. Such a learning engine also includes an LSTM decoder that is applied to the hidden state vector to determine the predictive data representative of future attenuation behavior for the wireless links of the communication network for the H subsequent time instances.

Based on the predictive data, the server 120 is configured to manage the resources of the communication network for some period of time following the end of the first time interval during which measurements representative of the performance (e.g., attenuation levels) of the network 110 were taken. The management of the communication network 100 may include determining status of operation data for at least some wireless links defined for one or more pairs of the wireless nodes of the wireless communication network 100, with the status of operation data representative of likely degrees of attenuation for the at least some wireless links at the one or more future time instances subsequent to the end of the first interval. For example, the server 120 (or some other controlling circuitry) may control operational characteristics of a first wireless node, transmitting signals through a first wireless link, based on the status of operation data predicting at least some attenuation for the first wireless link but indicating the first wireless link remains available. Such controlling may include increasing transmission strength of the first wireless node, and/or reducing throughput for the first wireless node according through adjustments of signal coding and/or modulation techniques used by the first wireless node. Alternatively or additionally, the status of operation data for the various wireless nodes (at one or more future time instances) determined by the server 120 (based on the predictive data) may be used to identify a first wireless link, from the at least some wireless links, predicted, based on the determined status of operation data, to be unavailable at a subsequent time instance or to be operating at a lower (reduced) capacity, and to identify an alternative link for data transmission to re-route data from the first wireless link identified to be unavailable or operating at a reduced capacity at the subsequent time instance. The alternative link selected from one or more other wireless links predicted, based on the determined status of operation data, to be available at a later time instance to the subsequent time instance at which the identified first wireless link is predicted to be unavailable or operating at a reduced capacity.

In some embodiments, the server 120 may be configured to implement an optimal network topology switching procedure. In such embodiments, the server 120 may be configured to derive throughput values for wireless links between pairs of wireless nodes of the communication network, to optimize an overall throughput of data traffic to a sink node of the communication network at a future time instance, subject to constraints relating to pre-determined characteristics of the communication network (e.g., known capacities of the wireless links, or known data traffic demand), and to configure one or more of the wireless nodes based on the derived throughput values. In deriving the throughput values, the server may derive throughput values between the pairs of wireless nodes of the communication network, to optimize the overall throughput at a future time instance of data traffic to a sink node of the communication network, subject to predicted capacities of the wireless links of the communication network computed according to the predictive data of the future performance of communication network at the one or more future time instances following the end of the first interval. In some additional examples, the server 120 configured to manage the resources of the communication network based, at least in part, on the determined predictive data is adapted to configure one or more of the wireless nodes of the communication network based on the predictive data subject to the requirement that at least one identified wireless node maintains a specified quality-of-service (QoS) level. Alternatively or additionally, the server may be adapted to switch between different channels configured for one or more wireless links based on the determined predictive data and on priority of services provided at one or more wireless nodes for which the one or more wireless links are established.

In some examples, the server 120 may be configured to implement a Multi-Step Network Reconfiguration approach discussed in greater detail below. In such examples, the server 120 may be configured, in the course of managing the resources of the communication network 100, to dynamically derive, based on the determined predictive data, a sequence of network routing steps, during a future time window, to connect wireless nodes of the wireless communication network to achieve an optimized level of network traffic volume allowed through the communication network during the future time window. The server 120 configured to dynamically derive the sequence of network routing steps may be configured to derive, based on the determined predictive data, network configuration data specifying a temporal sequence of links and respective flows on the links between the wireless nodes of the wireless communication network.

In some embodiments, the server 120 configured to dynamically derive the sequence of network routing steps may be configured to evaluate traffic volume performance for candidate sequences of link configurations between the wireless nodes during the future time window that maximizes a cumulative sum of network traffic volume flowing through the communication network subject to a constraint of a minimum traffic volume requirement allocated for data sources generating the traffic volume in the communication network. Evaluation of the traffic volume performance may be performed subject to a further constraint of minimizing transient congestion in the wireless communication network during the future time window.

In some examples, the server 120 configured to dynamically derive the sequence of network routing steps may be configured to determine the sequence of network routing steps based on a backward induction optimization approach, that includes dividing the future time window into two or more temporal sequential sections, determining a network routing optimization solution for a later section, from the divided two or more sequential sections, prior to determining a network routing optimization solution for an earlier section from the divided two or more sequential sections, and determining the network routing optimization solution for the earlier section based on the network routing optimization solution determined for the later section from the divided two or more sequential sections for the future time window. The server 120 configured to determine the network routing optimization solution for the earlier section may be configured to identify, for the time window of H sections, where H is an integer greater than 1, an optimal connectivity configuration for a first scenario in which a first re-routing step occurs at a discrete time n within the time window, and evaluating network performance for a set of candidate routing configurations for the wireless network in which an earlier re-routing step occurs at time n−1. Evaluation of the network performance for the set of candidate routing configurations excludes candidate configurations inconsistent with the optimal connectivity configuration identified for the first scenario in which the first re-routing step occurs at the time n.

While the server 120 is depicted in FIG. 1 as a stand-alone station or node, the server 120 can be part of any of the various wireless nodes (e.g., it may be housed with the circuitry constituting the wireless node 110$n$, which is shown as a node with a direct connection to a network 130 (which may be a packet-based network, a telephony network, or any other type of network to communicate signals over long distances). In some examples, the server 120 may be a distributed system in which the various operations are performed at multiple computing/controller devices (with such multiple devices housed at one or more wireless nodes 110$a$-$n$, or at some other location not specifically illustrated in FIG. 1). The server 120 may be configured to communicate with the wireless nodes either directly (through dedicated separate links to each of the wireless nodes 110$a$-$n$), or indirectly through connections passing through intermediate points. Communications links between the server 120 and any of the nodes or the network illustrated in FIG. 1 may be realized as wired or wireless links. The server 120 may thus be configured to establish communication links with one or more of the nodes, to communicate data and/or control signals to those nodes (e.g., control signals to control communication characteristics such as transmission power, or various other communication parameters affecting operation of the nodes), and receive data and/or control signals from those nodes (including measurement data representative of attenuation levels for wireless links between nodes). The server 120 may also be configured to receive data from other sources (such as a server maintaining current weather information) that it may use when deriving predictive data about the future performance of the communication network 110.

More specificity and details regarding the operations of the network 100 will now be described.

Predictive Performance for Wireless Networks

As noted, CMLs suffer from induced channel attenuation due to the susceptibility of the microwave signal to weather phenomena. The expected signal attenuation as a function of the frequency due to different atmospheric and weather phenomena is described by the International Telecommunication Union (ITU), with the dominant factor of the CML channel attenuation being rain. The rain induced attenuation can be modeled by a standard Power-Law relationship, which relates the rain rate at time t, with the instantaneous induced channel attenuation (in dB) at that time. This simplified power-law relationship can be used to approximate the rain-induced attenuation for Line-of-Sight (LOS) microwave and mmWave links during the design phase of the cellular networks based on historic statistical meteorological data and the ITU recommendations (e.g., withstand expected attenuation caused by rain-intensity lower or equal to the 99.99th percentile). However, during strong rainfall and extreme weather events, the weather-induced attenuation will be sufficiently high for some of the CML's to become unavailable. These scenarios are becoming more common, as part of the global warming trend results in an increase of extreme weather events. Furthermore, for shorter links in the higher frequencies (E-band) (which are generally located in urban areas), the power law approximation for rain induced attenuation is much less accurate. Moreover, in such scenarios, the dependence of the CML signal level on weather is more complex.

The model of attenuation in a CML as a function of rainfall is an important tool for the design of legacy backhaul networks. Additionally, standard CMLs that can be viewed as opportunistic sensors for rain monitoring purposes. For example, CMLs can be used to detect and classify rainy periods, distinguishing them from dry periods, and to measure the rainfall accurately in various scenarios. Movement of rain can be predicted and extrapolated using, for example, the advection-diffusion model, optical flow, or tools such as Kalman filters.

In the approaches and solutions described herein, automated techniques for wireless communication networks management are implemented. Such approaches include wireless communication networks (WCNs) network management systems (NMS) to implement a set of automated processes that, as part of the network management schemes, are designed to adapt the network operations, in real-time, against sudden disturbances and drops in the CMLs signal strength. Two examples of NMSs that deal with the CMLs signal drops using two local/physical, link-level techniques, include:
 1) Automated power transmit control (ATPC) system: This system can increase the transmitted power, Tx, of the CML signal as needed (up-to a pre-defined limit), once the received signal, Rx, drops below a certain predefined threshold.
 2) Adaptive modulation and coding (AMC) system: This system automatically switches the modulation of the CML signal based on channel conditions.

The ATPC and the AMC systems can be implemented as stand-alone processes or as a combined solution. It is worth noting that while that the ATPC will not harm the CML designed throughput, implementation of a different modulation by the AMC in order to maintain a given bit error rate (BER), might reduce the CML throughput (an example would be to drop the channel modulation to a lower QAM scheme). Both the ATPC and the AMC are local-level algorithms/processes, which means that they act on independently on every CML whose hardware support it, based on the specific conditions of the specific CML channel. Both the ATPC and the AMC algorithms can cope with short-term mild to moderate channel fading events. However, more significant or severe fading, which occurs during strong rain events, can result in significant CML throughput decrease, and in extreme cases, the CML might completely fail and become unavailable. Such decreases may not be fully mitigated via local adaptations once a CML fails, rerouting switching at the network layer could be realized. Some 4G WCNs can be configured to adopt a mesh topology, as are future smart cities and 5G WCNs. Thus, with the support of controllers (e.g., software-defined-systems (SDN)), network-wide rerouting can be realized. Furthermore, specialized hardware, such as the novel phased array antenna module (PAAM), concepts such as the microwave and mmWave integrated access and backhauling (IAB) in 5G introduce new capabilities of real-time ad-hoc CMLs realization. Such approaches of both local physical/link layer-based adaptations and network layer rerouting/switching are based on monitoring the network, and can be implemented herein in a preemptive manner, before performance degradation reaches a point that disrupts the wireless communication network in an unacceptable manner.

The technology described herein thus provides a weather-sensitive prediction approach for rain attenuation in microwave and millimeter wave (mmWave) networks. The implemented model uses established commercial microwave links to gather data on rainfall monitoring and weather patterns. Machine learning and the cross-layered processes then integrate this data to predict, for example, spatial-temporal rain attenuation patterns. The technology described herein allows providers to predict weather patterns that may interfere with network performance, and preemptively adjust and reroute their systems.

Figure 2:
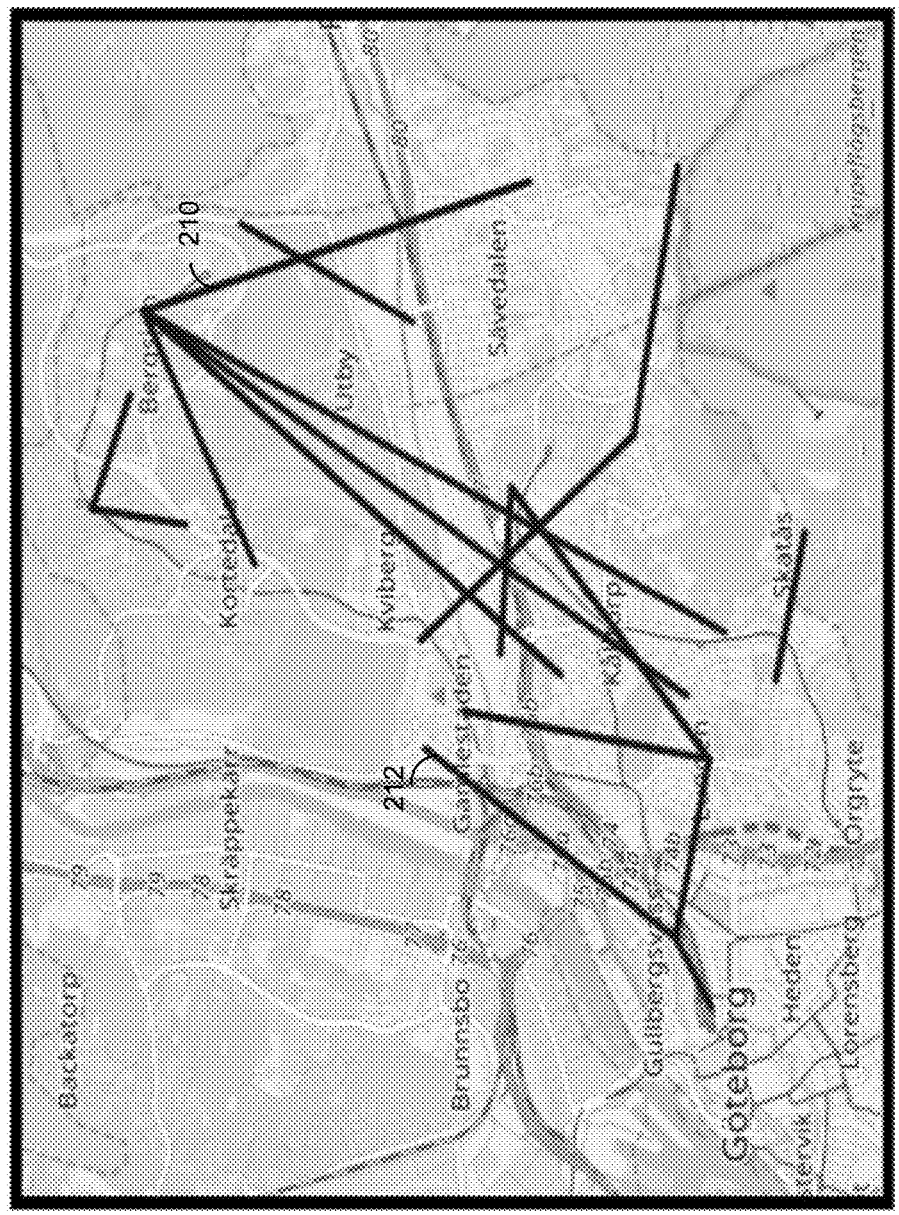
FIG. 2 is a map of an actual CMLs network that is a part of an actual cellular network in Gothenborg, Sweden.
Figure 3:
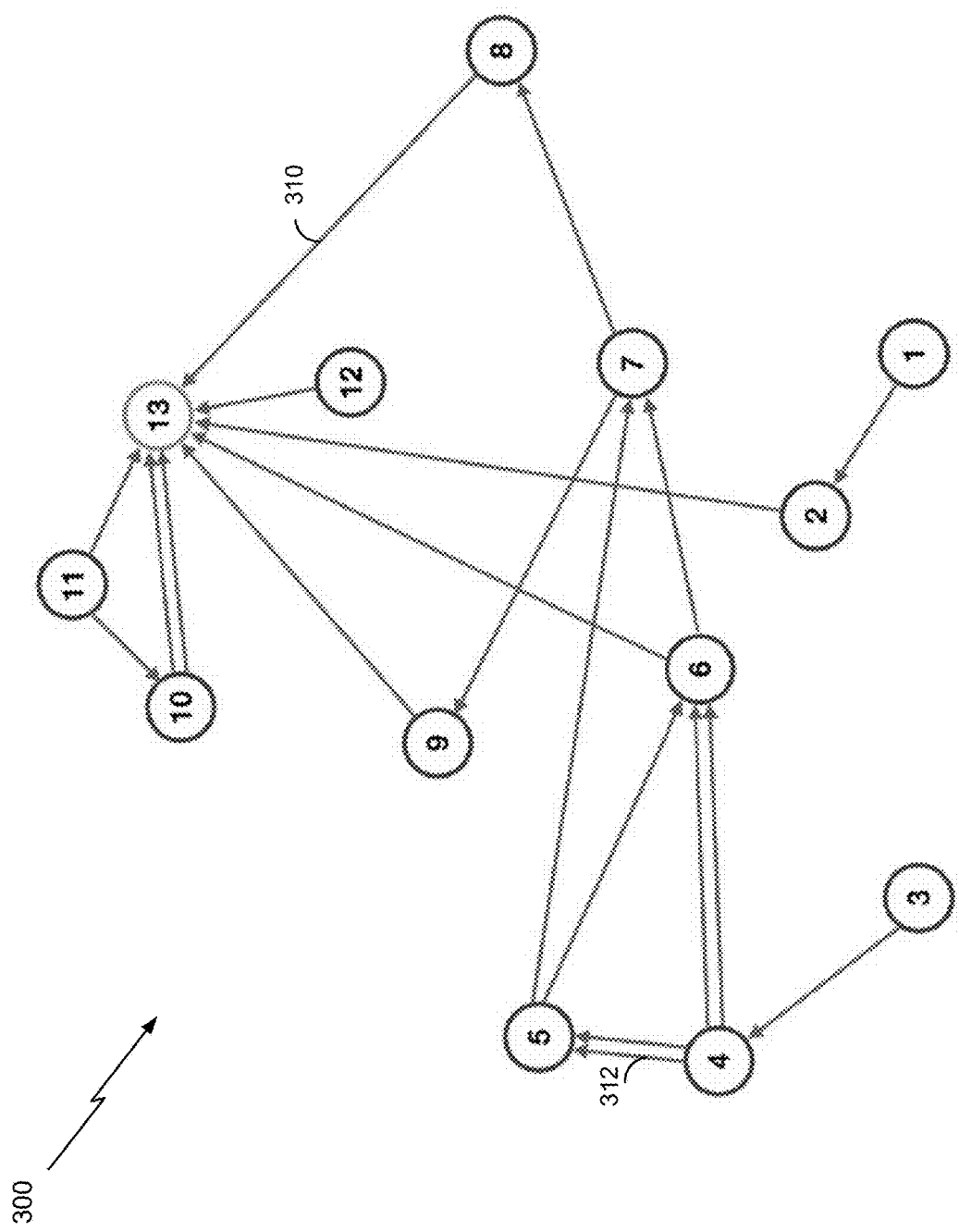
FIG. 3 is network connectivity diagram corresponding to the CML network of FIG. 2.

To help illustrate the approaches described herein for implementing a new predictive network management solution, reference is made to FIG. 2, which shows a map of an actual CMLs network (illustrated as lines, such as example lines 210 and 212, indicating the microwave links between various deployed wireless nodes) which is a part of an actual 4G cellular network 200 in Gothenborg, Sweden. This 4G formation was adapted to create a high connectivity network 300, schematically shown in FIG. 3. As can be seen, the parameters (e.g., location of the nodes, size, etc.) of the high connectivity network 300 resemble the original 4G network 200 of FIG. 2. FIG. 3 shows, for example, the links 310 and 312, which correspond to the links 210 and 212 illustrated in FIG. 2 (not all the links depicted in FIG. 3 are marked in the map-based link layout of FIG. 2). The network 300 represents the available CML network links of FIG. 2 as a mesh-like directional graph. In FIG. 3, the node 13 is the sink node, i.e., a node that provides a connection to a long-distance wired network, such as a packet-based network or a telephony network, and through which data traffic (between the wireless nodes of the network 300 and the wired network) passes. As shown in FIG. 3, the edges 4→5, 4→6, and 10→13 include dual CMLs, and are thus treated as an edge with twice the nominal single CML capacity. For the network 300, the available TSL and RSL measurements collected by the CMLs hardware in this network is used to determine predictive data to dynamically control the network 300. The experimental dataset used is based on actual CMLs measurements and meta-data collected by Ericsson AB. The available data that was included during evaluation and testing of the present implementations described herein includes, apart from the time series of the Tx and Rx per CMLs, also the meta-data of the network, which provides the CMLs' physical features, such as length, location (longitude and latitude), frequency, and polarization.

The data set used to derive the predicted data that was tested in the evaluations of the implementations described herein includes records of the transmitted signal power level (TSL) and received signal power level (RSL) measurements (in dB), samples at a time of ΔT=10 seconds. The total attenuation level $A_t^{(n_i)}$ (in dB) for the time step t in each CML can be computed according to:

$$A_t^{(n_i)} = TSL_t^{(n_j)} - RSL_t^{(n_i)}$$

where $n_j$ is the transmitter node at one end of a CML link, and $n_i$ is the receiver. Other formulations to represent the attenuation level experienced on links, or otherwise to represent the performance (or performance degradation) of the network, may be used.

Based on attenuation levels computed (e.g., according to the attenuation formulation provided above), prediction data representative of the network performance can be generated. For example, in some embodiments, a rain-induced attenuation prediction using machine learning approaches may be implemented to derive the predictive data. By using the attenuation time-series data collected from multiple wireless links during dry and wet periods, an artificial neural network (ANN), such as one based on a recurrent neural network (RNN) model, can be trained to predict the sequence of future signals attenuation for each CML given the previous values measured by the network.

Thus, given the observations $(y_1, y_2, \ldots, y_t)$, the goal is to determine (learn) a function $f(\bullet)$ which will output multi-step-ahead predictions for the next H expected attenuation values in each CML $(y_{t+1}, \ldots, y_{t+H})$, namely, $$\hat{y}_{t+h} = f(X_t) + \varepsilon_t$$

In the above formulation $X_t$ represents all the available observations until time t. $h \in (1, \ldots, H)$, and $\varepsilon_t$ represents arbitrary noise at time step t.

The learning model implemented may be one employing an Encoder-Decoder model, which is designed as sequence-to-sequence model. A model to solve a multi-step time series forecasting problems can be referred as sequence-to-sequence learning task, where a sequence of values for a range of future interval is predicted.

Figure 4:
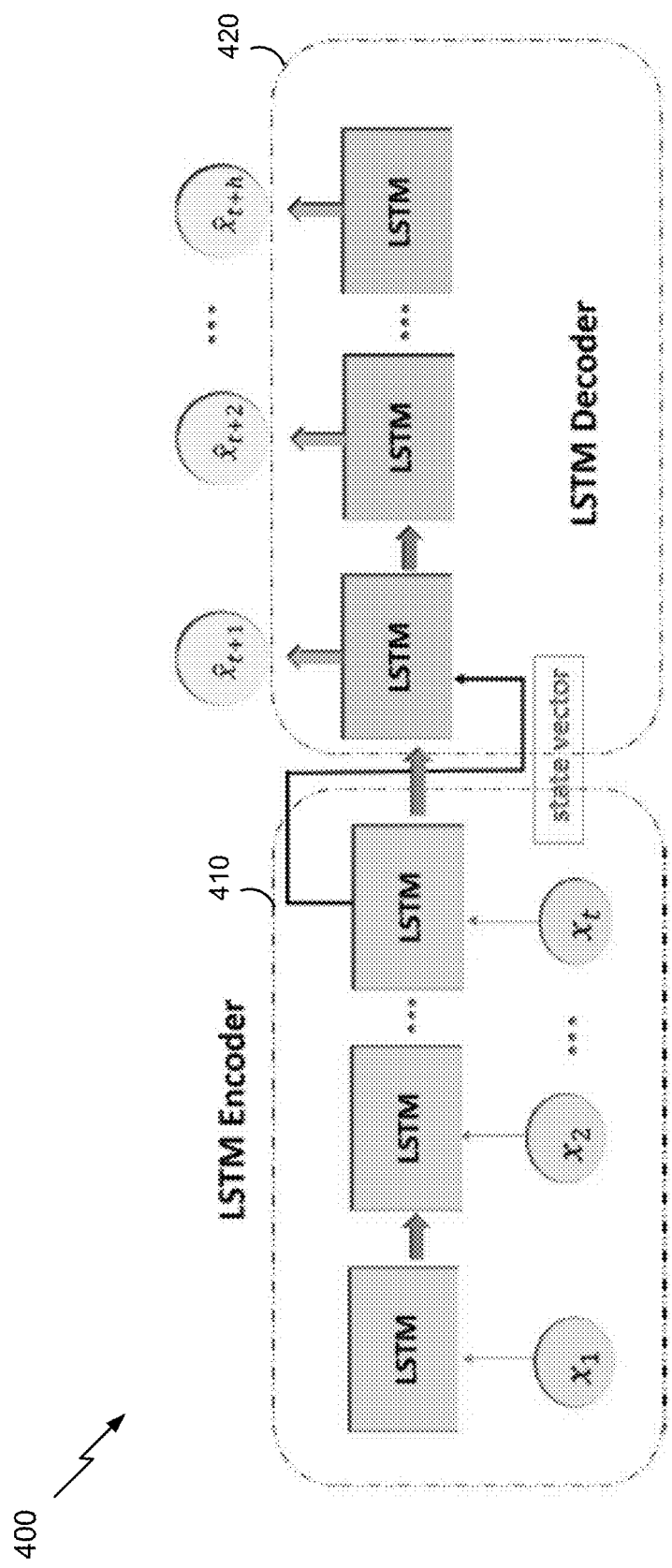
FIG. 4 is a schematic diagram of an LSTM encoder-decoder architecture to determine multi-step predictive performance data for a wireless communication network for multiple future time instances.

In one example embodiment of an RNN-based implementation, a multivariate time series framework for multistep prediction is realized based on an LSTM encoder-decoder architecture. FIG. 4 is a schematic diagram of an LSTM encoder-decoder architecture 400 to determine multi-step predictive performance data for a wireless communication network for multiple future time instances. The architecture 400 uses two LSTM networks, 410 and 420, to generate a future sequence of values.

Let $x_t = (A_t^1, A_t^2, \ldots, A_t^M) \in R^M$ be the vector attenuation values measured in time step t (representing the attenuation values measured for each of the CML links of a network, such as the networks 100-300 of FIGS. 1-3). The encoder 410 reads the input sequences $X_t = (x_1, x_2, \ldots, x_t)$, and produces an encoded version of the inputs, as a fixed-length vector, through the hidden state vector of the LSTM cell ($h_t$). The hidden state is updated in each time step by:

$$\hat{h}_t = f_h(h_{t-1}, X_t)$$

The function $f_h$ is a non-linear activation function, that computes the current hidden state from the inputs and the previous hidden state. At The next LSTM network, the decoder 420, uses this state vector representation to derive the predicted values at future time steps, from the encoded space. A fully connected (FC) layer interprets the decoder's output sequence and final output layer to predict the H time steps, $X_t = (\hat{x}_{t+1}, \hat{x}_{t+2}, \ldots, \hat{x}_{t+H})$.

During training, the $l_2$ norm between the network predictions in each time step and the observed attenuation values $Y_t$, is used as the objective function:

$$L = \|Y_t - \hat{Y}_t\|_2^2$$

Figure 5:
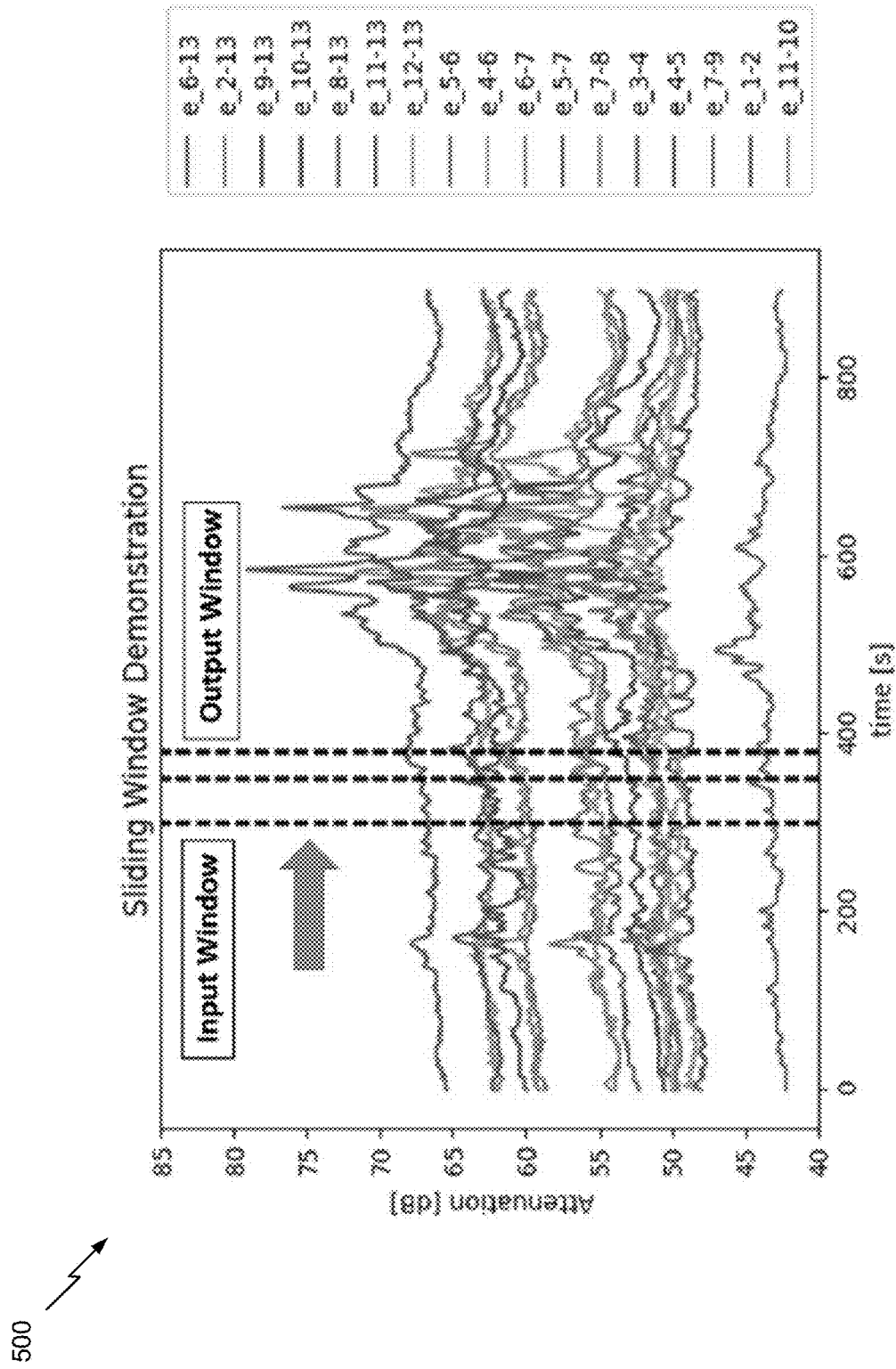
FIG. 5 is a graph illustrating a sliding-window concept for preparing a multivariate time series input sequences for a supervised learning task.

The model is trained so as to minimize the objective function over all the available training dataset. In some embodiments, a sliding window scheme may be used to split the training data to sub-sequences of inputs and outputs to modify the multi-step prediction problem into a supervised learning task. Consider an input window size of T, the input to the model in each time step is composed of the T samples of each link. For an output window of size H, the target sequence of the RNN is the next H observations in each link. In FIG. 5, a graph 500 illustrates the concept of the sliding-window used for preparing a multivariate time series input sequences for supervised learning task, where the y-axis is the total attenuation measured in each link. Each time series represents the total attenuation measured in a given CML. Each CML has a different base-line attenuation level, which corresponds to its physical properties such as the length and frequency. A min-max scaling can be used to normalize each feature (i.e., each time series of attenuation) as follows:

$$x_{scaled} = \frac{x - x_{min}}{x_{max} - x_{min}}$$

Although the above example embodiment generates the predictive data via an LSTM encoder-decoder model of an RNN-based learning engines, other types/configurations of artificial neural networks may be used in place of the embodiment described herein. Other types of learning engines that may be used to generate predictive performance data include convolutional neural networks (CNN), and feed-forward neural networks. Feed-forward networks include one or more layers of nodes ("neurons" or "learning elements") with connections to one or more portions of the input data. In a feedforward network, the connectivity of the inputs and layers of nodes is such that input data and intermediate data propagate in a forward direction towards the network's output. Unlike an RNN configuration, there are typically no feedback loops or cycles in the configuration/structure of the feed-forward network. Convolutional layers allow a network to efficiently learn features by applying the same learned transformation(s) to subsections of the data. Neural networks can be implemented on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's, which can be programmed according to, for example, a CUDA C platform), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural networks, processes, and methods described herein. The computing platforms used to implement the neural networks typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

The various learning processes implemented through use of the neural networks described herein may be configured or programmed using, for example, TensorFlow (an open-source software library used for machine learning applications such as neural networks). Other programming platforms that can be employed include keras (an open-source neural network library) building blocks, NumPy (an open-source programming library useful for realizing modules to process arrays) building blocks, etc.

Predictive Node Operation Status

As noted, once the predictive data is generated (e.g., using a learning engine, based on measurement data collected by wireless nodes of the wireless communication network), the wireless network's resources (e.g., operation, configuration, and routing information for the wireless nodes of the network) can be managed. In some embodiments, status of operation data (representative of likely degree of attenuation for the at least some wireless links at the one or more future time instances subsequent to the end of the first interval) is determined. For example, predicted future attenuation can be used to assign, for each time-step n and for each CML of a given wireless communication network, the following operation status classes:

Blue: The CML operates normally and supports 100% of the designed throughput.

Green: The CML signal is attenuated to some degree, but, the available ATPC system is capable of increasing the transmitted signal such that the CML still supports 100% of its designed throughput.

Yellow: The CML signal is strongly attenuated. The CML still supports data transmission, but only due to the AMC system. Thus, the CML is to operate at a lower throughput than designed.

Red: The CML is unavailable, due to severe attenuation of the signal. Local link-level solutions (e.g., ATPC and AMC) are unable to counter-effect the rain-induced attenuation destructive effects on the CML.

An example classification process is provided below.

```
// Input M is the number of CMLs
// Input S_i is the status of the i^th CML (on/off)
// Input ATPC_i is the ATPC status of the i^th CML (on/off)
// Input AMC_i is the AMC status of the i^th CML (on/off)
// Output L_i is the state of the i^th CML
1     for i ← 1 to M do
2       if S_i is "on" then
3         if ATPC_i is "on" then
4           if AMC_i is "on" then
5             L_i = Yellow
6           else
7             L_i = Green
8           end
9         else
10          L_i = Blue
11        end
12      else
13        L_i = Red
14      end
15    end
```

Other classification schemes to represent the status of operation of links and/or nodes, along with resource management schemes that are based on other classification schemes, may be used instead of, or in addition to, the above-described 4-class (color designated) scheme.

Figure 6:
FIG. 6 is a diagram showing a predicted changing status of operation for five wireless links.

The specific threshold for each CML, in which its status of operation changes between each of the classes, and in which the local level control processes/algorithms operate (e.g., the ATPC strength, or the AMC current QAM scheme) may be predefined based on the links' hardware profile, and may implement a hysteresis-like range for the assignment of the different status of operation, in order stabilize the algorithm and prevent rapid fluctuations between different AMC QAM schemes. FIG. 6 is an example diagram 600 showing the predicted changing status of operation for five (M=5) wireless links, as may have been determined based on predicted performance data derived (e.g., using a learning machine, or via some optimization or filtering procedure) from measurement data provided by the wireless nodes of the communication network (such as the communication network shown in FIGS. 1-3). Thus, in the example embodiments in which resource management is based on a classification mechanism/scheme such as the one described above and depicted in FIG. 6, resource management may include controlling operational characteristics of a first wireless node, transmitting signals through a first wireless link, based on the status of operation data predicting at least some attenuation for the first wireless link but indicating the first wireless link remains available, with controlling the operational characteristics comprising one or more of, for example, increasing transmission strength of the first wireless node, or reducing throughput for the first wireless node according to adjustments of signal coding and/or modulation techniques used by the first wireless node.

Link Rerouting Approach Based on Node Status of Operation

Figure 7:
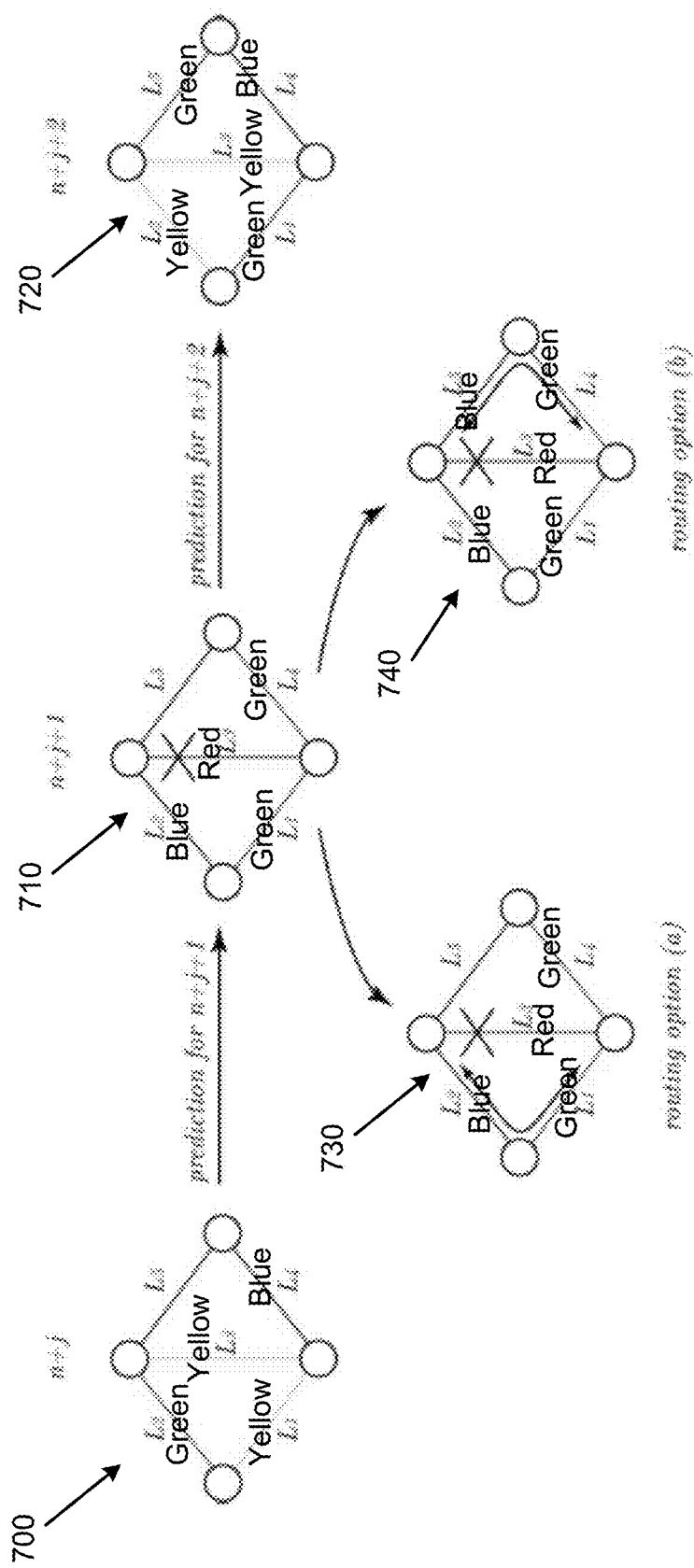
FIG. 7 includes diagrams of an example of a network-level rerouting approach, based on the status of operation classification illustrated in FIG. 6.

Instead of, or in addition to performing local resource management through control of the operational characteristics of individual wireless nodes, network-level control may also be performed. Consider again the above color-based classification process in which at each time-step, n, the classification process produces for each of the CMLs an operational status for time-steps $i \in \{n, n+1, \ldots, n+j\}$, where j is the maximal future CMLs performance (e.g., attenuation) prediction time-step. Based on this information, 5G IAB rerouting algorithms, implemented for future time-steps as well, may be used to mitigate network data flow issues when one or more of the wireless links are predicted to be not available or to have reduced-capacity (e.g., links with yellow or red status levels). With reference to FIG. 7, diagrams of an example network-level predictive weather-aware rerouting approach, based on the color-coded status of operation classification described herein, are shown. Diagram 700 illustrates a network of 5 CMLs at t=0. At that time instance, all the CMLs are operational at different states as indicated by their colors. Next, and with reference to diagram 710, the prediction process returns the network state at the next time step: t=1. As can be seen, at that point, L3 is predicted to be unavailable. Therefore, a rerouting to bypass L3 is initiated prior to its disconnection. In this example, there are two possible routes: L2→L1 (routing option (a) depicted by diagram 730), or L5→L4 (routing option (b) depicted by diagram 740). No single route is currently (at t=1) preferable to the other. On the other hand, the predictive process is not confined to a single time-step prediction, and can produce a prediction for t=2 (as shown in diagram 720) as well. However, the error of such prediction increases with each future time-step, and, as will be discussed in greater detail below, the accuracy of the prediction as a function of the time can impact the algorithm implementation. In the network state prediction of t=2, it can be seen that L2 is predicted to move to a Yellow state. Therefore, this predictive information will result in the selection of routing option (b), to minimize future throughput reduction. It is to be noted that if the future throughput demand is assumed to be known (or can be estimated to a high degree of accuracy), it is possible to expand the implementation of the proposed network level control process to the more general case in which it operates on the entire range of the CMLs (e.g., allowing switching of every link, including Green and Blue ones), in order to provide an optimal flow solution for the given demands. Thus, in embodiments in which a network level resource management is implemented, the resource management may include identifying a first wireless link, from the at least some wireless links, predicted, based on the determined status of operation data, to be unavailable or to be operating at a lower capacity at a subsequent time instance, and identifying an alternative link for data transmission to re-route data from the first wireless link identified to be unavailable or to be operating at the lower capacity at the subsequent time instance. The alternative link may be selected from one or more other wireless links predicted, based on the determined status of operation data, to be available at a later time instance to the subsequent time instance at which the identified first wireless link is predicted to be unavailable or operating at the lower capacity.

Network Rerouting Approach Based on Maximum Concurrent Flow

Figure 8:
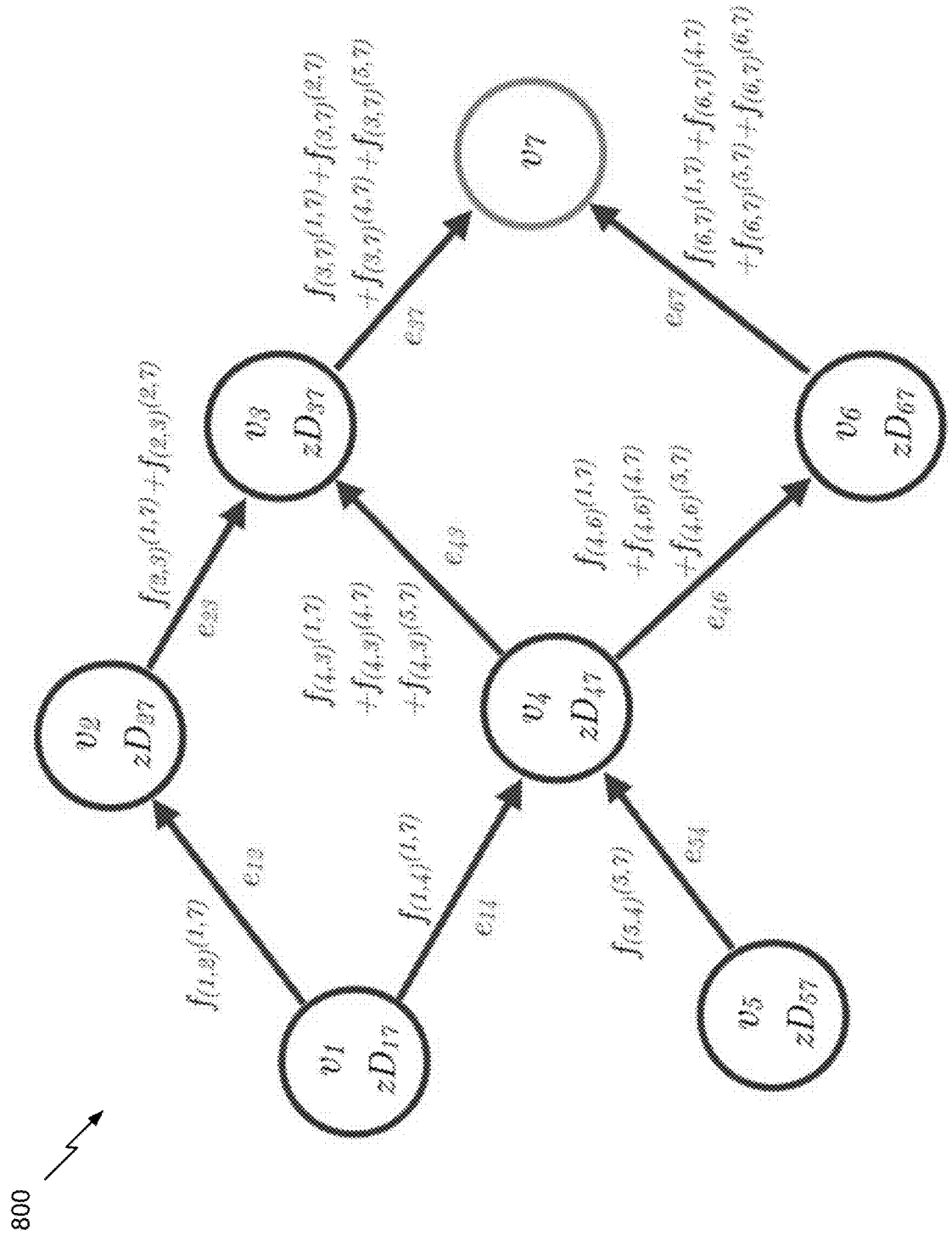
FIG. 8 is a diagram of an example network on which a dynamic switching process is performed.

If it is assumed that the throughput is not sequential—that is, it can be split between more than a single stream of data, it is possible to use all the operational links in a given time-step, including yellow links, and to use the available capacity of each. In a general case situation, in which it is assumed that the demands are known, and that data streams can be split between multiple links, a dynamic switching algorithm, e.g., one based on an adaptation of the maximum concurrent flow problem (MCFP) may be used. FIG. 8 shows a diagram of an example network 800, with respect to which a dynamic switching process is performed, as more particularly described below.

A network (graph) is defined by G=(V, E), with V vertexes (nodes), V={$v_1, v_2, \ldots, v_N$} and {E} arcs (edges) (as shown in FIG. 8). Define the requested demand from each of the nodes, $v_i : \forall i \in \{1, 2, \ldots, N\}$ to the Sink node $v_N$, by $D_{iN}$ (the sink node may, in some embodiments, be the node that is directly, e.g., through a wired connection, linked to a long-haul network, such as a telephony or a packet network; a wireless network, such as the networks described herein, may have more than one sink node). Let $f_{(k,l)}^{(i,N)}$ be the flow of commodity between the nodes i and N, flowing on the edge $e_{(k,l)}$. Let $c_{(k,l)}$ be the (maximum) capacity of the edge $e_{(k,l)}$. The concurrent flow throughput factor is defined by $0 \leq z \leq 1$.

The goal of the dynamic switching process is to maximize z, subject to the following constraints: for every node $l \in 1 \leq l \leq N$, and for every node $i \in 1 \leq i \leq N$:

$$\forall l \in \{1, \ldots, N\}; \forall i \in \{1, \ldots, N\}:$$

$$\sum_{k=1}^{N} f_{(k,l)}^{(i,N)} - \sum_{m=1}^{N} f_{(l,m)}^{(i,N)} = \begin{cases} -zD_{iN}, & l = i \\ +zD_{iN}, & l = N \\ 0 & \text{otherwise} \end{cases}$$

$$\sum_{i=1}^{N} f_{e_{(k,l)}}^{(i,N)} \leq c_{(k,l)}, \forall e_{(k,l)} \in \{E\}$$

The solution is the specific values for the non-zero set of $f_{(k,l)}^{(i,N)}$, and the achievable maximum value of z.

If a solution can be found in which z=1, then the network is able to provide the full required throughput (note that the maximum z which is physically viable is 1). On the other hand, if the solution is such that z<1, then the full throughput required by the nodes cannot be provided. In that case, since the optimization problem which yielded the maximum value of z was solved, the determined non-zero set of $f_{(k,l)}^{(i,N)}$ is deemed to be the optimal set (with respect to the MCFP).

Figure 9:
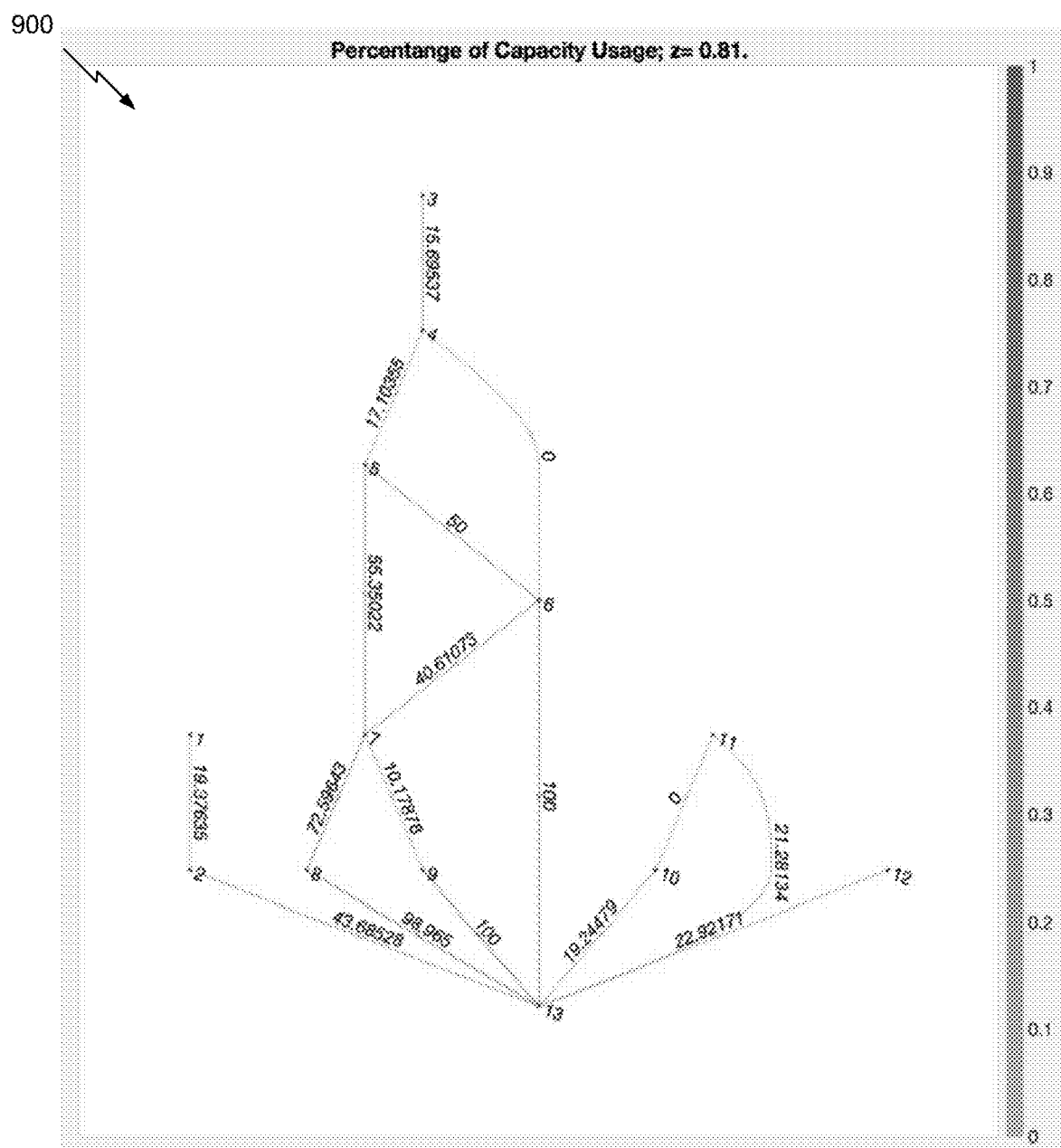
FIG. 9 is a diagram illustrating a single-step solution for a maximum concurrent flow problem (MCFP) for a wireless communication network.

In order to solve the MCFP, standard linear programming-based tools may be used. To illustrate, considered an actual patch taken from a 4G cellular network infrastructure (that patch is located in Gothenborg, Sweden, illustrated in FIG. 2, and has an area of roughly 10×10 km², which is a nominal area in which the predictive attenuation process yields accurate predictions). The network topology is similar to the topology depicted in FIG. 3. A resultant single-step solution for the MCFP process for the network tested is illustrated for a network diagram 900 of FIG. 9. The results provided in FIG. 9 were generated through a linear programming procedure, taking into account known demands and link capacities. For the purposes of deriving the solution, the following randomly generated commodity demands between each of the nodes to the sink (node 13) were used: (1) 0.1691, (2) 0.2122, (3) 0.1938, (4) 0.2285, (5) 0.2280, (6) 0.1773, (7) 0.1777, (8) 0.2302, (9) 0.2458, (10) 0.2376, (11) 0.1858, and (12) 0.2001. In this scenario, the capacities of the edges were as follows: $e_{0102}$-0.707, $e_{0213}$-0.707, $e_{0304}$-1, $e_{0405}$-2, $e_{0406}$-2, $e_{0506}$-0.5, $e_{0507}$-0.5, $e_{0607}$-0.354, $e_{0613}$-0.25, $e_{0708}$-0.707, $e_{0709}$-0.5, $e_{0813}$-0.707, $e_{0913}$-0.25, $e_{1013}$-1, $e_{1110}$-0.707, $e_{1113}$-0.707, $e_{1213}$-0.707. The solution of the MCFP linear programming algorithm was found to be z=0.81. In FIG. 9, the values written on each of the edges, and the respective shades, represent the percentage of the available capacity used by the edge. The shade bar indicates the capacity used: 0→1:0%→100% used.

Looking at FIG. 9, it can be seen that the solution, although optimal for a single iteration (due to the linear programming properties), may not be optimal in the sense that there are some routes in the network that can increase the transmitted throughput. That is, the determined value z solved one particular flow problem. However, in reality, we can allow for nodes that are connected to the sink via un-congested edges to further increase their throughput, even-though it breaches the inherited MCFP fairness criteria. This can be accomplished by running the same linear programming process in iterations, while locking the congested commodities. For example, in the presented example shown in FIG. 9, the first run produces z=0.81. However, that the branches of nodes 3, 4, 5, 6, 7, 8, 9 is the limiting factor, while nodes 1 and 2, and 10, 11, 12, which lie on two different branches, can increase their transmitted throughput. Thus, in this example scenario, the routes to the sink 1→2→13, 11→10→13, 11→13, and 12→13 create branches (i.e., dedicated routes) that are not connected directly to the main branch that includes all the other nodes (e.g., the nodes 3, 4, 5 . . . ). Therefore, the value of z=0.8148 is set via the capping of the throughput that can be transmitted from the main branch (in this scenario, edges 8-13 and 9-13 would likely be saturated). An iterative approach can be used to continue and look at other areas of the graph (such as 1→2→13), to increase the z value for those parts.

The above example provides a solution to the switching problem based on the MCFP, in a given snapshot, using known commodity demands and the capacities of specific edges (links). However, the goal is to create a predictive switching scheme, which will prepare the network based on the predicted attenuation of the various CMLs. Thus, the following example Predictive Network Switching process (provided below), which uses the outputs of the status of operation color-based classification, relating it into the MCFP, is proposed:

```
// Input K is the future time-steps to be considered in the prediction
// Input Ec is an E × K matrix which holds the capacity for each of
the edges ∈ {E}for each of the time-steps n, n + 1, ..., n + K
// Input k is an array which the commodity-demand generated from
each of the vertices to be transmitted to the sink
// Inputs L_i^n, L_i^{n+1} ,..., L_i^{n+k} are the state of the i^{th} edge (i.e., CML),
which is the output of the status of operation classification algorithm /
process, for time-steps n, n + 1, ..., n + K
// Output z is the concurrent flow throughput factor
// Output Cc is an V × E matrix that holds the commodity portion of
each of the nodes ∈ {V}V through each of the edges ∈ {E}
// ā is an array of length E
    1       for j←1 to E) do
                // Initialization
    2           ā(j) = Ec(j,1)
    3       end
    4       for j←1 to E do
    5           for p←1 to K do
    6               if L_j^{n+p} is Red then
    7                   ā(j) = 0
    8               end
    9               if L_j^{n+p} is Yellow then
   10                   ā(j) = min{ā(j), Ec(j, p)}
   11               end
   12           end
   13       end
// Solve the MCFP:
   14       [z,Cc] = solve(MCFP)
```

Basically, the status of operation classification process solves the MCFP for the given network for the current time step, to be implemented in the network management scheme. However, if any of the CMLs are marked as Red or Yellow in the future K time-steps, then, the process replaces the current capacity of the CMLs with the minimum capacity that is detected within the future K time-steps. Thus, the network current switching scheme is made to be predictive in the sense that it considers the future loss of capacities. This approach is conservative in the sense that it considers the worst-case scenario of the CMLs status, and thus provided a congestion-free solution (not considering any capacity-prediction errors). On the other hand, this solution gives a sub-optimal throughput. Nevertheless, given that the capacities values fluctuate slower than the prediction resolution, the proposed process' performance is very close to the optimal case. Other predictive switching schemes/processes may be used instead of, or in addition to, the above Predictive Network Switching process.

In some embodiments, the predictive data derived based on the measurement data may be used to manage channel switching and prioritization. For example, during a case of extremely narrow MHN-based bandwidth (e.g., during an extreme storm event), the provider must ensure a minimum and redundant bandwidth to specific users, while sacrificing others. Thus, it is important to address premium services and end-user bandwidth prioritization. For example, in case of imminent network throughput drop, data-flow from specific end-users, such as cloud-assisted cars, should receive higher rerouting priorities. Such resource allocation may be based, for example, on the available dynamic rerouting scheme described herein, in combination with optimal ATPC and AMC schemes.

In some embodiments, channel switching capabilities may be implemented for CMLs. For example, processes in which two CMLs channels, one in the K-band and one in the E-band may be deployed on the same physical link. Such embodiments have the advantage of the higher throughput of the E-band, but, in cases where the higher E-band sensitivity to the environment threatens the link operation, the channel will switch to the K-band frequency. Such a switch will create a drop in the available throughput, but in turn will keep the CML alive. Thus, processes may be implemented to perform predictive channel allocation, in combination with ATPC and AMC schemes, and dynamic rerouting. Once the channel throughput drops, prioritization of services should be considered.

Network Rerouting Approach Based on Multi-Step Network Reconfiguration

The attenuation prediction (AP) mechanism described herein employs an encoder-decoder LSTM model to predict the sequence of future attenuation levels based on past measurements, capturing both time and spatial correlations that are typical of weather-effects, without incorporating weather-related models, which allows it to be used both in dry and rain periods. Another proposed rerouting approach, namely, the Multi-Step Network Reconfiguration (MSNR) approach leverages the predictions from the AP mechanism and uses Model Predictive Control (MPC) to compute the sequence of current and future routing and admission control decisions that: (i) maximize network utilization, while (ii) achieving max-min fairness among the base-stations sharing the network and (iii) preventing transient congestion that may be caused by re-routing. The max-min fairness constraint can generally be defined as requiring, in order to maintain feasibility for a feasible set $\{f_{n,t}^{(k,l)}, z_{n,t}\}$, that an increase of any $z_{n,t}$ necessarily results in the decrease of $z_{m,t}$ of another source m for which $z_{m,t} \leq z_{n,t}$. The term $z_{n,t}$ represents the fraction (i.e., a value between 0 and 1) of a demand that is allowed into the network, at time t, from node n. In some embodiments, the constraint of max-min fairness can more specifically set a minimum traffic volume allocation requirement for data sources generating the traffic volume in the communication network (i.e., that each source node should be able to generate some minimum level of traffic in order for the max-min fairness constraint to be maintained).

The sequence of routing and admission control decisions are employed by a software-defined networking (SDN) controller (which may be implemented using, for example, the server 120 of FIG. 1) to reconfigure the network over time. For example, based on a prediction that a set of links will become unavailable in 30 seconds, the MSNR approach can determine when it is optimal for the SDN controller to redirect flows in order to avoid potential interruptions to service and can decide whether or not it is necessary to revoke network slices from low priority services. An important challenge associated with the MSNR approach is computational complexity. As will become apparent below, a proposed principled implementation of the MSNR technique can achieve a computational complexity that grows polynomially with the prediction horizon, as opposed to a naive implementation that can have exponential complexity.

The problem of finding the optimal sequence of network configurations is a generalization of the Maximum Concurrent Flow (MCF) problem for a setting where predictions of future network conditions are available, and transient congestion due to re-routing is taken into account. The MSNR approach employs MPC to address this generalized MCF optimization problem. In particular, in each time-step t, the MSNR process uses its knowledge of current and predicted link capacities $\{c_t^{(k,l)}, \hat{c}_{t+1}^{(k,l)}, \ldots, \hat{c}_{t+H}^{(k,l)}\}$ to compare the performance of different congestion-free sequences of network configurations $\{f_{n,t+h}^{(k,l)}, z_{n,t+h}\}$, $\forall n \in V$, $\forall (k,l) \in E$, $\forall h \in \{0, 1, \ldots, H-1\}$ and then it selects the max-min fair sequence that maximizes the cumulative sum of admission rates $$\sum_{h=0}^{H-1} \sum_{n=1}^{N-1} z_{n,t+h}.$$

The SDN controller implements the first configuration in the selected sequence, i.e., the configuration $\{f_{n,t}^{(k,l)}, z_{n,t}\}$ associated with the current time t. This iterative process allows the SDN controller to account for future predicted network conditions when optimizing the current network configuration.

An important challenge associated with the MSNR approach is computational complexity. A naive implementation of the MSNR approach computes and compares the performance of all possible sequences of network configurations within the prediction window $\{t, \ldots, t+H\}$. The number of such sequences grows exponentially with H, which could render the MSNR approach impractical. To overcome this challenge, a principled implementation of the MSNR approach has been developed herein which employs the structure of the optimization problem to recursively explore the space of all possible sequences of network configurations. This recursive methodology reduces the complexity from exponential $O(2^H)$ to polynomial complexity $O(H^2)$.

As noted, three parameters that can be dynamically adjusted to compensate for high attenuation levels in microwave and mmWave links are the transmission power, the coding rate, and the modulation scheme. In the implementation developed and tested herein, data was collected for a backhaul network that: (i) employs a constant transmit power $p_{Tx,t}^{(k,l)}$ and a constant coding rate over time; (ii) uses Quadrature Amplitude Modulation (QAM) with adaptive constellation size M; and (iii) uses a fixed channel bandwidth of 28 MHz that achieves a capacity of 45 Mbps when M=4.

The adaptive modulation (AM) mechanism adjusts the constellation size M over time, aiming to maximize link capacity $c_t^{(k,l)}$ while keeping the BER above a given threshold. An example of a hysteresis representation employed by a wireless x-haul network with an AP mechanism is provided below in Table 1 (based on experimental results reported in L. Bao et al., "Field trial on adaptive modulation of microwave communication link at 6.8 GHz," 2015 *9th European Conference on Antennas and Propagation (EuCAP)*, 2015, pp. 1-5).

TABLE 1

| M | Bitrate | Limit up (dBm) | Limit Down (dBm) |
|---|---|---|---|
| 4 | 45 | −72 | N/A |
| 16 | 90 | −66 | −74 |
| 64 | 135 | −62.5 | −68 |
| 128 | 157 | −61 | −64 |
| 256 | 180 | −57 | −62 |
| 512 | 202.5 | −53 | −58 |
| 1024 | 225 | N/A | −54 |

Thus, in some embodiments, every link $(k, l) \in E$ may use radios that adapt their constellation size M at each time-step t based on Table 1 and on their measured received signal level $P_{Rx,t}^{(k,l)}$. The Limit Up column in Table 1 represents the received signal level in which the adopted M should increase. The Limit Down column represents the received signal level in which the adopted M should decrease to keep the BER above the set threshold. Note that Table 1 represents a mapping from the evolution of the received signal levels $P_{Rx,t}^{(k,l)}$ over time to the evolution of the link capacities $c_t^{(k,l)}$ over time.

One possible approach to dynamically optimizing the network configuration without resorting to predictions of links' future conditions is for the SDN controller to carry out, in each time t, the following procedure: (i) gather information about the current link capacities $c_t^{(k,l)}$; (ii) employ existing solutions to the MCF optimization problem to find the configuration $\{f_{n,t}^{(k,l)}, z_{n,t}\}$ that maximizes the current network utilization; and (iii) implement the new routing decisions $f_{n,t}^{(k,l)}$ and admission rates $z_{n,t}$ by sending control packets to the base-stations in the x-haul network. Upon reception of these control packets, the base-stations add/remove entries from their routing tables and adjust their network slice admission and provisioning accordingly. Drawbacks of this approach include the delay to recover from performance drops, which is characteristic of reactive reconfiguration mechanisms, and the fact that such an approach does not take into account the transient congestion that may be caused by re-routing. These drawbacks may severely affect time-sensitive traffic. The MSNR approach described herein addresses both drawbacks. To update routes from $f_{n,t+1}^{(k,l)}$ to $f_{n,t}^{(k,l)}$, the SDN controller may have to send control packets to multiple base-stations. Due to communication and processing delays, some base-stations may apply the new routes $f_{n,t}^{(k,l)}$ while others may still employ the old routes $f_{n,t+1}^{(k,l)}$, which may cause significant transient congestion and over-utilization of communication links, namely violation of the capacity constraints. Depending on the duration and magnitude of the congestion, data packets may be severely delayed or even lost. In such a case, the re-routing process is clearly imposing a performance cost that should be taken into account when the SDN controller decides whether or not to re-route.

In order to reduce the transient congestion associated with re-routing, a common approach is to subdivide the re-routing process into multiple stages. In each stage, the SDN controller updates a small number of base-stations, instead of updating all of them at the same time. Each stage is designed to generate zero (or little) transient congestion and the complete sequence of stages is designed to lead to the desired final routing configuration. An important constraint is that the time for completing the re-routing process should be shorter than the interval between two consecutive time-steps, e.g., t and t+1 (e.g., the Δ can be set to 10 seconds). In the implementations described herein an SDN controller is considered that implements any given set of new routes $f_{n,t}^{(k,l)}$ by employing the SWAN mechanism. The SWAN mechanism leverages scratch capacity in every link to perform congestion-free re-routing. In particular, it can be shown that SWAN can update routes, i.e., change from $f_{n,t-1}^{(k,l)}$ to $f_{n,t}^{(k,l)}$, with zero transient congestion in at most $\lceil 1/s_t \rceil - 1$ stages, where $s_t \in (0, 1]$ represents the scratch capacity of the network at time t. Formally, $s_t$ is given by:

$$s_t = \mathrm{argmax}\left\{ s \in (0, 1) \,\middle|\, \sum_{n=1}^{N-1} z_{n,t-1} d_n f_{n,t-1}^{(k,l)} \leq (1-s) c_t^{(k,l)}, \forall (k, l) \in E \right\}$$

It is to be noted that when the network has no scratch capacity, i.e., $s_t \to 0$, the SWAN mechanism needs $\lceil 1/s_t \rceil - 1 \to \infty$ stages to complete a single congestion-free re-routing process. To limit the re-routing time, a lower bound of $s_{min} = 0.05$ is imposed on the scratch capacity, $s_t$, needed for a re-route. Thus, for some of the implementations described herein the SDN controller can be assumed to be allowed to re-route at time t if and only if $s_t \geq s_{min} = 0.05$. The SDN controller employs the MSNR process to compute the optimal sequence of network configurations over time and, when necessary, it employs the SWAN (Software-driven Wide Area Network) mechanism to implement new routes. In particular, in each time-step t, given the prior routing and admission control decisions $\{f_{n,t-1}^{(k,l)}, z_{n,t-1}\}$, the SDN controller employs the above equation for $s_t$ to calculate the current scratch capacity $s_t$. If $s_t \geq s_{min}$, the SDN controller employs the MSNR process to compute the optimal sequence of network configurations and then it employs SWAN to implement the optimal configuration $\{f_{n,t}^{(k,l)}, z_{n,t}\}$ at the current time t. Alternatively, if $s_t < s_{min}$, the SDN controller is not allowed to re-route at time t, but it can still optimize the admission rates $z_{n,t}$. In this case, the SDN controller employs the MSNR process with fixed routing parameters $f_{n,t}^{(k,l)} = f_{n,t-1}^{(k,l)}$ to compute the optimal sequence of network configurations and then it implements the optimal admission rates $z_{n,t}$ at time t. It is easy to see that admission rates can be updated from $z_{n,t-1}$ to $z_{n,t}$ with zero transient congestion in at most two stages, irrespective of the value of $s_t$. In the first stage, the SDN controller updates all base-stations in which $z_{n,t-1} > z_{n,t}$ and, in the last stage, the SDN controller updates all base-stations in which $z_{n,t-1} < z_{n,t}$.

The routing and admission control decisions at time t determine the scratch capacity $s_{t+1}$ at time t+1, which determines whether or not the SDN controller will be allowed to re-route at time t+1. Hence, if the SDN controller plans to re-route at time t+1, it should select a network configuration $\{f_{n,t}^{(k,l)}, z_{n,t}\}$ that will lead to $s_{t+1} \geq s_{min}$. This can be achieved by employing, at time t, the following capacity constraint for every link $(k, l) \in E$ $$\sum_{n=1}^{N-1} z_{n,t} d_n f_{n,t}^{(k,l)} \leq \min\{c_t^{(k,l)}, (1 - s_{min})\hat{c}_{t+1}^{(k,l)}\}.$$

Alternatively, if the SDN controller plans to keep the same routes in the next time-step, i.e., $f_{n,t+1}^{(k,l)} = f_{n,t}^{(k,l)}$, it should attempt to fully utilize the links, leaving no scratch capacity. In some embodiments, in order to re-route in the next time-step t+1, the SDN controller may need to reduce the admission rates $z_{n,t}$ in the current time-step t. This potential reduction of $z_{n,t}$ represents the cost of re-routing. To illustrate, consider, with reference to FIG. 10, a schematic 3-node network 1000 comprising two commodities nodes, a destination node, and three links (namely, $\{(1, 2), (2, 3), (1, 3)\}$. Assume, for this example, that the commodities nodes 1010 and 1020 have fixed demands $d_1 = 1$ and $d_2 = 0.5$. Assume that this network has capacities $c_t^{(k,l)} = 0.5$ for all links, predicted capacities $\hat{c}_{t+h}^{(k,l)} = 0.5$ for all links, and prediction horizons h. Moreover, assume that $s_t \geq s_{min} = 0.05$, meaning that the SDN controller is allowed to re-route at the current decision time t. If the SDN controller plans to keep the same routes in future time-steps, then it adopts the capacity constraints of $$\sum_{n=1}^{N-1} z_{n,t} d_n f_{n,t}^{(k,l)} \leq \min\{c_t^{(k,l)}, \hat{c}_{t+1}^{(k,l)}\}.$$

In this example, it is easy to see that the corresponding max-min fair admission rates are $z_{1,t} = z_{2,t} = \frac{2}{3}$. Notice that there exist feasible configurations $\{f_{n,t}^{(k,l)}, z_{n,t}\}$ with higher sum $$\sum_{n=1}^{2} z_{n,t},$$

but their admission rates may not be max-min fair. An example of such unfair feasible admission rates are $z_{1,t} = 0.5$, $z_{2,t} = 1$. On the other hand, consider a situation where the SDN controller plans to re-route in the next time-step, and adopts the capacity constraints of $$\sum_{n=1}^{N-1} z_{n,t} d_n f_{n,t}^{(k,l)} \leq \min\{c_t^{(k,l)}, (1 - s_{min})\hat{c}_{t+1}^{(k,l)}\}$$

with $s_{min} = 0.05$. Here it is easy to see that the corresponding max-min fair admission rates are $z_{1,t} = z_{2,t} = \frac{2}{3} * (1 - 0.05)$.

Figure 10:
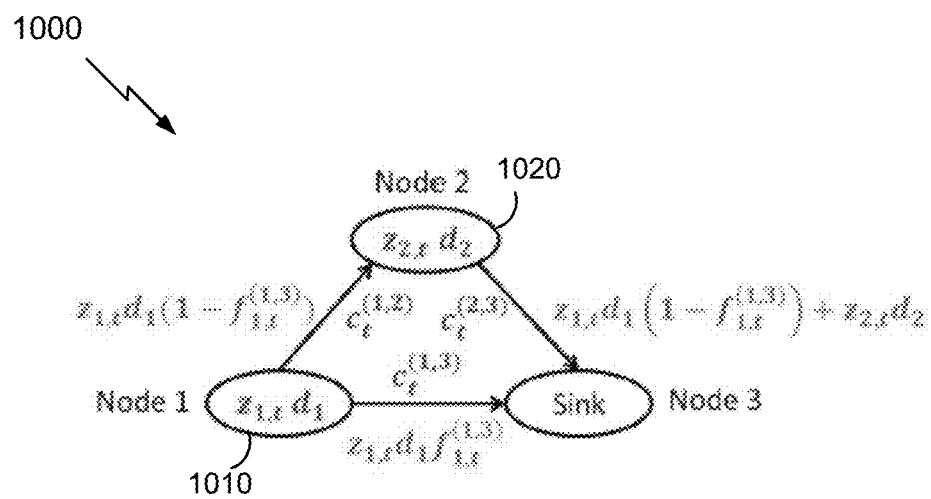
FIG. 10 is a schematic 3-node network with two commodities nodes, and a destination node.

There are two observations that are important to note: (i) planning to re-route at time t+1 does not guarantee that the SDN controller will be able to re-route at time t+1. In particular, if the capacity prediction is inaccurate and (by chance) $\hat{c}_{t+1}^{(k,l)} > c_{t+1}^{(k,l)}$, the SDN controller may not have enough scratch capacity at time t+1 to re-route; (ii) planning to re-route at time t+1, can only hurt the network performance at the current time t due to the provision of the scratch capacity, as illustrated in the example of FIG. 10. The potential benefits of planning to re-route at time t+1 can only be assessed by computing the performance of the network at future time-steps.

The MSNR approach described herein leverages information about current and future predicted link capacities $\{c_t^{(k,l)}, \hat{c}_{t+1}^{(k,l)}, \ldots, \hat{c}_{t+H}^{(k,l)}\}$ to dynamically optimize routing and admission control decisions aiming to maximize the cumulative sum of admission rates $$\sum_{t=1}^{T} \sum_{n=1}^{N-1} z_{n,t},$$

while ensuring that, for some embodiments, in every time-step t, the selected feasible set $\{f_{n,t}^{(k,l)}, z_{n,t}\}$ is max-min fair, and can be implemented by the SDN controller without inducing transient congestion. As noted, one general definition of the max-min fairness constraint is for the feasible set $\{f_{n,t}^{(k,l)}, z_{n,t}\}$ having at time-step t admission rates $z_{n,t}$ that are max-min fair if, in order to maintain feasibility, an increase of any $z_{n,t}$ necessarily results in the decrease of $z_{m,t}$ of another source m for which $z_{m,t} \leq z_{n,t}$.

The MSNR approach described herein is based on using predictions of future network conditions, while taking transient congestion (due to re-routing) into account. To help illustrate the MSNR approach, the concept of a re-routing plan is introduced. For a given time t and a prediction window size H, let $r_{t,h}$ be an indicator function that is equal to 1, if the plan is to re-route in time-step t+h, $\forall h \in \{0, 1, \ldots, H\}$, and $r_{t,h}=0$, otherwise. The re-routing plan at time t is given by the vector $r_t=(r_{t,0}, r_{t,1}, \ldots, r_{t,H})$. Note that if $s_t < s_{min}$, then $r_{t,0}=0$ and if $s_t \geq s_{min}$, then $r_{t,0} \in \{0, 1\}$. To illustrate the MSNR approach, consider the following example that shows how the re-routing plan $r_t$ can be utilized to separate the problem of finding the optimal sequence of network configurations into simpler sub-problems. In this example illustration a prediction window size of H=5 and a plan $r_t=(0, 1, 0, 0, 1, 0)$ is used, under which re-routing occurs only at times t+1 and t+4. The capacity constraints in time-step t+h depend on whether the plan is to re-route in the next time-step t+h+1 or not, according to the following expression:

$$\sum_{n=1}^{N1} z_{n,t+h} d_n f_{n,t+h}^{(k,l)} \leq \min\{\hat{c}_{t+h}^{(k,l)}, (1-s_{min} r_{t,h+1})\hat{c}_{t+h+1}^{(k,l)}\}, \forall (k,l) \in E.$$

The values for $f_{n,t+h}^{(k,l)}$ are updated, in this example only at the re-routing times t+1 and t+4, while $z_{n,t+h}$ can be updated at every time-step. Hence, the routing decisions at time t+1, namely $f_{n,t+1}^{(k,l)}$ affect not only $z_{n,t+1}$, but also $z_{n,t+2}$ and $z_{n,t+3}$. It follows that the optimization problem associated with $r_t=(0, 1, 0, 0, 1, 0)$ can be subdivided at the re-routing times, resulting in three simpler sub-problems, each of which jointly optimizes: (i) $f_{n,t}^{(k,l)}$ and $z_{n,t}$; (ii) $f_{n,t+1}^{(k,l)}, z_{n,t+1}, z_{n,t+2}$, and $z_{n,t+3}$; and (iii) $f_{n,t+4}^{(k,l)}$ and $z_{n,t+4}$.

In general, the optimization problem associated with any re-routing plan $r_t$ can be subdivided at the re-routing times, i.e., times t+h in which $r_{t,h}=1$, without loss of optimality. Let $\{t+h_1, t+h_1+1, t+h_2\}$ represent a subdivision of a re-routing plan $r_t$. The Generalized-MCF (G-MCF) process described herein jointly optimizes the routing decisions $f_{n,t+h_1}^{(k,l)}, \forall n, \forall (k,l)$ for a fixed $h_1$ and the admission rates $z_{n,t+h}, \forall n, \forall h \in \{h1, \ldots, h2\}$. The G-MCF process finds the optimal routing and admission control decisions within a subdivision. The MSNR approach uses the G-MCF algorithm to find the optimal routing and admission control decisions in the entire future window. To address this joint optimization, G-MCF solves a sequence of MCF problems with increasing admission rates $z_{n,t+h}$ until all commodities in the network become saturated. In particular, let k be the iteration index of the process, let U be the set of unsaturated commodities at the beginning of iteration k, let (n,h) be the tuple that represents the index of the (N−1) (h$_2$−h$_1$+1) different commodities in this subdivision of $r_t$, and let $z_{(n,h)}^S$ be the admission rate $z_{n,t+h}$ that saturates commodity (n,h). Initially, $U=\{(n, h)\}, \forall n, h$. In each iteration k, the process solves the MCF problem associated with the unsaturated commodities, i.e., it assigns $z_{n,t+h} \leftarrow \bar{z}, \forall (n, h) \in U$, and $z_{n,t+h} \leftarrow z_{(n,h)}^S, \forall (n,h) \notin U$, and finds the feasible configuration (Output 1) with maximum value of $\bar{z} \in [0,1]$ which is denoted by $\bar{z}^*$. Then, the process identifies the commodities that become saturated in the current iteration, stores their saturation values $z_{(n,h)}^S \leftarrow \bar{z}^*$, updates the set U accordingly, and proceeds to the next iteration k+1. This process terminates when $U=\emptyset$ and the admission rates $z_{(n,h)}^S$ that saturate every commodity in the network have been determined. The G-MCF process finds the optimal routing and admission control decisions within a subdivision $\{t+h_1, t+h_1+1, \ldots, t+h_2\}$ of the re-routing plan $r_t$. To compute the optimal routing and admission control decisions associated with an entire re-routing plan $r_t=(r_{t,0}, r_{t,1}, \ldots, r_{t,H})$, the G-MCF process is applied in each of its subdivisions.

The generalized MCF (G-MCF) process can be represented using the following pseudocode.

```
1  % Let {t + h₁, ..., t + h₂} be the subdivision of the re-routing plan
   rₜ under consideration and let U be the set of unsaturated commodities
   at the beginning of iteration k;
2  Initialization: U = {(n, h), ∀n ∈ {1, 2, ..., N − 1}, ∀h ∈
   {h₁, ..., h₂} and k = 0;
3  while U ≠ Ø do
4     % Find z̄ that solves the joint optimization;
5     for n ∈ {1, ..., N − 1} and h ∈ {h₁, ..., h₂} do
6        if (n, h) ∈ U then z_{n,t+h} ← z̄ ;
7        else z_{n,t+h} ← z_{(n,h)}^S ;
8     Solve: max z̄ , subject to z̄ ∈ [0, 1], flow convervation, and
      capacity constraints;
9     Output 1: values of z̄* and f_{n,t+h}^{(k,l)} ;
10    % Identify the new saturated commodities (n, h);
11    Determine the set D of disconnected commodities in the residual
      graph associated with Output 1;
12    Saturation Flag = Ø;
13    for (n, h) ∈ D do
14       % Find z̄_{(n,h)} that solves the joint optimization;
15       Assign: z_{n,t+h} ← z̄_{(n,h)} ;
16       for (m, j) ∈ U \ (n, h) do z_{m,t+j} ← z̄* ;
17       Solve: max z̄_{(n,h)} , subject to z̄_{(n,h)} ∈ [0, 1], flow conservation,
         and capacity constraints;
18       Output 2: values of z̄*_{(n,h)} and f_{n,t+h}^{(k,l)} ;
19       if z̄*_{(n,h)} = z̄* then
20          Saturation Flag ← Saturation Flag ∪ (n, h);
21    for (n, h) ∈ Saturation Flag do
22       Assign: z_{(n,h)}^S ← z̄* ;
23       Assign: U ← U \ (n, h);
24    k ← k + 1
25  % Find the max-min fair feasible configuration;
26  for n ∈ {1, ..., N − 1} and h ∈ {h₁, ..., h₂} do
27     Assign: z_{n,t+h} ← z_{(n,h)}^S ;
28  Obtain: f_{n,t+h}^{(k,l)} that satisfy flow conservation and capacity
    constraints;
29  Output 3: values of z_{n,t+h} = z_{(n,h)}^S and f_{n,t+h}^{(k,l)} ;
```

To find the optimal sequence of network configurations at time t, the MSNR process selects the plan $r^*_t$ with highest cumulative sum of admission rates $$\sum_{h=0}^{H-1} \sum_{n=1}^{N-1} z_{n,t+h}.$$

Naïve implementations of the MSNR approach/process computes and compares the performance of the (at least) $2^H$ admissible re-routing plans. To reduce the computational complexity from exponential $O(2^H)$ to polynomial $O(H^2)$, a principled implementation of the MSNR process which leverages the fact that the G-MCF algorithm optimizes subdivisions of the re-routing plan $r_t$ separately. This principled implementation based on backward induction approach, as described in greater detail below.

As a first case, consider the space of plans $r_t$ that re-route for the first time at step t+H−1, i.e., $r_t \in \{(0, \ldots, 0, 1, 0), (0, \ldots, 0, 1, 1)\}$. The MSNR algorithm employs the G-MCF process to compute the optimal routing and admission control decisions for these two (2) re-routing plans and then selects the plan $r^{(1)}_t$ with highest cumulative sum of admission rates at time t+H−1, namely $$\sum_{n=1}^{N-1} z_{n,t+H-1}.$$

Consider, next, a second case in which the space of plans that re-route for the first time is at step t+H−2, i.e., $r_t \in \{(0, \ldots, 0, 1, 0, 0), (0, \ldots, 0, 1, 0, 1), (0, \ldots, 0, 1, 1, 0), (0, \ldots, 0, 1, 1, 1)\}$. Note that in the subspace of plans that re-route both at times t+H−2 and t+H−1, it is already established, from the first case (in which the first re-routing was assumed to have occurred at step t+H−1) that $r_t = r^{(1)}_t + (0, \ldots, 0, 1, 0, 0)$ has the best performance and, thus, all other plans in this particular subspace can be excluded from consideration. The MSNR process employs the G-MCF process to compute the optimal routing and admission control decisions for the remaining three (3) re-routing plans and selects the plan $r^{(2)}_t$ with highest cumulative sum of admission rates at times t+H−2 and t+H−1, namely, $$\sum_{h=H-2}^{H-1} \sum_{n=1}^{N-1} z_{n,t+h}.$$

Turning now to a third case, consider the space of plans that re-route for the first time at step t+H−3, i.e., $r_t \in \{(0, \ldots, 0, 1, 0, 0, 0), \ldots, (0, \ldots, 0, 1, 1, 1, 0), (0, \ldots, 0, 1, 1, 1, 1)\}$. In this subspace of plans, re-routing occurs both at times t+H−3 and t+H−2. It has already been established from the second case, discussed above, that $r_t = r^{(2)}_t + (0, \ldots, 0, 1, 0, 0, 0)$ has the best performance and, hence, all other plans in this particular subspace can be excluded from consideration. Similarly, in the subspace of plans that re-route at both times t+H−3 and t+H−1, but do not re-route at time t+H−2, it has already been established, from the first case discussed above that $r_t = r^{(1)}_t + (0, \ldots, 0, 1, 0, 0, 0)$ has the best performance and thus all other plans in this particular subspace can be excluded from consideration. The MSNR process employs the G-MCF process to compute the optimal routing and admission control decisions for the remaining four (4) re-routing plans and selects the plan $r^{(3)}_t$ with highest cumulative sum of admission rates from times t+H−3 to t+H−1, namely, $$\sum_{h=H-3}^{H-1} \sum_{n=1}^{N-1} z_{n,t+h}.$$

Following the third case, the MSNR process considers the space of plans that re-route for the first time at steps t+H−4, t+H−5, ..., t and employs an analogous procedure in order to determine the best plans $r^{(4)}_t, r^{(5)}_t, \ldots, r^{(H)}_t$.

Lastly, the MSNR process compares the performance of the best plans $r^{(h)}_t, \forall h \in \{1, 2, \ldots, H\}$ with the performance of the plans $(0, \ldots, 0, 0)$ and $(0, \ldots, 0, 1)$, and then selects the plan $r^*_t$ with the highest cumulative sum of admission rates $$\sum_{h=0}^{H-1} \sum_{n=1}^{N-1} z_{n,t+h}$$

in the entire prediction window. The routing and admission control decisions associated with $r^*_t$ are the optimal sequence of network configurations.

Thus, in some embodiments, the re-routing framework to achieve optimization of resources in the face of changing performance of a wireless network (e.g., due to changing weather conditions) includes dynamically deriving, based on the determined predictive data, a sequence of network routing steps, during a future time window, to connect wireless nodes of the wireless communication network to achieve an optimized level of network traffic volume allowed through the communication network during the future time window. In some examples, dynamically deriving the sequence of network routing steps may include determining the sequence of network routing steps based on a backward induction optimization approach, including dividing the future time window into two or more temporal sequential sections, determining a network routing optimization solution for a later section, from the divided two or more sequential sections, prior to determining a network routing optimization solution for an earlier section from the divided two or more sequential sections, and determining the network routing optimization solution for the earlier section based on the network routing optimization solution determined for the later section from the divided two or more sequential sections for the future time window. Determining the network routing optimization solution for the earlier section may include identifying, for the time window of H sections, where H is an integer greater than 1, an optimal connectivity configuration for a first scenario in which a first re-routing step occurs at a discrete time n within the time window, and evaluating network performance for a set of candidate routing configurations for the wireless network in which an earlier re-routing step occurs at time n−1, with evaluating of the network performance for the set of candidate routing configurations excluding candidate configurations inconsistent with the optimal connectivity configuration identified for the first scenario in which the first re-routing step occurs at the time n.

The MSNR approach described herein achieves computational efficiency. Specifically, to find the best plans $r^{(1)}_t$, $r^{(2)}_t, \ldots, r^{(H)}_t$ in each of the corresponding backward induction cases, the MSNR process computes and compares the performance of 2, 3, ..., H+1 re-routing plans, respectively. Then, in the last case of the induction, the MSNR approach computes and compares the performance of H+2 re-routing plans in order to find the plan $r^*_t$ and the associated optimal sequence of network configurations $\{f^{(k,l)}_{n,t+h}, z_{n,t+h}\}, \forall h \in \{0, 1, \ldots, H-1\}$, at time t. In total, the MSNR process employing backward induction computes the performance of (H+1)(H+4)/2 re-routing plans, as opposed to the (at least) $2^H$ computations associated with the nave implementation. It is to be noted, as indicated by the pseudocode steps of the generalized MCF process, that to compute the performance of any given re-routing plan $r_t$, the process solves $O(H^2N^2)$ optimization problems, each of which can be solved in polynomial time. It follows that the MSNR process has polynomial computational complexity which grows as $O(H^2)$.

As noted, the MSNR approach also achieves max-min fairness. The optimal sequence of network configurations $\{f^{(k,l)}_{n,t+h}, z_{n,t+h}\}$ given by the MSNR approach has admission rates $\{z_{n,t+h}\}_{n=1}^{N-1}$ that are max-min fair in every time-step t+h for any given $h \in \{0,1,\ldots,H-1\}$, irrespective of the network topology G=(V, E), demands $d_n$, and current and predicted link capacities $\{c^{(k,l)}_t, \hat{c}^{(k,l)}_{t+1}, \ldots, \hat{c}^{(k,l)}_{t+H}\}$.

Generalized Predictive Network Reconfiguration Framework

Figure 11:
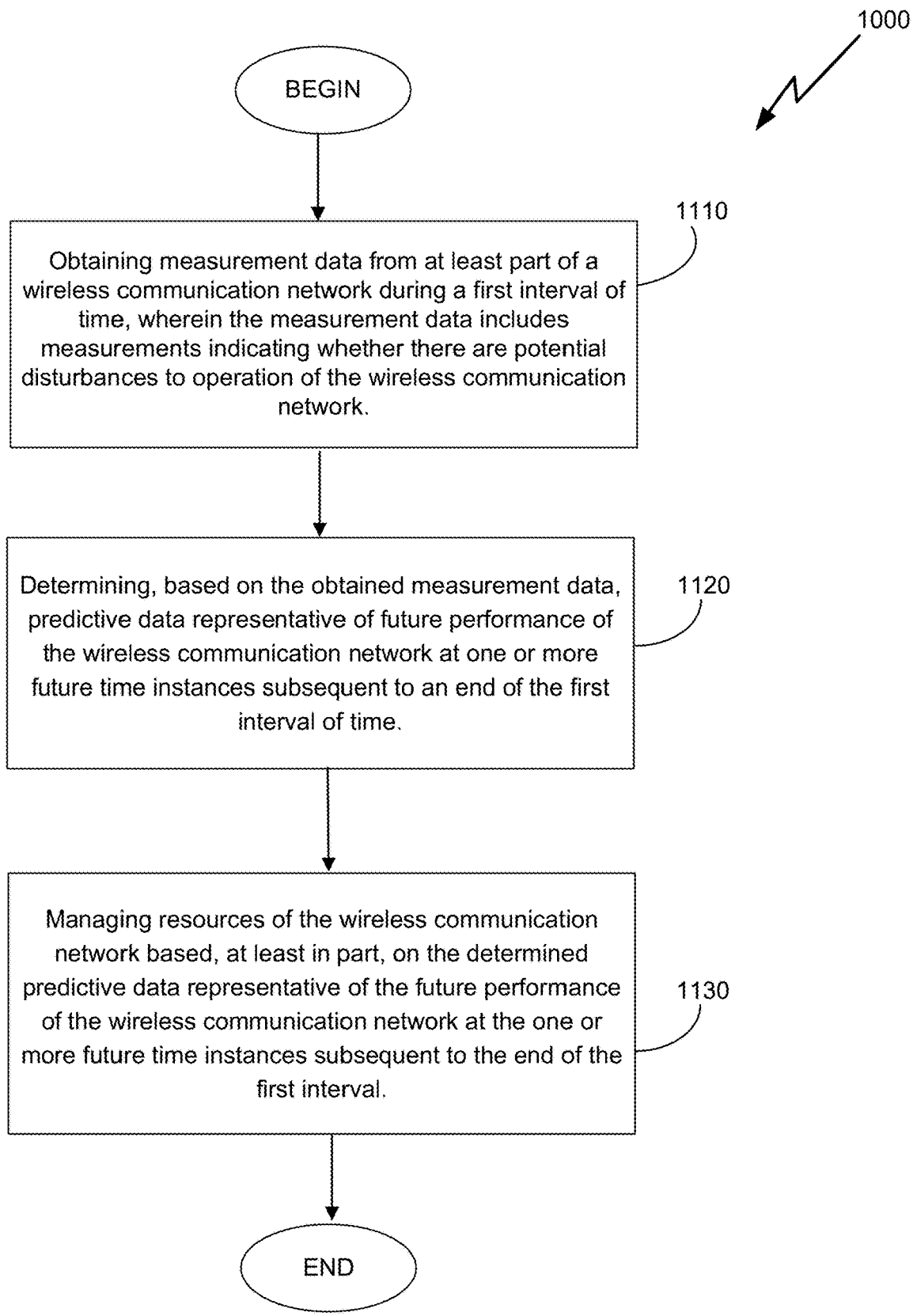
FIG. 11 is a flowchart of an example procedure to manage wireless resources of a weather-impacted wireless communication network.

With reference next to FIG. 11, a flowchart of an example procedure 1100 to manage wireless resources of a weather-impacted wireless communication network (such as the networks 100, 200, or 300 shown in FIG. 1, 2, or 3, respectively) is shown. The procedure 1100 (which may be executed on a resource manager controller implemented, for example, on the server 120 of FIG. 1) includes obtaining

1110 measurement data from at least part of a wireless communication network during a first interval of time, with the measurement data including measurements indicating whether there are potential disturbances to operation of the wireless communication network. The measurements indicative of potential disturbances to operation of the wireless communication network may be indicative of weather-related disturbances, or of any other type of disturbance (be it human created, or a natural occurring disturbance). In some examples, obtaining measurement data may include measuring signal attenuation levels, over the first interval of time, at one or more of wireless links of the wireless communication network. Other types of measurement data may also be obtained, including measured environmental data from the local nodes of the network, or measurement data that was determined remotely (e.g., data collected by a centralized global server to monitor local and remote weather conditions). Measuring the signal attenuation levels may include measuring the signal attenuation level at regulars or irregular time periods within the first interval of time, with the signal attenuation level for a wireless node, $n_i$, at a time t within the first interval being computed as a difference between a transmitted signal power level (TSL) for a signal transmitted from a remote wireless node, $n_j$, and a received signal power level (RSL) for the transmitted signal at the wireless node $n_i$.

With continued reference to FIG. 11, the procedure 1100 further includes determining 1010, based on the obtained measurement data, predictive data representative of future performance of the wireless communication network at one or more future time instances subsequent to an end of the first interval of time. In some examples, the predictive data may be determined based on, in addition to the measurement data (e.g., the signal attenuation levels, at the one or more wireless links), characteristics associated with two or more wireless nodes of the wireless communication network, with the characteristics including, for each of the two or more wireless nodes, available meta data such as, for example, geographic location, a frequency at which signals are transmitted, polarization attributes of the signal, coding technique applied to the signal, modulation technique applied to the signal, and/or adaptability of the two or more wireless nodes to adjust transmission power and/or adjust signal modulation. In some embodiments, determining the predictive data may include determining the predictive data using a learning engine, trained using attenuation time-series data collected from multiple wireless links defined between one or more pairs of wireless nodes of the wireless communication network during dry and wet periods, applied to the measurement data obtained for the wireless communication network. In such embodiments, determining the predictive data may include determining the predictive data representative of future attenuation behavior for wireless links defined between wireless nodes of the wireless communication network for H subsequent time instances following the end of the first interval. Determining the predictive data using the learning engine may include deriving, using a Long Short-Term Memory (LSTM) encoder network, a fixed-length hidden state vector for a time instance in the first interval based on the measurement data obtained for the wireless communication network, and on a previous state vector computed for a previous set of measurement data, the LSTM encoder implementing a non-linear activation function to compute the hidden state vector, and applying an LSTM decoder to the hidden state vector to determine the predictive data representative of future attenuation behavior for the wireless links of the wireless communication network for the H subsequent time instances. As noted, other types and/or learning engine configurations may be used for generating the predictive data. Furthermore, the determination of predictive data may also be performed through various optimization and/or filtering procedures (e.g., Kalman filter implementations).

In some embodiments, determining the predictive data may include determining ambient conditions affecting the future performance of the communication network. Determining ambient condition may include determining predicted weather patterns affecting the performance of the wireless communication network, including estimating spatial-temporal rain attenuation patterns predicted to impact the communication network.

The procedure 1100 additionally includes managing 1130 resources of the wireless communication network based, at least in part, on the determined predictive data representative of the future performance of the wireless communication network at the one or more future time instances subsequent to the end of the first interval. For example, managing resources of the communication network may include determining status of operation data (e.g., the color coded classification scheme described in relation to FIG. 6) for at least some wireless links defined for one or more pairs of the wireless nodes of the communication network, with the status of operation data being representative of likely degree of attenuation for the at least some wireless links at the one or more future time instances subsequent to the end of the first interval. In such embodiments, the procedure may further include controlling operational characteristics of a first wireless node, transmitting signals through a first wireless link, based on the status of operation data predicting at least some attenuation for the first wireless link but indicating the first wireless link remains available, with controlling the operational characteristics including one or more of, for example, increasing transmission strength of the first wireless node, and/or reducing throughput for the first wireless node according through adjustments of signal coding and/or modulation techniques used by the first wireless node.

In some embodiments, the resource management operations may include a link rerouting scheme (network level resource management) that includes identifying a first wireless link, from the at least some wireless links, predicted, based on the determined status of operation data, to be unavailable or to be operating at a lower capacity at a subsequent time instance, and identifying an alternative link for data transmission to re-route data from the first wireless link identified to be unavailable or to be operating at the lower capacity at the subsequent time instance, with the alternative link selected from one or more other wireless links predicted, based on the determined status of operation data, to be available at a later time instance to the subsequent time instance at which the identified first wireless link is predicted to be unavailable or operating at the lower capacity.

In some alternative examples, resource management may be performed according to a dynamic network topology switching scheme. In such examples, managing resources of the wireless communication network may include deriving throughput values between pairs of wireless nodes of the wireless communication network, to optimize an overall throughput at the future time instance of data traffic to and from one or more sink nodes of the wireless communication network, subject to predicted capacities of the wireless links of the communication network computed according to the predictive data of the future performance of the wireless communication network at the one or more future time instances following the end of the first interval, and configuring one or more of the wireless nodes based on the derived throughput values. Deriving the throughput values between the pairs of wireless nodes of the wireless communication network may include deriving the throughput values between the pairs of wireless nodes of the wireless communication network subject to further constraints relating to pre-determined characteristics of the wireless communication network. The pre-determined characteristics of the communication network may include one or more of, for example, known capacities of the wireless links, and/or known data traffic demand. In some embodiments, managing the resources of the communication network based, at least in part, on the determined predictive data may include one or more of, for example, a) configuring one or more wireless nodes of the wireless communication network based on the predictive data, subject to the requirement that at least one identified wireless node maintains a specified quality-of-service (QoS) level, and/or b) switching between different channels (e.g., K-band channel or E-band channel) configured for one or more wireless links based on the determined predictive data and on priority of services (e.g., autonomous car services are examples of high priority services) provided at one or more wireless nodes for which the one or more wireless links are established.

In embodiments in which the Multi-Step Network Reconfiguration (MSNR) approach is implemented, managing the resources of the communication network based, at least in part, on the determined predictive data may include dynamically deriving, based on the determined predictive data, a sequence of network routing steps, during a future time window, to connect wireless nodes of the wireless communication network to achieve an optimized level of network traffic volume allowed through the communication network during the future time window. Dynamically deriving the sequence of network routing steps may include deriving, based on the determined predictive data, network configuration data specifying a temporal sequence of links and respective flows on the links between the wireless nodes of the wireless communication network. In some examples, dynamically deriving the sequence of network routing steps may include evaluating traffic volume performance for candidate sequences of link configurations between the wireless nodes during the future time window that maximizes a cumulative sum of network traffic volume flowing through the communication network subject to a constraint of a minimum traffic volume requirement allocated for data sources generating the traffic volume in the communication network. Evaluating the traffic volume performance may be performed subject to a further constraint of minimizing transient congestion in the wireless communication network during the future time window.

Dynamically deriving the sequence of network routing steps may include determining the sequence of network routing steps based on a backward induction optimization approach, including dividing the future time window into two or more temporal sequential sections, determining a network routing optimization solution for a later section, from the divided two or more sequential sections, prior to determining a network routing optimization solution for an earlier section from the divided two or more sequential sections, and determining the network routing optimization solution for the earlier section based on the network routing optimization solution determined for the later section from the divided two or more sequential sections for the future time window. Determining the network routing optimization solution for the earlier section may include identifying, for the time window of H sections, where H is an integer greater than 1, an optimal connectivity configuration for a first scenario in which a first re-routing step occurs at a discrete time n within the time window, and evaluating network performance for a set of candidate routing configurations for the wireless network in which an earlier re-routing step occurs at time n−1. Evaluating of the network performance for the set of candidate routing configurations may exclude candidate configurations inconsistent with the optimal connectivity configuration identified for the first scenario in which the first re-routing step occurs at the time n.

Experimental and Simulation Results

To test and evaluate the performance of some of the implementations described herein, several studies, simulations, and experiments were conducted. More particularly, a practical demonstration of the systems and methods described herein was performed on a network of CMLs in Sweden. For the experiment, a set of available CMLs links were picked in an area of 10×10 km$^2$, corresponding to estimated spatial correlations of rain fields in the region. The data set included 17 operating links, with length variations between 600 meters to 6 km, as illustrated in FIG. 2. The links operated in the K-Band frequency range, with frequencies of 20 GHz to 40 GHz.

The dataset included a total of 135K samples for each CML, with total train-validation-test split of 70-15-15. The validation data was used to provide an evaluation of the model fit to tune model parameters. The input window size was determined to be T=9, by conducting a grid search over the values T∈{1, 3, 6, 9, 12, 15}. The learning engine was implemented according to an encoder-decoder architecture, such as the one shown in FIG. 4, where both the LSTM layers had one hidden layer, and 128 units each. A stochastic gradient descent procedure with an Adam optimization algorithm was used, with the model having a batch size of 150. All the parameters were selected to minimize the loss over the validation data.

Some of the systems and methods described herein were tested over three different rain events, as detailed below in Table 2, to evaluate performance of the approaches for deriving prediction of future values in CML networks.

TABLE 2

| Event # | Date | Duration # of Samples | Attenuation Avg; Max |
| --- | --- | --- | --- |
| I | 2015-06-02 | 8000 | 2:9 dB; 16:2 dB |
| II | 2015-05-19 | 2500 | 2:1 dB; 10:4 dB |
| III | 2015-05-05 | 5600 | 2:8 dB; 10:5 dB |

The average event-induced attenuation values were calculated by first reducing the baseline attenuation (i.e., the reference level attenuation) each link. Then, the averaged attenuation values were calculated over all the CMLs signals. The baseline attenuation levels were calculated by taking the median during the dry period on the same day, per CML.

Figure 12:
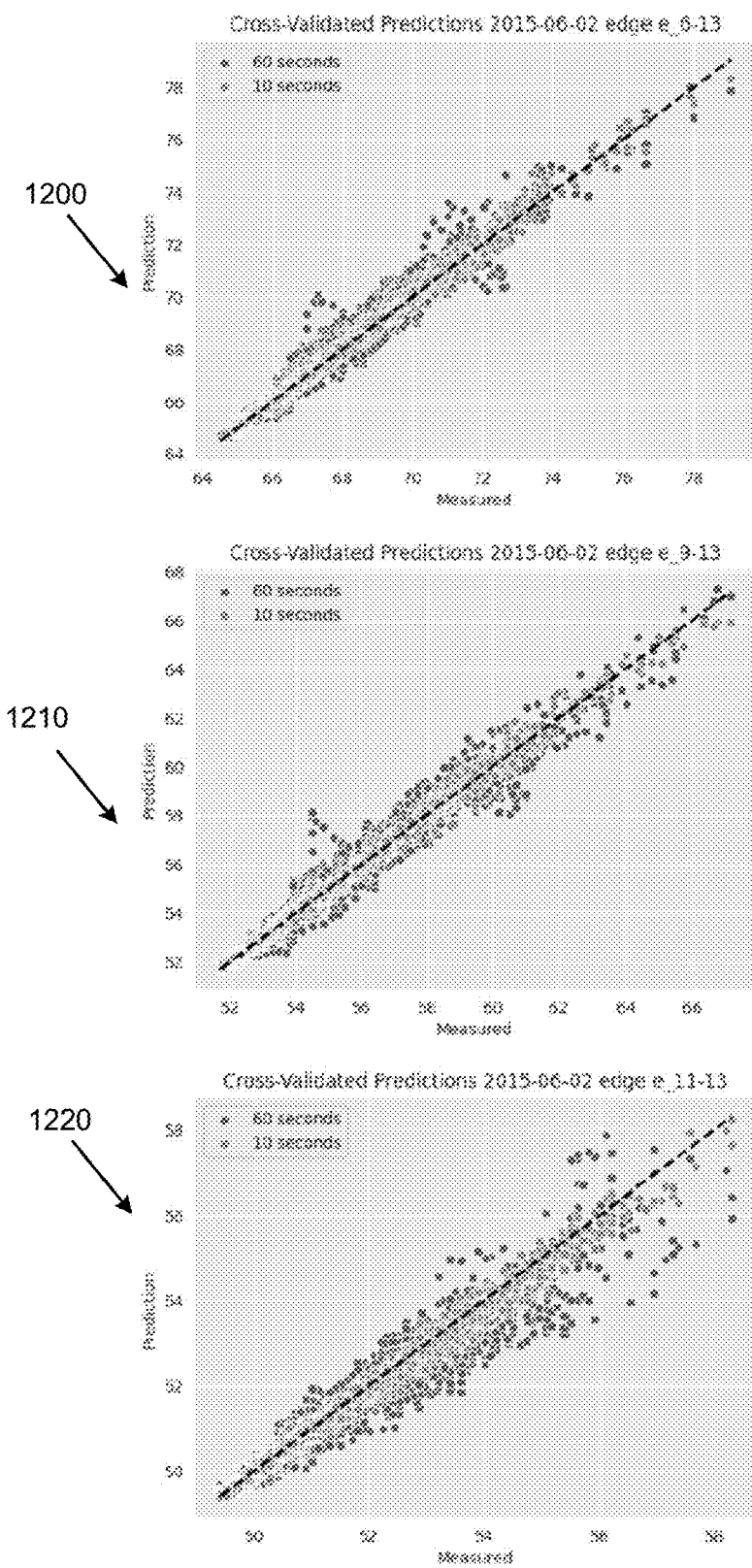
FIG. 12 are scatter plots providing cross validation for actual and predicted values for minimal and maximal prediction times for three selected network edges (links).

FIG. 12 includes scatter plots 1200, 1210, and 1220, providing cross validation for the actual and predicted values for the minimal and maximal prediction times (i.e., $\Delta T_h = \{10; 60\}$ seconds), for three selected edges (all measurements are given in dB). The predicted response was calculated with the LSTM encoder-decoder model after estimating the unknown model parameters from the training data. The straight line through the scatter of points is the line representing a zero-prediction error.

Two performance tests were used to evaluate the encoder-decoder model's results over the test data, to emphasize different properties. The performance was evaluated in terms of accuracy, with an RMSE error metric, and the probability of significant errors occurring. First, the Root-Mean-Square Errors (RMSE) is calculated to measure the differences between values predicted by a model or an estimator and the values observed. For the h time step, the $RMSE_h$ is the error metric for prediction time $\Delta T_h = 10h$ seconds.

$$RMSE_h^{(n)} = \sqrt{\frac{1}{|E_j|} \sum_{t \in E_i} \left( \hat{A}_{t+h}^{(n)} - A_{t+h}^{(n)} \right)^2}$$

$A_{t+h}^{(n)}$ and $\hat{A}_{t+h}^{(n)}$ are the observed and predicted attenuation values of the $n^{th}$ link, respectively, where the predicted value was generated h steps ahead. $E_i$ represents the set of samples of the $i^{th}$ event.

Figure 13:
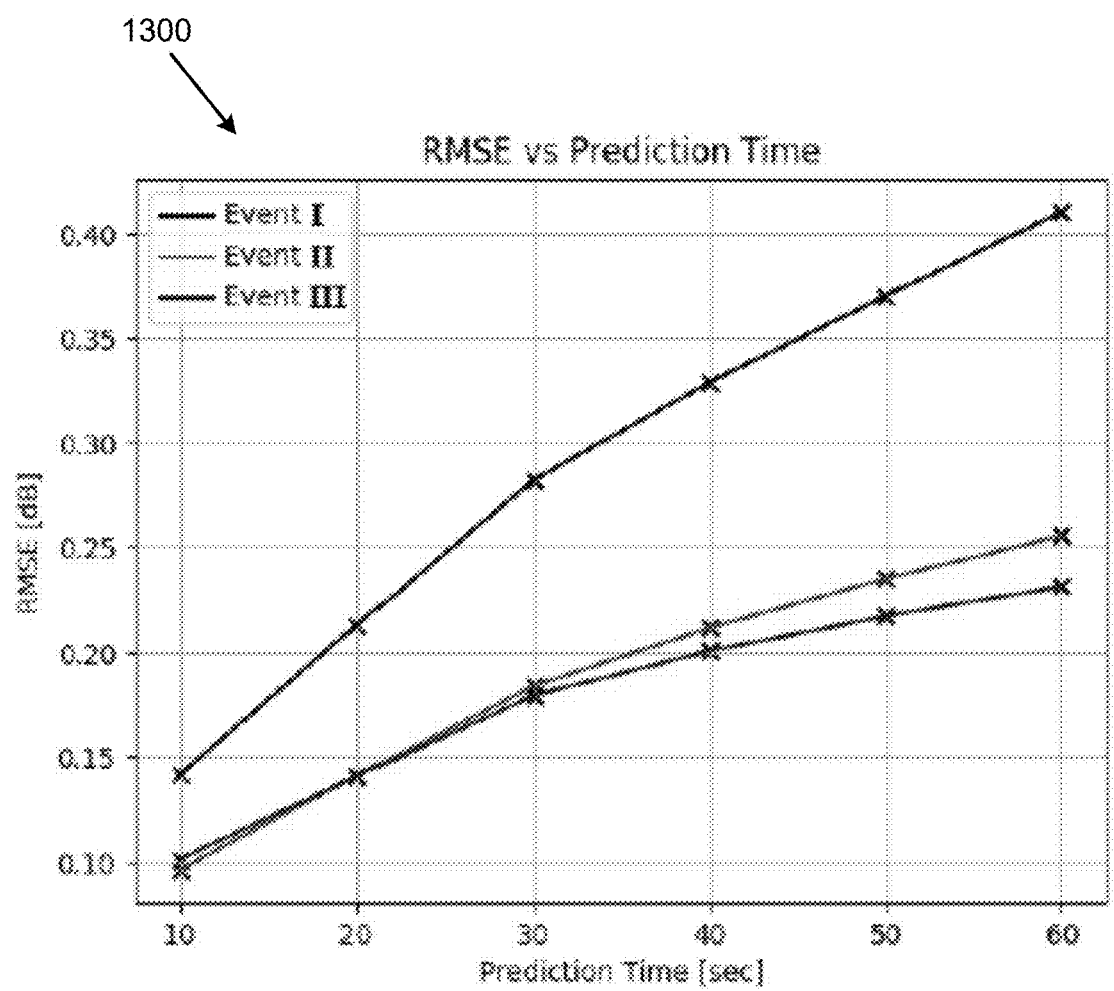
FIG. 13 is a graph showing averaged $RMSE_h$ values for each of three tested events, for tested edges, as a function of prediction time $\Delta T_h$.

FIG. 13 is a graph 1300 showing the averaged $RMSE_h$ values (in dB) for each of the tested events (I, II, and III), over the tested edges, as a function of the prediction time $\Delta T_h$. The $RMSE_h^{(n)}$ values for each edge are first computed. Then, the RMSE values, for a time step h, for the various edges included in the graph are averaged. The result provides the average error (in dB) obtained by the algorithm when predicting the future attenuation value for all the CML network according to:

$$RMSE_h = \frac{1}{N} \sum_{n=1}^{N} RMSE_h^{(n)}$$

In the above equation, N is the number of one-directional links in the network.

It is desirable to determine the probability of getting an extreme error in the derived predictions. To that end, the absolute error for the predictions may be defined as the absolute value between the measured and predicted value, as follows:

$$e_h(t) = |\hat{A}_{t+h} - A_{t+h}|$$

where $A_{t+h}$ and $\hat{A}_{t+h}$ are the measured and predicted attenuation. Based on the empirical error statistics, the confidence measure in the forecast can be derived as follows:

$$P_e(|e_h| \leq x_{crit}) = \gamma$$

The parameter $p_e$ is defined as the empirical probability that the absolute error in the prediction of h steps ahead, $e_h$, is smaller than some critical value $x_{crit}$. A confidence interval is set to test the model, by the proportion of the absolute errors in which the values are less than $x_{crit}$. The critical value is a function of the desired confidence level, the parameter $\gamma$.

Figure 14:
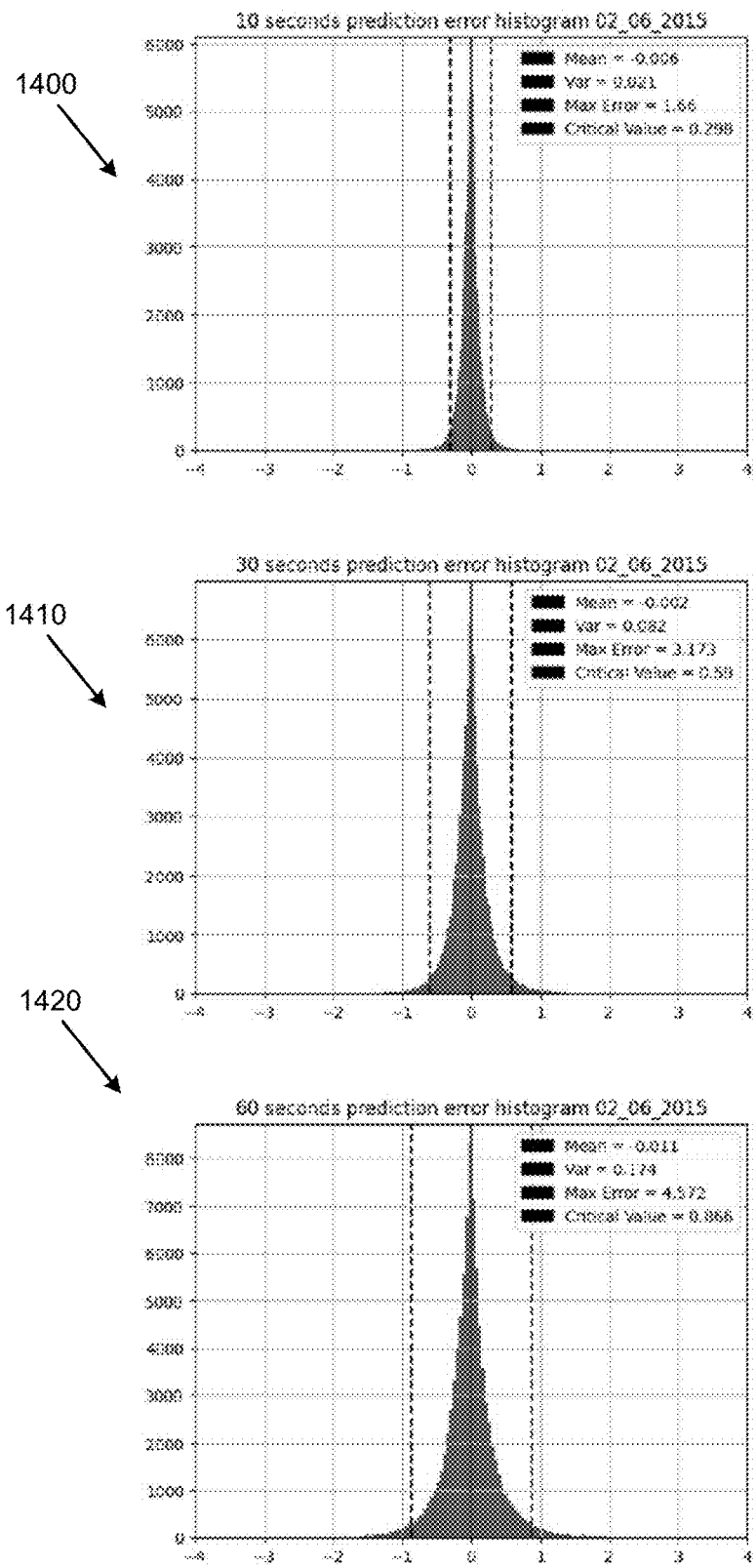
FIG. 14 are graphs showing the distributions of residuals during a rain event for different values of h.

FIG. 14 includes graphs 1400, 1410 and 1420, showing the distributions of the residuals during rain event I (in Table 2) for values of h=1, 3, 6, respectively. The vertical line represents the $x_{crit}$ value obtained for a $\gamma$ value of 0.95. The residuals histogram implies that the residuals in each time step are approximately normally distributed, and the prediction's bias is centered around zero. The variance value grew as the prediction time increases, as the RMSE test implied. Moreover, the symmetric distribution of the residuals justifies the use of the absolute error.

Figure 15:
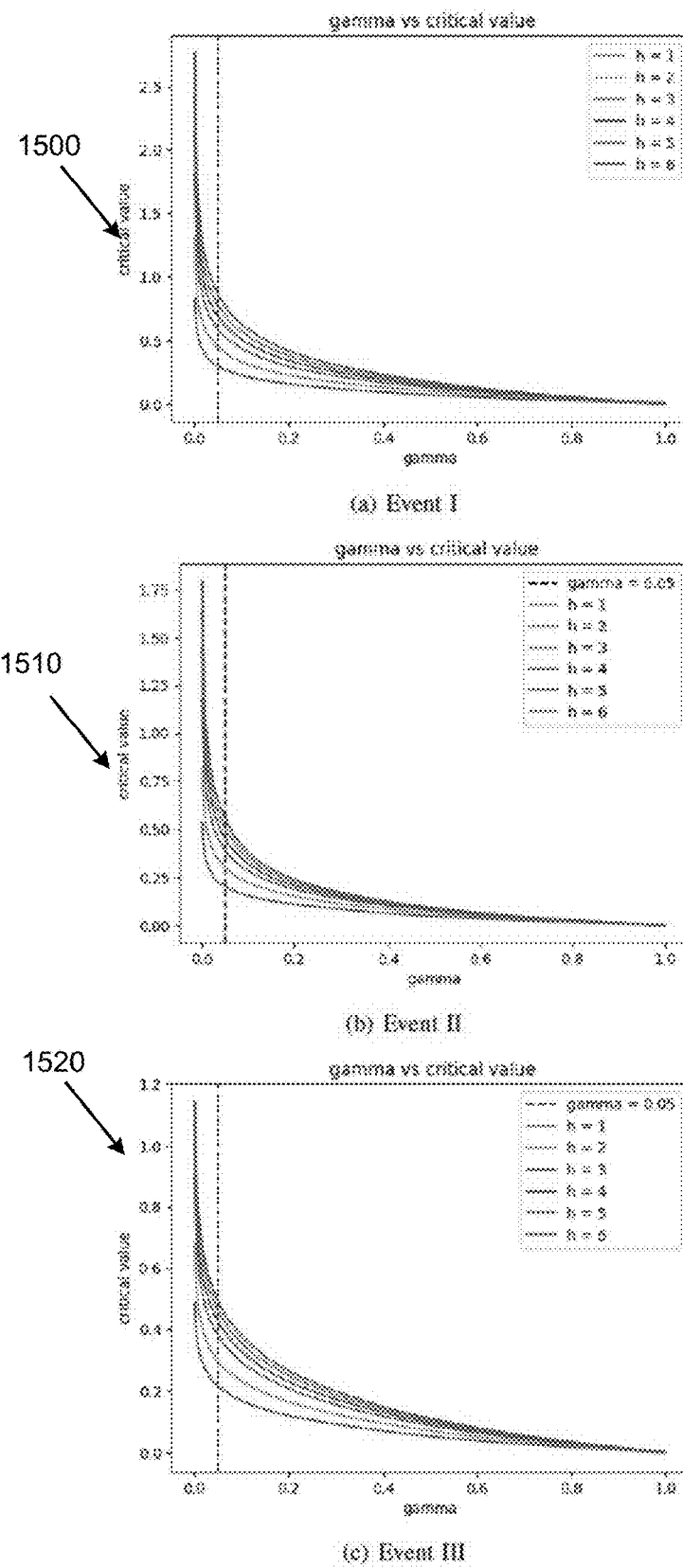
FIG. 15 are graphs showing critical values as a function of γ, for three tested events and for different prediction times.

FIG. 15 includes graphs 1500, 1510, and 1520, showing critical values as a function of $\gamma$, for the three tested events and for different prediction times. As shown, the critical values become larger as the prediction time increase, for lower values of $\gamma$. For a fixed $\gamma$ value, it is expected that the received prediction is different than the actual observation by less than $x_{crit}$ (dB) with the confidence of $1-\gamma$.

The MSNR-based implementations described herein were also tested and evaluated. The testing and evaluation included comparisons of the performances of the MSNR process, the Never Re-route process, and the Always Re-route processes in terms of their network utilization, which is captured by the evolution of the node-average admission rate $$\sum_{n=1}^{N-1} z_{n,t} / (N-1)$$

over time t. The performance evaluation of the MSNR approach included first evaluating the three reconfiguration processes using the small network 1000 depicted in FIG. 10 (with the network 1000 including N=3 nodes) with synthetically generated attenuation levels $x_t^{(k,l)}$ and synthetically generated attenuation predictions $\hat{x}_{t+h}^{(k,l)}$ with different (adjustable) prediction accuracies. Then, the three reconfiguration processes were evaluated using the backhaul network with N=13 nodes illustrated in FIGS. 2 and 3 using attenuation measurements from the dataset and attenuation predictions generated by the AP mechanism. As described herein:

i) The MSNR process leverages future predicted capacities to decide when to re-route. In particular, in each time-step t, it compares the performance of different re-routing plans and selects the plan $r^*_t$ with highest cumulative sum of admission rates.

ii) Never Re-route process attempts to maximize the admission rates $z_{n,t}$ by never provisioning scratch capacity and, thus, fully utilizing links whenever possible. This reactive process operates similarly to the MSNR process, but instead of selecting $r^*_t$, it selects, in every time-step t, the re-routing plan $r_t=(0, \ldots, 0)$. Under this process, the SDN controller is rarely allowed to re-route, but it is continually optimizing the admission rates.

iii) Always Re-route process attempts to provision scratch capacity $s_t \geq s_{min} = 0.05$ at every time-step t, enabling the SDN controller to optimize routing decisions often. This reactive process also operates based on the MSNR process, but instead of selecting $r^*_t$, it selects, in every time-step t with $s_t \geq s_{min}$, the re-routing plan $r_t=(1, 1, \ldots, 1)$, and in every time-step t with $s_t < s_{min}$, the re-routing plan $r_t=(0, 1, \ldots, 1)$.

It is to be noted that all three network reconfiguration processes compared in the course of evaluating the MSNR approach selected max-min fair admission rates $z_{n,t}$ at every time-step t. The main difference between them is that only the MSNR process employs the predictions of the links' future condition to decide when to re-route. Both the Never Re-route and Always Re-route processes simply react to the time-varying conditions of the network.

Starting first with the evaluation of the MSNR approach based on the network 1000 depicted in FIG. 10 (comprising three nodes and three links {(1, 2), (2, 3), (1, 3)}), the normalized demands associated with nodes 1 and 2 (marked as the nodes 1010 and 1020) remained fixed at $d_1=1$ and $d_2=0.5$, respectively, during a time-horizon of 1,000 time-steps. The (actual) attenuation levels $x_t^{(k,l)}$ and predicted attenuation levels $\hat{x}_{t+h}^{(k,l)}$ were synthetically generated according to the following stochastic processes:

$$x_t^{(k,l)} = \min\{\max\{x_{t-1}^{(k,l)} + \delta_t^{(k,l)}; -100\}; -50\};$$

$$\hat{x}_{t+h}^{(k,l)} = \min\{\max\{x_{t+h}^{(k,l)} + \tilde{\delta}_{t+h}^{(k,l)}; -100\}; -50\},$$

for all links $(k, l) \in E$, for all time-steps $t \in \{1, \ldots, 1000\}$, for all values of $h \in \{1, \ldots, H\}$, and with $x_0^{(k,l)}$ sampled from a uniform distribution in the interval $(-100, -50)$. It is to be noted that the first of the above stochastic processes establishes the variation of the attenuation $x_t^{(k,l)}$ over time, while the second stochastic process establishes the noise in the prediction $\hat{x}_{t+h}^{(k,l)}$ of the future attenuation $x_{t+h}^{(k,l)}$. The sequence of Gaussian random variables $\delta_t^{(k,l)}$ are independent and identically distributed (i.i.d.) over time t, independent across links, and sampled according to $N(0, 6.25)$. Similarly, the sequence of random variables $\tilde{d}_{t,h}^{(k,l)}$ are Gaussian $N(0, \tilde{\sigma}^2)$ with positive variance $\tilde{\sigma}^2$, i.i.d. over time, and independent across different links. Note from the second stochastic process that a high variance $\tilde{\sigma}^2$ represents an attenuation prediction mechanism with poor accuracy.

Figure 16A:
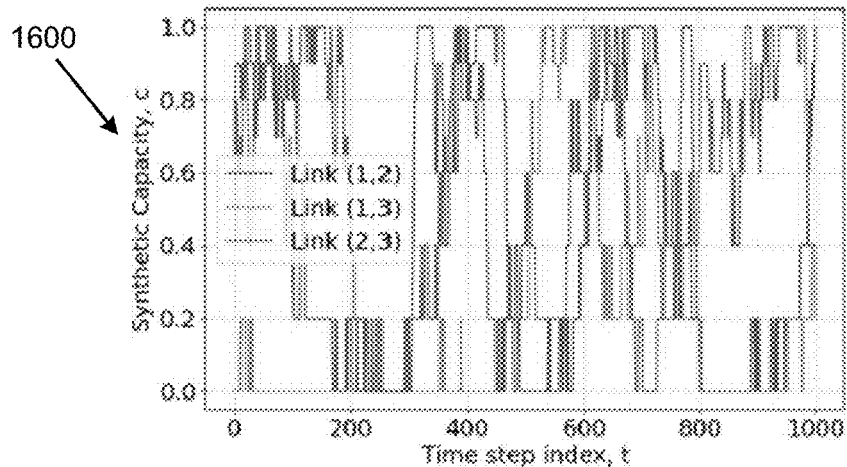
FIGS. 16A-C are graphs illustrating performance of the Multi-Step Network Reconfiguration (MSNR) process for the example network of FIG. 10.
Figure 16B:
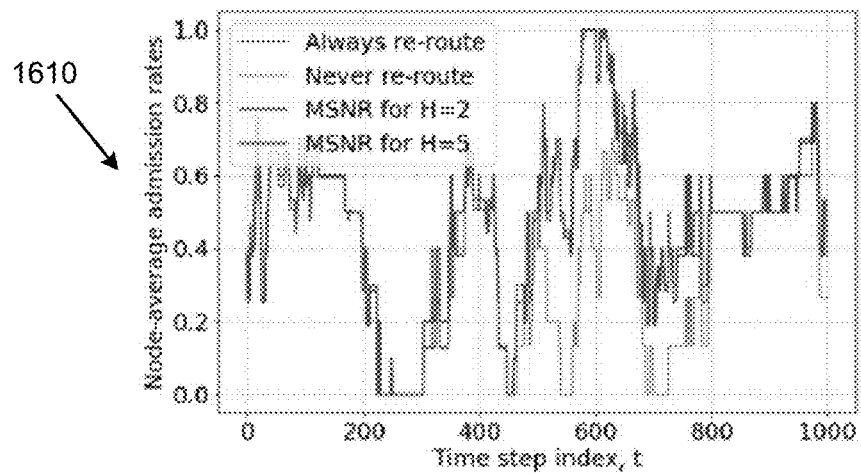
Figure 16C:
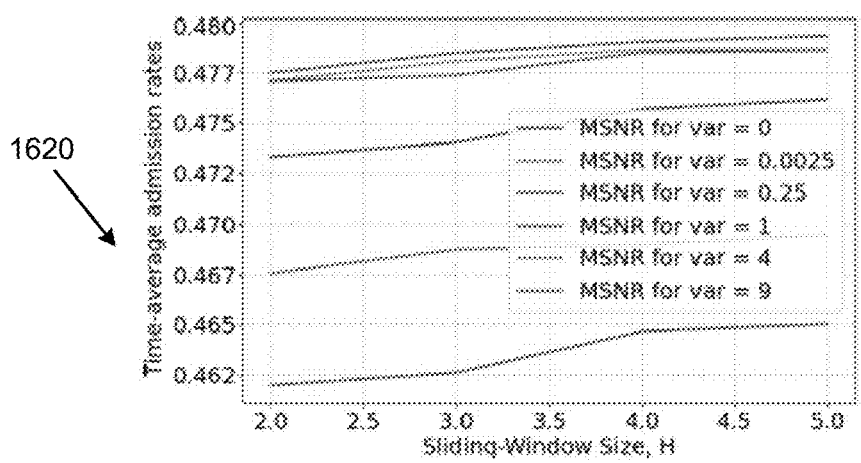

To determine the (actual) capacities $c_t^{(k,l)}$ and the predicted capacities $\hat{c}_{t+h}^{(k,l)}$ associated with the synthetic values of $x_t^{(k,l)}$ and $\hat{x}_{t+h}^{(k,l)}$, respectively, a constant transmission signal level of $P_{Tx,t}^{(k,l)} = 0$ dBm is adopted, and the AM mechanism described above is used. FIG. 16A is a graph 1600 displaying the evolution of the normalized values of $c_t^{(k,l)}$ that were used to generate test results. Note that these normalized values correspond to a network with highly dynamic link capacities $c_t^{(k,l)}$. FIG. 16B is a graph 1610 comparing the evolution of the node-average admission rate $(z_{1,t}+z_{2,t})/2$ over time t for different reconfiguration processes operating with ideal attenuation predictions, i.e., with $\hat{x}_{t+h}^{(k,l)} = x_{t+h}^{(k,l)}$, and as a result, $\hat{c}_{t+h}^{(k,l)} = c_{t+h}^{(k,l)}$. FIG. 16C includes a graph 1620 showing the time-average admission rates $$\sum_{i=1}^{T} (z_{1,t} + z_{2,t})/2T$$

for different reconfiguration processes operating with attenuation predictions with different accuracies represented by $\tilde{\sigma}^2 \in \{0, 0.0025, 0.25, 1, 4, 9, 25\}$ and different prediction window sizes of $H \in \{2, 3, 4, 5\}$.

Table 3, below, provides the time-average admission rates $$\sum_{i=1}^{T} (z_{1,t} + z_{2,t})/2T$$

for different network reconfiguration processes and for attenuation predictions with different accuracies.

TABLE 3

| Prediction Accuracy | Ideal | $\tilde{\sigma}^2 = 1$ | $\tilde{\sigma}^2 = 25$ |
|---|---|---|---|
| Never re-route | 0.362 | 0.359 | 0.343 |
| Always re-route | 0.453 | 0.449 | 0.427 |
| MSNR for H = 2 | 0.477 | 0.473 | 0.447 |
| MSNR for H = 3 | 0.478 | 0.474 | 0.449 |
| MSNR for H = 4 | 0.479 | 0.476 | 0.449 |
| MSNR for H = 5 | 0.479 | 0.476 | 0.450 |

The results in FIG. 16B show that, as expected, Never Re-route has the worst performance, while MSNR with prediction window size H=5 has the best performance in terms of network utilization. The poor performance of Never Re-route, especially between time-steps 500 and 800, results from the SDN controller not being allowed to re-route. The lower performance of Always Re-route, when compared to MSNR, is due to the frequent provisioning of scratch capacity $s_{min}=0.05$. By leveraging the prediction of links' future conditions, MSNR can assess the potential future benefits of re-routing, which allows it to choose when is the best time to re-route. Throughout the 1,000 time-steps, the SDN controller re-routes 31, 30, 28, and 29 times when employing MSNR with prediction window sizes $H \in \{2, 3, 4, 5\}$, respectively.

The results shown in FIG. 16C and Table 3 suggest that: (i) the performance of MSNR improves as the prediction accuracy improves as the window size H increases, and (ii) the performance gain of improving the prediction accuracy is more significant than the performance gain of increasing the prediction window size H.

Figure 17A:
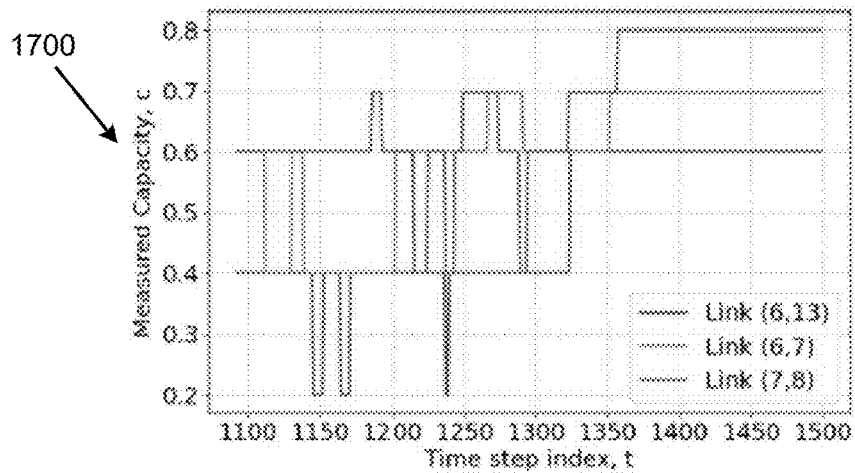
FIGS. 17A-C are graphs illustrating performance of the MSNR process for the example network of FIGS. 2 and 3.
Figure 17B:
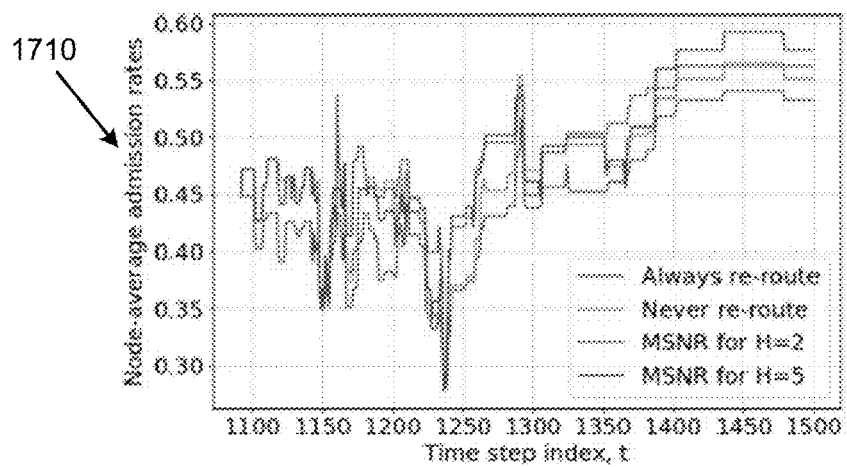
Figure 17C:
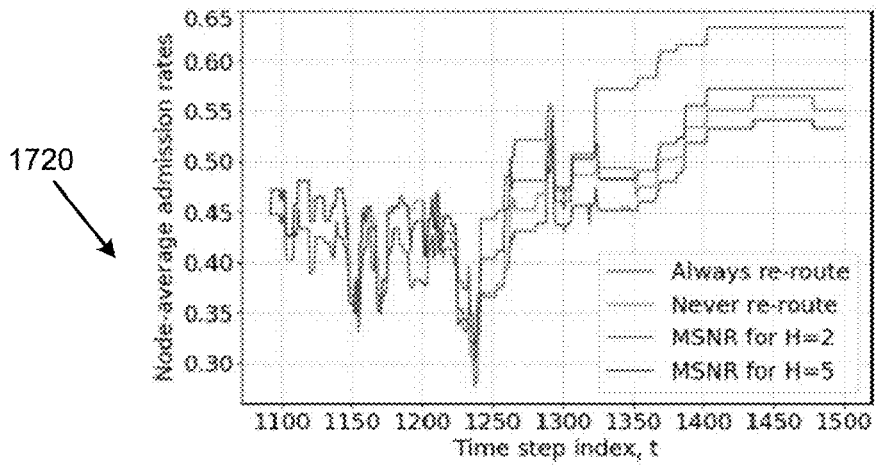

Next, the performance of the MSNR approach using the data collected from the backhaul network shown in FIGS. 2 and 3 with N=13 base-stations (12 commodities and one destination node) and 17 links is explored. The normalized demands assigned to the commodities are chosen according to a uniform distribution in the interval (0, 2). In particular, the twelve demand values are d=[1.111, 0.557, 1.124, 1.266, 0.174, 1.485, 0.947, 0.067, 0.140, 0.596, 1.413, 0.999]. The values of the (actual) capacities $c_t^{(k,l)}$ and future predicted capacities $c_{t+h}^{(k,l)}$ are determined by the link attenuation measurements in the dataset, by the AM mechanism described above, and by the AP mechanism. To train, tune, and test the AP mechanism, a train-validation-test split of 80-10-10 was used. To assess the performance of the MSNR approach in a challenging scenario, a sequence of more than 400 measurements was chosen, that included a period with high attenuation due to a rain event. Moreover, transmission signal levels $P_{Tx,t}^{(k,l)}$ that are 10 dBm lower than the dataset measurements were used. FIG. 17A includes a graph 1700 showing evolution of the normalized capacities $c_t^{(k,l)}$ from three selected links. FIG. 17B is a graph 1710, that shows the evolution of the node-average admission rates $$\sum_{n=1}^{N-1} z_{n,t}/(N-1)$$

for different reconfiguration processes employing ideal attenuation prediction, i.e., $\hat{c}_{t+h}^{(k,l)} = \hat{c}_{t+h}^{(k,l)}$. FIG. 17C includes a graph 1710 showing the node-average admission rates for processes employing the AP mechanism to predict $\hat{c}_{t+h}^{(k,l)}$ over time. The results in FIGS. 17B and 17C show that the MSNR process outperforms both Never Re-route and Always Re-route processes.

Table 4 shows the performance gain of MSNR with $H \in \{2, 5\}$ employing the AP mechanism when compared to reactive processes (namely, Never Re-route or Always Re-route).

TABLE 4

| MSNR | Reactive | Time-average | Node-average | Instantaneous |
|---|---|---|---|---|
| H = 5 | Always | 7.74% | 18.00% | 170.19% |
| H = 2 | Always | 15.49% | 26.84% | 263.58% |
| H = 5 | Never | 1.67% | 10.37% | 68.37% |
| H = 2 | Never | 8.98% | 22.04% | 208.01% |

The third, fourth, and fifth columns of Table 4 are computed, respectively, as follows:

$$\frac{\sum_{t=1}^{T}\sum_{n=1}^{N-1}(z_{n,t}^{(M)} - z_{n,t}^{(R)})}{\sum_{t=1}^{T}\sum_{n=1}^{N-1} z_{n,t}^{(R)}},$$

$$\max_{t}\left\{\frac{\sum_{n=1}^{N-1}(z_{n,t}^{(M)} - z_{n,t}^{(R)})}{\sum_{n=1}^{N-1} z_{n,t}^{(R)}}\right\}, \text{ and } \max_{n,t}\left\{\frac{z_{n,t}^{(M)} - z_{n,t}^{(R)}}{z_{n,t}^{(R)}}\right\}$$

In the above expressions, $z_{n,t}^{(M)}$ and $z_{n,t}^{(R)}$ are the admission rates associated with MSNR and the reactive process, respectively. The above expressions represent the time-average performance gain, the maximum node-average performance gain, and the maximum instantaneous performance gain, respectively. The results in Table 4 show that the MSNR process can improve the time-average admission rate $$\sum_{t=1}^{T}(z_{1,t} + z_{2,t})/2T$$

by more than 7% when compared to either Always Re-route or Never Re-route processes, and, more importantly, they also show that the gain in terms of the instantaneous per commodity admission rate $z_{n,t}$ can exceed 200%. These significant instantaneous gains occur when severe rain-induced attenuation occurs. The MSNR approach is able to prepare the network ahead of time, which alleviates the impact of these disturbances on the network performance.

An important observation from the results provided above in relation to the MSNR approach is that when the attenuation prediction has high accuracy, the performance gap between MSNR with H=2 and reactive processes is significantly larger than the performance gain obtained from increasing the prediction window size H. Adding to this observation the fact that the computational complexity of MSNR grows with H (as discussed above) makes the MSNR approach with H=2 an attractive choice both in terms of performance and complexity.

Thus, the framework described herein includes: (i) the AP mechanism that uses historical data to predict the sequence of future attenuation levels, without incorporating any specific weather-related models; and (ii) the MSNR algorithm that dynamically optimize routing $f_{n,t}^{(k,l)}$ and admission control $z_{n,t}$ decisions over time aiming to maximize the cumulative sum of admission rates $$\sum_{t=1}^{T}\sum_{n=1}^{N-1} z_{n,t},$$

while ensuring that, in every time-step t, the selected feasible set $\{f_{n,t}^{(k,l)}\}$ is max-min fair in every time-step t and can be implemented without inducing transient congestion. This framework allows the SDN controller to prepare the x-haul for imminent (and possibly severe) weather-induced disturbances.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:
1. A method comprising:
   obtaining measurement data from at least part of a wireless communication network during a first interval of time, wherein the measurement data includes measurements indicating whether there are potential disturbances to operation of the wireless communication network;
   determining, based on the obtained measurement data, predictive data representative of future performance of the wireless communication network at one or more future time instances subsequent to an end of the first interval of time; and managing resources of the wireless communication network based, at least in part, on the determined predictive data representative of the future performance of the wireless communication network at the one or more future time instances subsequent to the end of the first interval, wherein managing resources of the wireless communication network comprises:
deriving throughput values between pairs of wireless nodes of the wireless communication network, to optimize an overall throughput at the future time instance of data traffic to and from one or more sink nodes of the wireless communication network, subject to predicted capacities of wireless links of the communication network computed according to the predictive data of the future performance of the wireless communication network at the one or more future time instances following the end of the first interval; and
configuring one or more of the wireless nodes based on the derived throughput values.

2. The method of claim 1, wherein obtaining the measurement data comprises:
measuring signal attenuation levels, over the first interval of time, at one or more of wireless links of the wireless communication network.

3. The method of claim 2, wherein measuring the signal attenuation levels comprises:
measuring the signal attenuation level at regulars or irregular time periods within the first interval of time, wherein the signal attenuation level for a wireless node, $n_i$, at a time t within the first interval is computed as a difference between a transmitted signal power level (TSL) for a signal transmitted from a remote wireless node, $n_j$, and a received signal power level (RSL) for the signal received at the wireless node $n_i$.

4. The method of claim 1, wherein determining the predictive data comprises:
determining the predictive data based on measured signal attenuation levels at one or more of wireless links, and further based on characteristics associated with two or more wireless nodes of the wireless communication network, the characteristics including, for each of the two or more wireless nodes, available meta data, including one or more of: geographic location, a frequency at which signals are transmitted, polarization attributes of the signal, coding technique applied to the signal, modulation technique applied to the signal, or adaptability of the two or more wireless nodes to adjust transmission power and/or adjust signal modulation.

5. The method of claim 1, wherein managing resources of the communication network comprises:
determining status of operation data for at least some wireless links defined for one or more pairs of wireless nodes of the communication network, the status of operation data representative of likely degree of attenuation for the at least some wireless links at the one or more future time instances subsequent to the end of the first interval.

6. The method of claim 5, further comprising:
controlling operational characteristics of a first wireless node, transmitting signals through a first wireless link, based on the status of operation data predicting at least some attenuation for the first wireless link but indicating the first wireless link remains available, wherein controlling the operational characteristics comprises one or more of: increasing transmission strength of the first wireless node, or reducing throughput for the first wireless node according through adjustments of signal coding and/or modulation techniques used by the first wireless node.

7. The method of claim 5, further comprising:
identifying a first wireless link, from the at least some wireless links, predicted, based on the determined status of operation data, to be unavailable or to be operating at a lower capacity at a subsequent time instance; and
identifying an alternative link for data transmission to re-route data from the first wireless link identified to be unavailable or to be operating at the lower capacity at the subsequent time instance, the alternative link selected from one or more other wireless links predicted, based on the determined status of operation data, to be available at a later time instance to the subsequent time instance at which the identified first wireless link is predicted to be unavailable or operating at the lower capacity.

8. The method of claim 1, wherein deriving the throughput values between the pairs of wireless nodes of the wireless communication network comprises:
deriving the throughput values between the pairs of wireless nodes of the wireless communication network subject to further constraints relating to pre-determined characteristics of the wireless communication network.

9. The method of claim 8, wherein the pre-determined characteristics of the communication network comprises one or more of: known capacities of the wireless links, or known data traffic demand.

10. The method of claim 1, wherein managing the resources of the communication network based, at least in part, on the determined predictive data comprises one or more of:
a) configuring one or more wireless nodes of the wireless communication network based on the predictive data, subject to a requirement that at least one identified wireless node maintains a specified quality-of-service (QOS) level; or
b) switching between different channels configured for one or more wireless links based on the determined predictive data and on priority of services provided at one or more wireless nodes for which the one or more wireless links are established.

11. The method of claim 1, wherein determining the predictive data comprises:
determining ambient conditions affecting the future performance of the communication network.

12. The method of claim 11, wherein determining ambient condition comprises:
determining predicted weather patterns affecting the performance of the wireless communication network, including estimating spatial-temporal rain attenuation patterns predicted to impact the communication network.

13. The method of claim 1, wherein the measurements indicative of potential disturbances to operation of the wireless communication network are indicative of weather-related disturbances.

14. A system comprising:
a communication module to obtain measurement data from wireless nodes, forming at least part of a wireless communication network, during a first interval of time, the measurement data including measurements indicating whether there are potential disturbances to operation of the wireless communication network; and a processor-based resource management controller, coupled to the communication module, configured to:
  determine, based on the obtained measurement data, predictive data representative of future performance of the wireless communication network at one or more future time instances subsequent to an end of the first interval of time; and
  manage resources of the wireless communication network based, at least in part, on the determined predictive data representative of the future performance of the wireless communication network at the one or more future time instances subsequent to the end of the first interval, wherein the processor-based resource management controller configured to manage resources of the wireless communication network is configured to:
    derive throughput values between pairs of wireless nodes of the wireless communication network, to optimize an overall throughput at a future time instance of data traffic to and from one or more sink nodes of the wireless communication network, subject to predicted capacities of wireless links of the communication network computed according to the predictive data of the future performance of the wireless communication network at the one or more future time instances following the end of the first interval; and
    configure one or more of the wireless nodes based on the derived throughput values.

15. The system of claim 14, further comprising:
  the wireless nodes forming the at least part of the wireless communication network.

16. The system of claim 14, wherein the processor-based resource management controller configured to determine the predictive data is configured to:
  determine the predictive data based on measured signal attenuation levels at one or more wireless links, and further based on characteristics associated with two or more of the wireless nodes of the wireless communication network, the characteristics including, for each of the two or more wireless nodes, available meta data, including one or more of: geographic location, a frequency at which signals are transmitted, polarization attributes of the signal, coding technique applied to the signal, modulation technique applied to the signal, or adaptability of the two or more wireless nodes to adjust transmission power and/or adjust signal modulation.

17. The system of claim 14, wherein the processor-based resource management controller configured to determine the predictive data is configured to:
  determine the predictive data using a learning engine, trained using attenuation time-series data collected from multiple wireless links defined between one or more pairs of wireless nodes of the wireless communication network during dry and wet periods, applied to the measurement data, wherein the predictive data is representative of future attenuation behavior for wireless links defined between wireless nodes of the wireless communication network for H subsequent time instances following the end of the first interval.

18. The system of claim 14, wherein the processor-based resource management controller configured to manage resources of the communication network is configured to:
  determine status of operation data for at least some wireless links defined for one or more pairs of the wireless nodes of the wireless communication network, the status of operation data representative of likely degree of attenuation for the at least some wireless links at the one or more future time instances subsequent to the end of the first interval; and
  perform one or more of:
  i) control operational characteristics of a first wireless node, transmitting signals through a first wireless link, based on the status of operation data predicting at least some attenuation for the first wireless link but indicating the first wireless link remains available, wherein the controller configured to control the operational characteristics is configured to cause one or more of: increasing transmission strength of the first wireless node, or reducing throughput for the first wireless node according through adjustments of signal coding and/or modulation techniques used by the first wireless node; or
  ii) identify a first wireless link, from the at least some wireless links, predicted, based on the determined status of operation data, to be unavailable or to be operating at a lower capacity at a subsequent time instance, and identify an alternative link for data transmission to re-route data from the first wireless link identified to be unavailable or to be operating at the lower capacity at the subsequent time instance, the alternative link selected from one or more other wireless links predicted, based on the determined status of operation data, to be available at a later time instance to the subsequent time instance at which the identified first wireless link is predicted to be unavailable or operating at the lower capacity.

19. The system of claim 14, wherein the processor-based resource management controller configured to manage the resources of the communication network based, at least in part, on the determined predictive data is configured to:
  dynamically derive, based on the determined predictive data, a sequence of network routing steps, during a future time window, to connect wireless nodes of the wireless communication network to achieve an optimized level of network traffic volume allowed through the communication network during the future time window.

20. The system of claim 19, wherein the processor-based resource management controller configured to dynamically derive the sequence of network routing steps is configured to:
  evaluate traffic volume performance for candidate sequences of link configurations between the wireless nodes during the future time window that maximizes a cumulative sum of network traffic volume flowing through the wireless communication network subject to a constraint of a minimum traffic volume requirement allocated for data sources generating the traffic volume in the wireless communication network.

21. The system of claim 19, wherein the processor-based resource management controller configured to dynamically derive the sequence of network routing steps is configured to:
  determine the sequence of network routing steps based on a backward induction optimization approach, including to:
    divide the future time window into two or more temporal sequential sections,
    determine a network routing optimization solution for a later section, from the divided two or more sequential sections, prior to determining a network routing optimization solution for an earlier section from the divided two or more sequential sections, and determine the network routing optimization solution for the earlier section based on the network routing optimization solution determined for the later section from the divided two or more sequential sections for the future time window.

22. A non-transitory computer readable media comprising computer instructions executable on a processor-based device to:
obtain measurement data from at least part of a wireless communication network during a first interval of time, wherein the measurement data includes measurements indicating whether there are potential disturbances to operation of the wireless communication network;
determine, based on the obtained measurement data, predictive data representative of future performance of the wireless communication network at one or more future time instances subsequent to an end of the first interval of time; and
manage resources of the wireless communication network based, at least in part, on the determined predictive data representative of the future performance of the wireless communication network at the one or more future time instances subsequent to the end of the first interval, wherein the computer instructions executable on the processor-based device to manage resources of the wireless communication network include one or more instructions to:
derive throughput values between pairs of wireless nodes of the wireless communication network, to optimize an overall throughput at the future time instance of data traffic to and from one or more sink nodes of the wireless communication network, subject to predicted capacities of wireless links of the communication network computed according to the predictive data of the future performance of the wireless communication network at the one or more future time instances following the end of the first interval; and
configure one or more of the wireless nodes based on the derived throughput values.

23. A method comprising:
obtaining measurement data from at least part of a wireless communication network during a first interval of time, wherein the measurement data includes measurements indicating whether there are potential disturbances to operation of the wireless communication network;
determining, based on the obtained measurement data, predictive data representative of future performance of the wireless communication network at one or more future time instances subsequent to an end of the first interval of time, wherein determining the predictive data comprises determining the predictive data using a learning engine, trained using attenuation time-series data collected from multiple wireless links defined between one or more pairs of wireless nodes of the wireless communication network during dry and wet periods, applied to the measurement data obtained for the wireless communication network, including determining the predictive data representative of future attenuation behavior for wireless links defined between wireless nodes of the wireless communication network for H subsequent time instances following the end of the first interval, wherein determining the predictive data using the learning engine comprises:
deriving, using a Long Short-Term Memory (LSTM) encoder network, a fixed-length hidden state vector for a time instance in the first interval based on the measurement data obtained for the wireless communication network, and on a previous state vector computed for a previous set of measurement data, the LSTM encoder implementing a non-linear activation function to compute the hidden state vector; and
applying an LSTM decoder to the hidden state vector to determine the predictive data representative of future attenuation behavior for the wireless links of the wireless communication network for the H subsequent time instances; and
managing resources of the wireless communication network based, at least in part, on the determined predictive data representative of the future performance of the wireless communication network at the one or more future time instances subsequent to the end of the first interval.

24. The method of claim 23, wherein managing resources of the wireless communication network comprises:
deriving throughput values between pairs of wireless nodes of the wireless communication network, to optimize an overall throughput at the future time instance of data traffic to and from one or more sink nodes of the wireless communication network, subject to predicted capacities of wireless links of the communication network computed according to the predictive data of the future performance of the wireless communication network at the one or more future time instances following the end of the first interval; and
configuring one or more of the wireless nodes based on the derived throughput values.

25. The method of claim 24, wherein deriving the throughput values between the pairs of wireless nodes of the wireless communication network comprises:
deriving the throughput values between the pairs of wireless nodes of the wireless communication network subject to further constraints relating to pre-determined characteristics of the wireless communication network.

26. The method of claim 25, wherein the pre-determined characteristics of the communication network comprises one or more of: known capacities of the wireless links, or known data traffic demand.

27. The method of claim 23, wherein managing the resources of the communication network based, at least in part, on the determined predictive data comprises:
dynamically deriving, based on the determined predictive data, a sequence of network routing steps, during a future time window, to connect wireless nodes of the wireless communication network to achieve an optimized level of network traffic volume allowed through the communication network during the future time window.

28. The method of claim 27, wherein dynamically deriving the sequence of network routing steps comprises one or more of:
a) deriving, based on the determined predictive data, network configuration data specifying a temporal sequence of links and respective flows on the links between the wireless nodes of the wireless communication network;
b) evaluating traffic volume performance for candidate sequences of link configurations between the wireless nodes during the future time window that maximizes a cumulative sum of network traffic volume flowing through the communication network subject to a constraint of a minimum traffic volume requirement allocated for data sources generating the traffic volume in the communication network; or c) determining the sequence of network routing steps based on a backward induction optimization approach, including:

dividing the future time window into two or more temporal sequential sections, determining a network routing optimization solution for a later section, from the divided two or more sequential sections, prior to determining a network routing optimization solution for an earlier section from the divided two or more sequential sections, and determining the network routing optimization solution for the earlier section based on the network routing optimization solution determined for the later section from the divided two or more sequential sections for the future time window.

29. A system comprising:

a communication module to obtain measurement data from wireless nodes, forming at least part of a wireless communication network, during a first interval of time, the measurement data including measurements indicating whether there are potential disturbances to operation of the wireless communication network; and a processor-based resource management controller, coupled to the communication module, configured to:

determine, based on the obtained measurement data, predictive data representative of future performance of the wireless communication network at one or more future time instances subsequent to an end of the first interval of time, wherein the processor-based resource management controller configured to determine the predictive data is configured to:

determine the predictive data using a learning engine, trained using attenuation time-series data collected from multiple wireless links defined between one or more pairs of wireless nodes of the wireless communication network during dry and wet periods, applied to the measurement data, wherein the predictive data is representative of future attenuation behavior for wireless links defined between wireless nodes of the wireless communication network for H subsequent time instances following the end of the first interval; and manage resources of the wireless communication network based, at least in part, on the determined predictive data representative of the future performance of the wireless communication network at the one or more future time instances subsequent to the end of the first interval.

30. The system of claim 29, wherein the controller configured to manage the resources of the communication network based, at least in part, on the determined predictive data is configured to:

dynamically derive, based on the determined predictive data, a sequence of network routing steps, during a future time window, to connect wireless nodes of the wireless communication network to achieve an optimized level of network traffic volume allowed through the communication network during the future time window.

31. The system of claim 30, wherein the controller configured to dynamically derive the sequence of network routing steps is configured to:

evaluate traffic volume performance for candidate sequences of link configurations between the wireless nodes during the future time window that maximizes a cumulative sum of network traffic volume flowing through the wireless communication network subject to a constraint of a minimum traffic volume requirement allocated for data sources generating the traffic volume in the wireless communication network.

32. The system of claim 30, wherein the controller configured to dynamically derive the sequence of network routing steps is configured to:

determine the sequence of network routing steps based on a backward induction optimization approach, including to:

divide the future time window into two or more temporal sequential sections, determine a network routing optimization solution for a later section, from the divided two or more sequential sections, prior to determining a network routing optimization solution for an earlier section from the divided two or more sequential sections, and determine the network routing optimization solution for the earlier section based on the network routing optimization solution determined for the later section from the divided two or more sequential sections for the future time window.

33. A method comprising:

obtaining measurement data from at least part of a wireless communication network during a first interval of time, wherein the measurement data includes measurements indicating whether there are potential disturbances to operation of the wireless communication network;

determining, based on the obtained measurement data, predictive data representative of future performance of the wireless communication network at one or more future time instances subsequent to an end of the first interval of time; and managing resources of the wireless communication network based, at least in part, on the determined predictive data representative of the future performance of the wireless communication network at the one or more future time instances subsequent to the end of the first interval, wherein managing the resources of the communication network based, at least in part, on the determined predictive data comprises dynamically deriving, based on the determined predictive data, a sequence of network routing steps, during a future time window, to connect wireless nodes of the wireless communication network to achieve an optimized level of network traffic volume allowed through the communication network during the future time window, and wherein dynamically deriving the sequence of network routing steps comprises one or more of:

a) evaluating traffic volume performance for candidate sequences of link configurations between the wireless nodes during the future time window that maximizes a cumulative sum of network traffic volume flowing through the communication network subject to a constraint of a minimum traffic volume requirement allocated for data sources generating the traffic volume in the communication network; or b) determining the sequence of network routing steps based on a backward induction optimization approach, including:

dividing the future time window into two or more temporal sequential sections, determining a network routing optimization solution for a later section, from the divided two or more sequential sections, prior to determining a network routing optimization solution for an earlier section from the divided two or more sequential sections, and determining the network routing optimization solution for the earlier section based on the network routing optimization solution determined for the later section from the divided two or more sequential sections for the future time window.

34. The method of claim 33, wherein dynamically deriving the sequence of network routing steps further comprises:

deriving, based on the determined predictive data, network configuration data specifying a temporal sequence of links and respective flows on the links between the wireless nodes of the wireless communication network.

35. The method of claim 33, wherein evaluating the traffic volume performance is performed subject to a further constraint of minimizing transient congestion in the wireless communication network during the future time window.

36. The method of claim 33, wherein determining the network routing optimization solution for the earlier section comprises:

identifying, for the time window of H sections, where H is an integer greater than 1, an optimal connectivity configuration for a first scenario in which a first re-routing step occurs at a discrete time n within the time window; and evaluating network performance for a set of candidate routing configurations for the wireless network in which an earlier re-routing step occurs at time n-1, wherein evaluating the network performance for the set of candidate routing configurations excludes candidate configurations inconsistent with the optimal connectivity configuration identified for the first scenario in which the first re-routing step occurs at the time n.

37. A system comprising:

a communication module to obtain measurement data from wireless nodes, forming at least part of a wireless communication network, during a first interval of time, the measurement data including measurements indicating whether there are potential disturbances to operation of the wireless communication network; and a processor-based resource management controller, coupled to the communication module, configured to:

determine, based on the obtained measurement data, predictive data representative of future performance of the wireless communication network at one or more future time instances subsequent to an end of the first interval of time; and manage resources of the wireless communication network based, at least in part, on the determined predictive data representative of the future performance of the wireless communication network at the one or more future time instances subsequent to the end of the first interval, wherein the controller configured to manage the resources of the communication network based, at least in part, on the determined predictive data is configured to dynamically derive, based on the determined predictive data, a sequence of network routing steps, during a future time window, to connect wireless nodes of the wireless communication network to achieve an optimized level of network traffic volume allowed through the communication network during the future time window, and wherein the processor-based resource management controller configured to dynamically derive the sequence of network routing steps is configured to perform one or more of:

evaluate traffic volume performance for candidate sequences of link configurations between the wireless nodes during the future time window that maximizes a cumulative sum of network traffic volume flowing through the wireless communication network subject to a constraint of a minimum traffic volume requirement allocated for data sources generating the traffic volume in the wireless communication network; or determine the sequence of network routing steps based on a backward induction optimization approach, including to:

divide the future time window into two or more temporal sequential sections, determine a network routing optimization solution for a later section, from the divided two or more sequential sections, prior to determining a network routing optimization solution for an earlier section from the divided two or more sequential sections, and determine the network routing optimization solution for the earlier section based on the network routing optimization solution determined for the later section from the divided two or more sequential sections for the future time window.

38. The system of claim 37, wherein the controller configured to evaluate the traffic volume performance is performed subject to a further constraint of minimizing transient congestion in the wireless communication network during the future time window.

39. The system of claim 37, wherein the controller configured to determine the network routing optimization solution for the earlier section is configured to:

identify, for the time window of H sections, where His an integer greater than 1, an optimal connectivity configuration for a first scenario in which a first re-routing step occurs at a discrete time n within the time window; and evaluate network performance for a set of candidate routing configurations for the wireless network in which an earlier re-routing step occurs at time n-1, wherein evaluating the network performance for the set of candidate routing configurations excludes candidate configurations inconsistent with the optimal connectivity configuration identified for the first scenario in which the first re-routing step occurs at the time n.

* * * * *